United States Patent [19]

LaManna et al.

[11] Patent Number: 4,755,069

[45] Date of Patent: Jul. 5, 1988

[54] CREDIT CARD EMBOSSING AND RECORDING SYSTEM

[75] Inventors: Richard J. LaManna, Whippany; James L. Hinton, Short Hills, both of N.J.; Edward L. Cucksey, Upper Nyack, N.Y.; Leo Kull, West Caldwell, N.J.

[73] Assignee: National Business Systems, Inc., Moonachie, N.J.

[21] Appl. No.: 878,664

[22] Filed: Jun. 23, 1986

[51] Int. Cl.$^4$ ............................................. B41J 3/38
[52] U.S. Cl. ................................... 400/130; 400/134; 101/18
[58] Field of Search ....................... 101/18, 22, 23, 29, 101/21, 27, 93.19; 400/129, 130, 131, 132, 133, 134, 134.1, 134.2, 134.3; 360/2, 81

[56] References Cited

U.S. PATENT DOCUMENTS

| | | | |
|---|---|---|---|
| 3,820,455 | 6/1974 | Hencley et al. | 101/18 X |
| 4,088,216 | 5/1978 | LaManna et al. | 101/18 X |
| 4,151,564 | 4/1979 | Schreiber et al. | 360/2 |
| 4,180,338 | 12/1979 | LaManna et al. | 400/134.3 X |
| 4,309,601 | 1/1982 | Nally et al. | 360/2 X |
| 4,518,853 | 5/1985 | Gabel et al. | 360/88 X |
| 4,686,898 | 8/1987 | La Manna et al. | 101/18 |

Primary Examiner—Charles A. Pearson
Attorney, Agent, or Firm—Antonelli, Terry & Wands

[57] ABSTRACT

A system for embossing a plurality of lines and recording encoded tracks of digitally encoded characters for credit cards is disclosed. The system has an improved recording station for recording digitally encoded characters, indent embossing unit, card transporting unit, process for verifying the accuracy of recording the tracks; and stacker.

30 Claims, 30 Drawing Sheets

FIG. 2.

| TRACK | RECORDING DENSITY (BITS PER INCH) | CHARACTER CONFIGURATION (INCLUDING PARITY BIT) | INFORMATION CONTENT |
|---|---|---|---|
| TRACK 1 | 210 bpi | 7 BITS PER CHARACTER | 79 ALPHANUMERIC CHARACTERS |
| TRACK 2 | 75 bpi | 5 BITS PER CHARACTER | 40 NUMERIC CHARACTERS |
| TRACK 3 | 210 bpi | 5 BITS PER CHARACTER | 107 NUMERIC CHARACTERS |

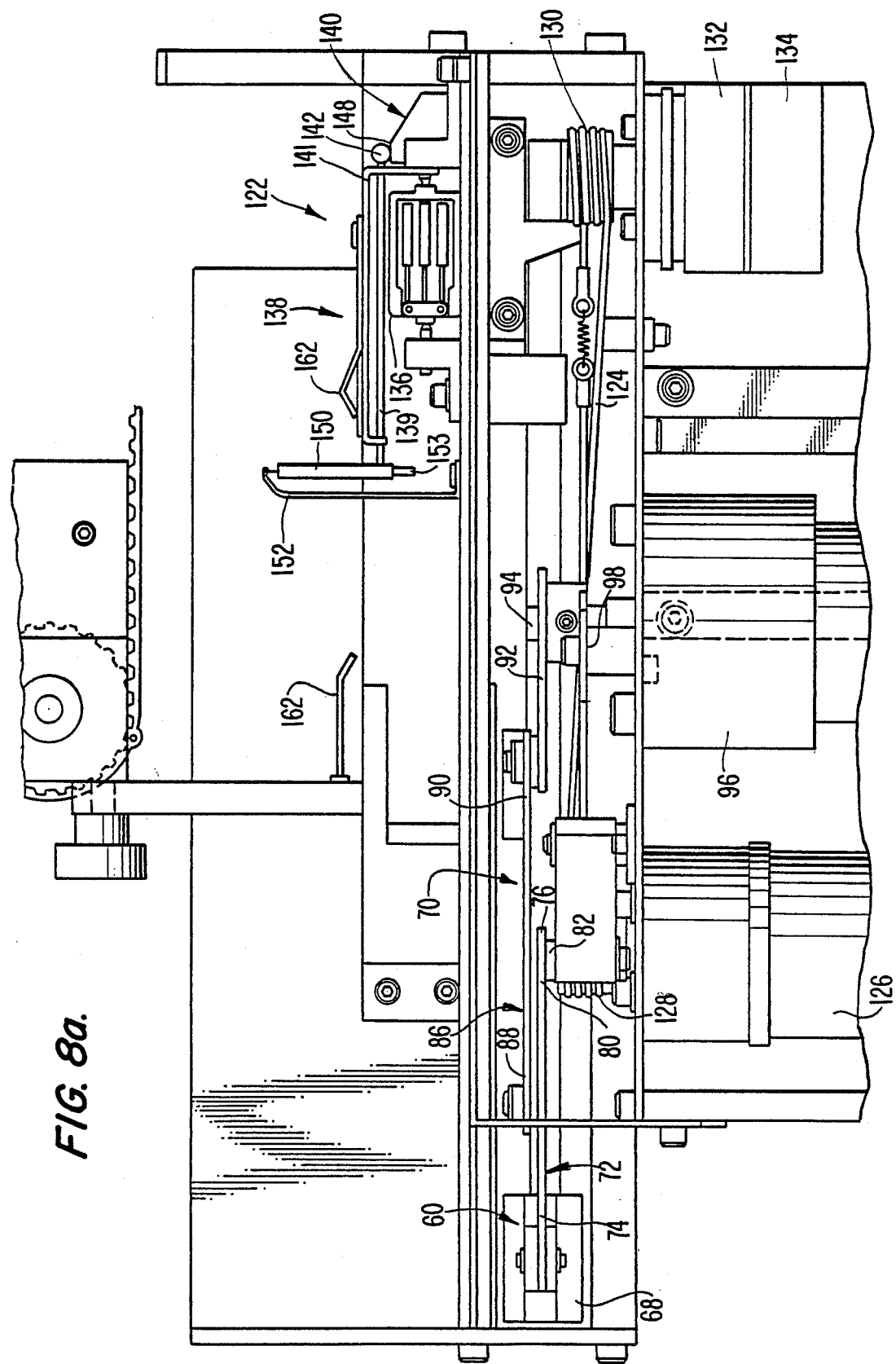

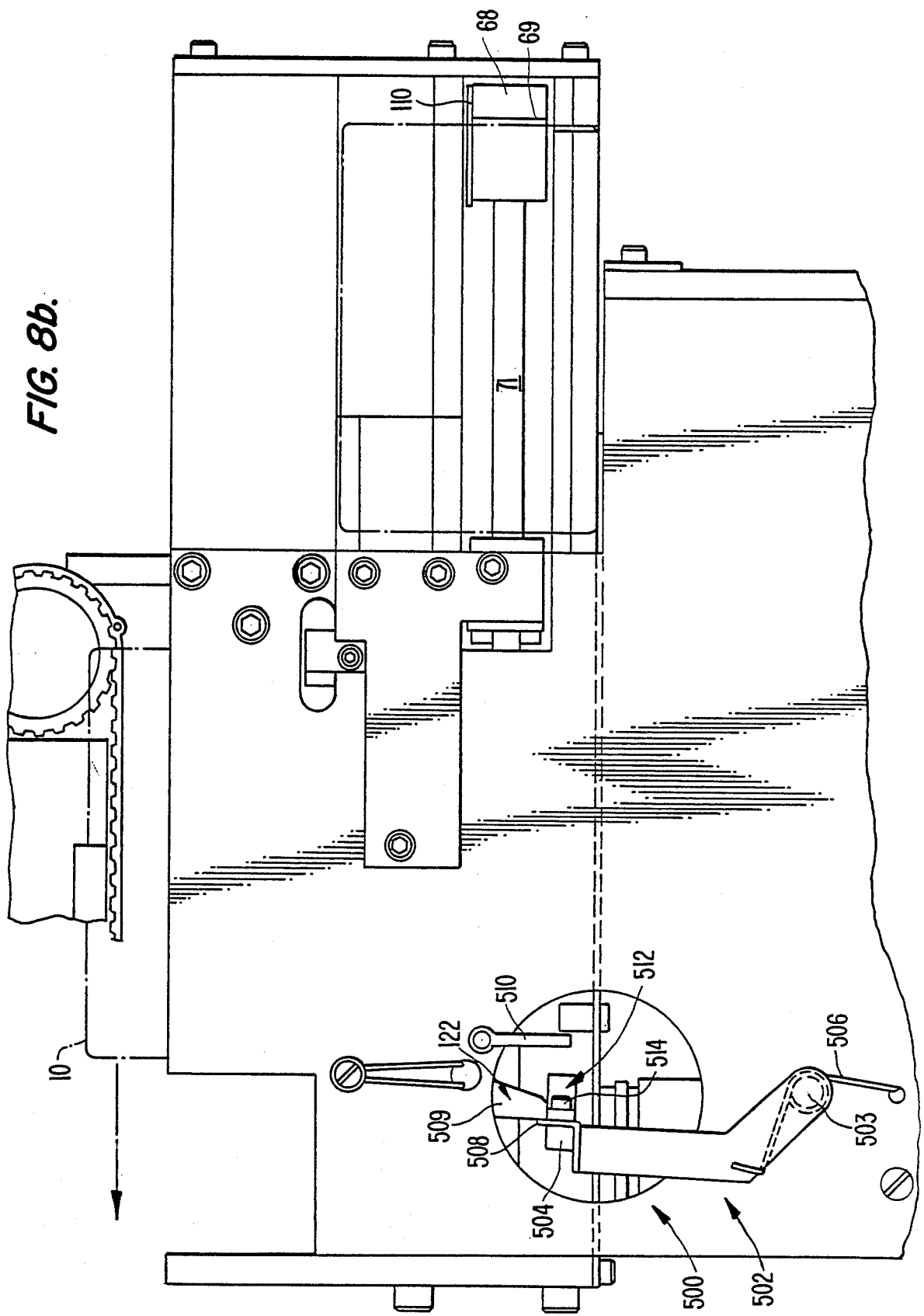

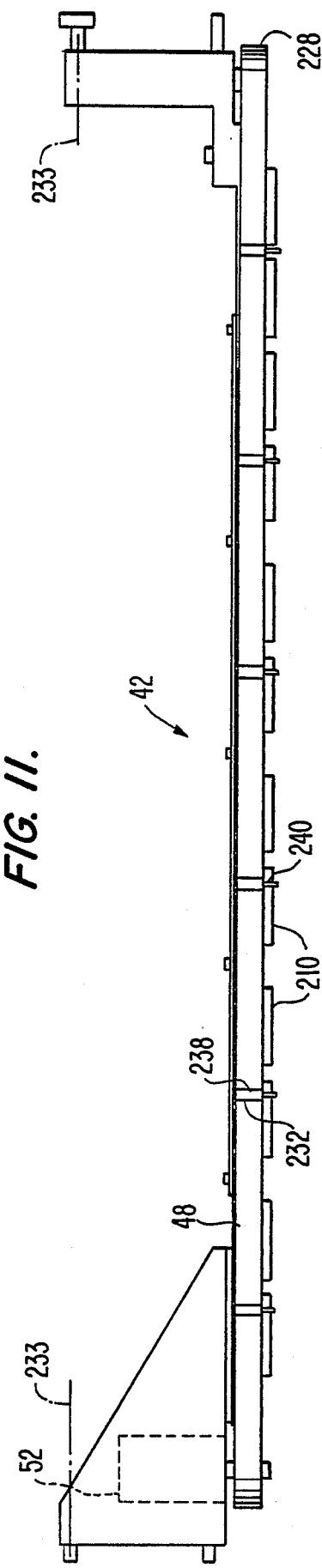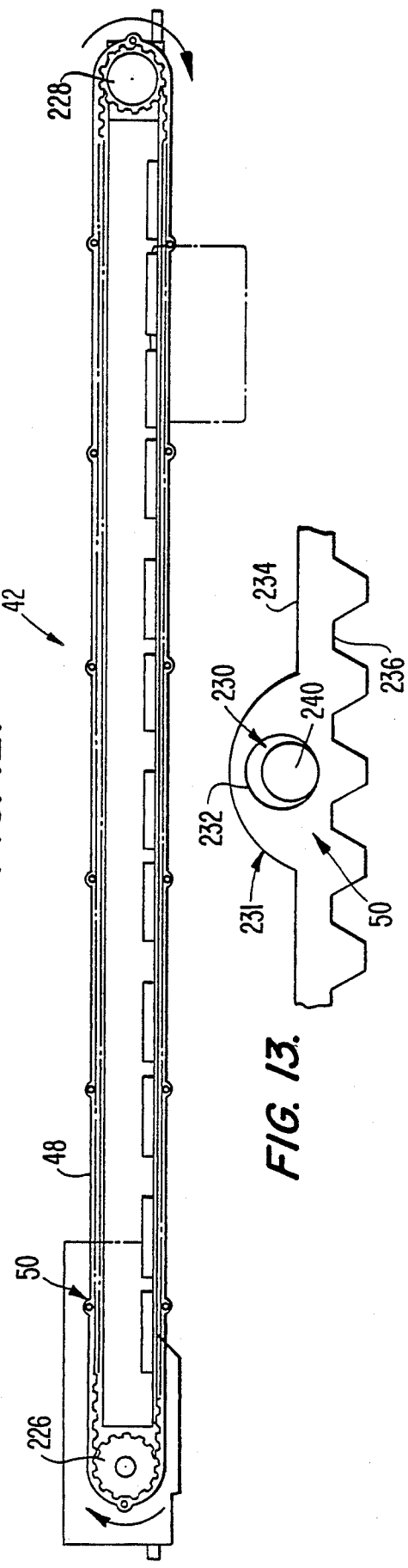
FIG. 11.
FIG. 12.
FIG. 13.

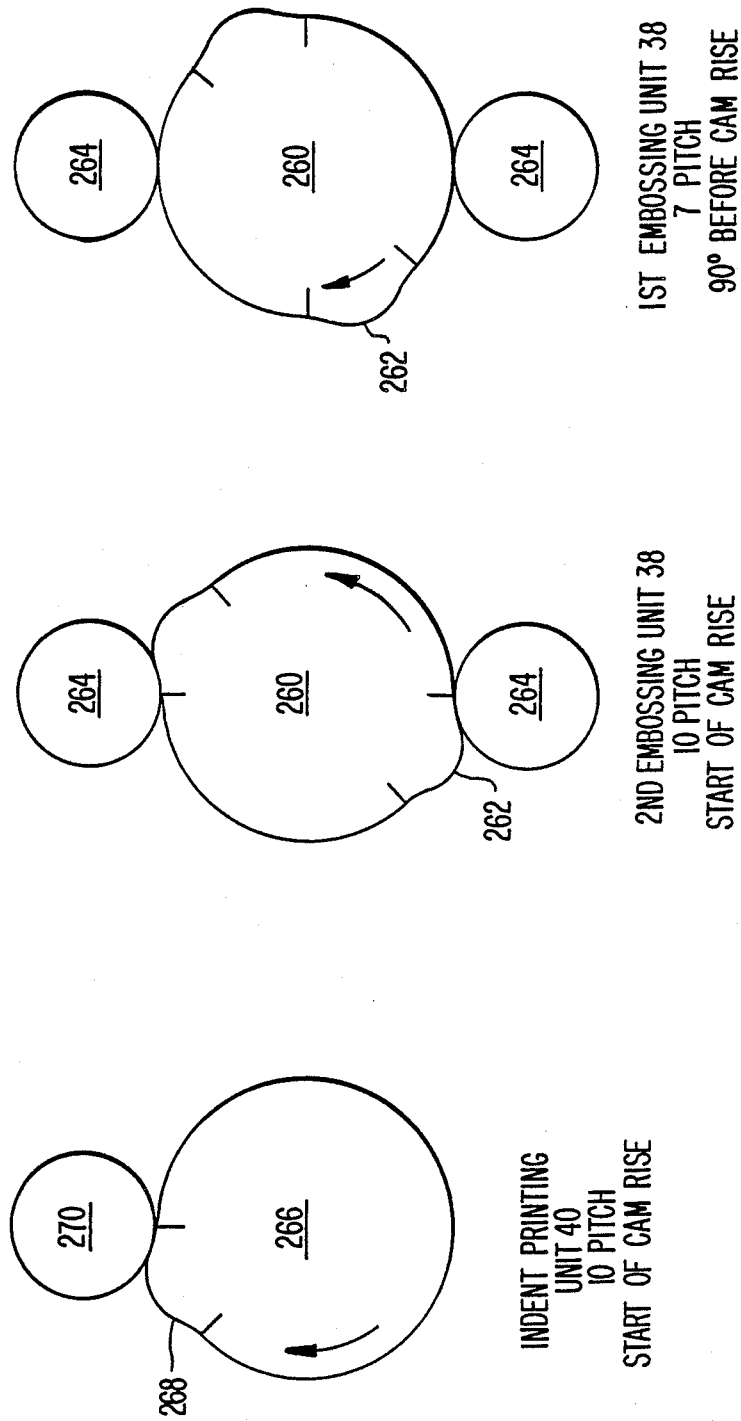

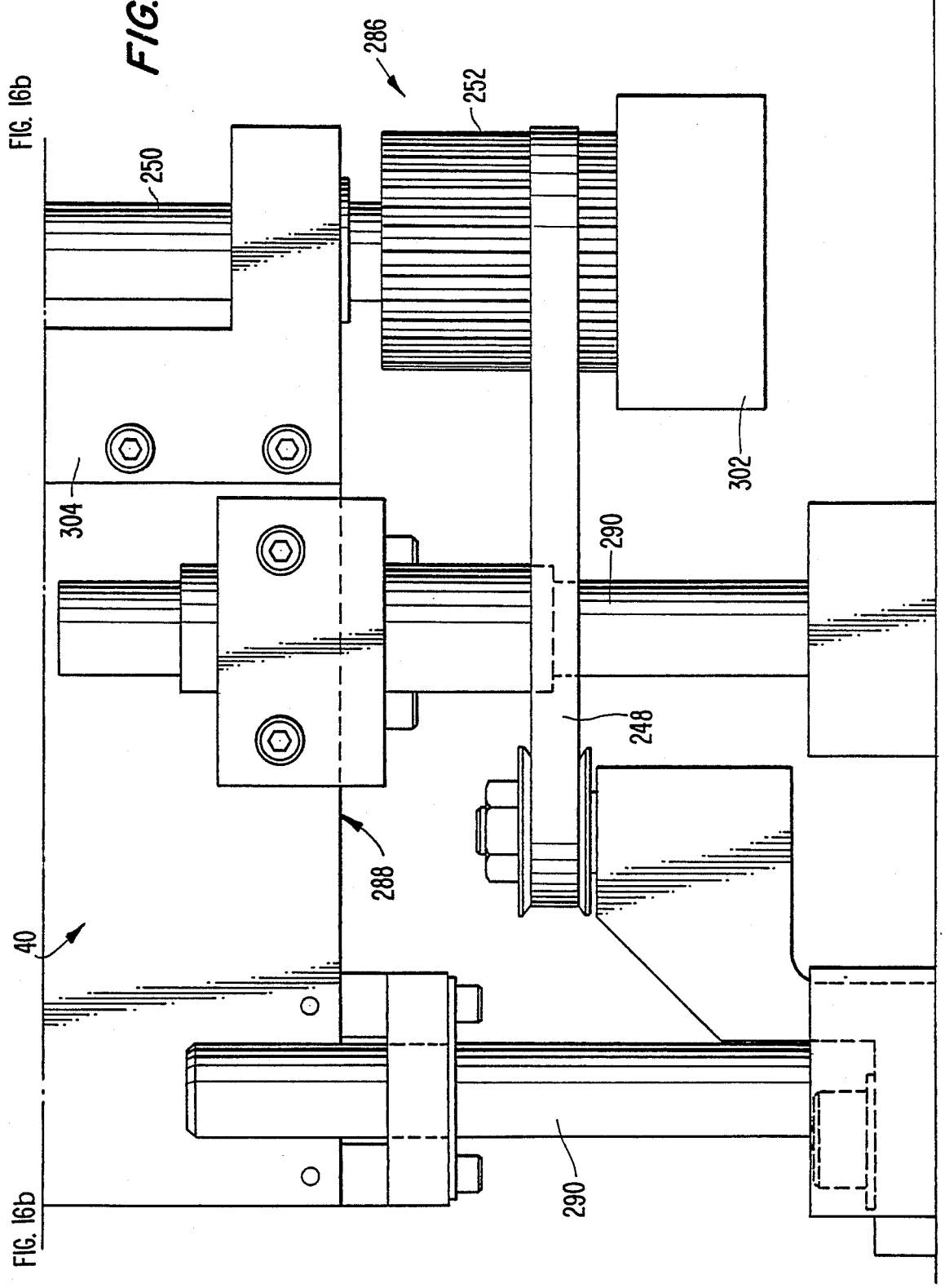

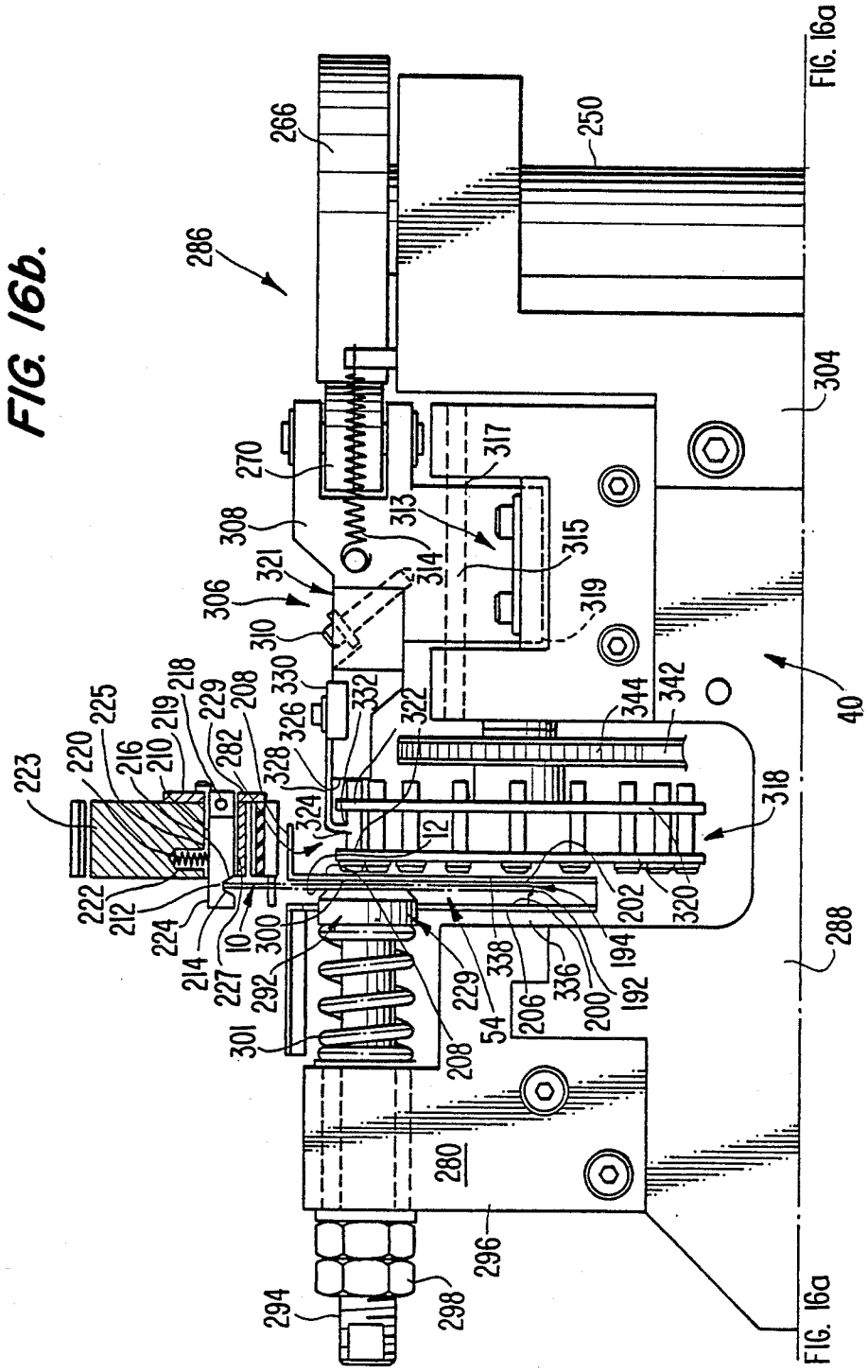

CREDIT CARD EMBOSSING AND RECORDING SYSTEM

CROSS-REFERENCE TO RELATED APPLICATION

Reference is made to application Ser. No. 820,705 entitled "Credit Card Embossing System", now U.S. Pat. No. 4,686,898, which was filed on Jan. 21, 1986, which is assigned to the assignee of the present application. The disclosure of application Ser. No. 820,705 is incorporated herein by reference in its entirety.

BACKGROUND OF THE INVENTION

1. Field of the Invention

The invention relates to machines for the preparation of cards with embossed alphanumeric text and one or more tracks of magnetically recorded digitally encoded information. Cards of the aforementioned type are known conventionally as credit cards.

2. Description of the Prior Art

The assignee of the present invention has marketed an embossing system with the model identification of the Model 1803. That embossing system is characterized by a high throughput of embossed cards, is smaller in size than its predecessors used for embossing cards such as credit and promotional cards, has low energy consumption, low cost and high embossing accuracy. The Model 1803 is described in detail in application Ser. No. 820,705. The Model 1803 does not have a magnetic recording station for recording one or more tracks of digitally encoded characters on the magnetic recording medium typically found on a conventional credit card. Embossing systems for making credit cards which include a magnetic recording system are more versatile than the Model 1803 for the reason that they can be used for both the making of promotional cards, which do not have a magnetic recording medium and credit cards. Currently hundreds of millions of credit cards and promotional cards are made each year.

An important feature of the Model 1803 is the use of single card transport mechanism to move cards between successive in line embossing units for embossing multiple lines of alphanumeric characters with one line being embossed with OCR characters of one pitch and two lines of alphanumeric characters of a second pitch. While the card transport mechanism has proved satisfactory in operation, its cost of manufacture has been relatively high because of the use of multiple rolling supports for each of a plurality of card gripping units and cams for activating and deactivating the card gripping functions of the card gripping units.

The Model 1803 transport mechanism establishes a horizontal reference position of the individual cards with respect to the individual embossing units by a pin which extends orthogonal to the direction of travel of a belt carrying the card gripping units from the rear portion of a trailing card gripping unit attached to the belt. This mechanism, while being adequate for a system for embossing promotional cards which do not have precise tolerances for the beginning and ending of embossed and magnetically recorded digitally encoded tracks of characters is inadequate to establish requisite positional tolerances for embossed lines of characters and magnetically recorded tracks in credit cards. The manufacturing operation of the belt in the Model 1803 does not permit the accurate location of the card gripping unit to a center to center spacing of adjacent pins that is necessary to meet embossed and magnetically recorded track locations for credit cards.

The stacker for the Model 1803, which collects the completed embossed cards, has a surface for receiving the embossed cards in the same horizontal plane as the transport path of the embossed cards through a topping station. This system has the disadvantage that the frictional forces between adjacent embossed cards can be so high to interfere with the individual cards being properly discharged from the topper transport unit into their proper position on the surface in the stacker.

Certain credit cards, such as AMERICAN EXPRESS, have the account number characters indented on the back surface by the joint action of a male punch which penetrates the back surface without appreciably deforming the front surface and an anvil which impacts the front surface to provide support. A ribbon is used to apply highlighting to the indented characters to make them visible. This embossing is known as "indent printing".

Commercial embossing systems for making credit cards have one or more pairs of embossing wheels for embossing separate lines of 7 and 10 pitch characters including the customer's name, account, expiration date and organization affiliation in 10 pitch alphanumeric characters, the customer's account in 7 pitch OCR characters and indent printing of the account number in 10 pitch characters. These systems activate both the male and female character forming elements by a pair of movable elements such as pivotable arms. The embossing wheels are positioned, by one or more shaft encoders, in the imprinting position for the desired 7 or 10 pitch character or the desired indent character to be printed. The one or more embossing wheels require complementary sets of parts for the activation of both the male punch and anvil for indent printing which complicates the structure and increases the cost to perform indent embossing. The Model 1803 embossing system manufactured by the assignee of the present invention does not perform indent printing.

U.S. Pat. Nos. 4,180,338 and 4,378,733 disclose embossing systems with character sets being carried by a pair of wheels.

The Model 15000 embossing system manufactured by Data Card Corporation has a separate station for performing indent printing. The specification of the vertical location of the indent printing line on a credit card prevents the use of a common support shaft for the pair of wheels respectively carrying the male and female embossing elements. The vertical location of the line of indent printing is so close to the top of the card that the bottom edge of the card interferes with the axis of rotation of the pair of wheels to prevent passage between the wheels. The Model 15000 uses a pair of embossing wheels which are respectively driven by separate shaft encoders that respectively carry a male indent embossing element and a movable anvil. Because a common shaft could not be used, it was necessary to use a second expensive shaft encoder for each of the individual wheels of the indent printer in order to maintain proper position of the characters for embossing.

Embossing systems which use a single pair of wheels to emboss all characters, including indent type characters, cannot use a common support shaft to bear the high forces present in embossing the non-indent characters. Without a common support shaft, it is necessary to employ massive support structures to bear the high forces present during embossing non-indent type characters. The Data Card Model 15000 uses this type of design.

In the credit card industry it is essential that the digitally encoded magnetically recorded tracks of characters must be recorded with total accuracy without dropouts being present. Verification systems for determining the accuracy of recording the tracks of digitally encoded data on a magnetic recording medium of a credit card in embossing systems are known. A first type of system uses a recording head which records digital data on the magnetic recording medium of a credit card and a separate playback head physically displaced from the recording head. With this system the previously recorded magnetic recording medium of the credit card is played back by the playback head for verification of the accuracy of the recording process. The data card Model 1500 and 15000 embossing systems uses the aforementioned verification system. The played back data is compared with stored data which was desired to be recorded to complete the verification process. A second type of system is exemplified by that disclosed in U.S. Pat. No. 4,518,853 which has been utilized in the Data Card Corporation Model 300 embossing system. This system uses a single fixed magnetic head which records the digital data on the recording medium on the first pass of the card past the head and verifies the accuracy of the recording with a second pass of the card past the head in the same direction as recording with the played back data being compared with the stored source of the data which was desired to be recorded.

Both of the aforementioned systems have disadvantages. The first system requires additional space for the separated heads which adds to the expense of the system and affects throughput. The second system has the disadvantage of requiring four passes of the card past the record head to complete the recording and verification process which also affects throughput.

Verification systems for recorded data are also known outside the credit card industry which use two physically separated magnetic heads which are moved in unison to perform the recording and verification process of encoded digital data. The first head records the digital data. The second head reads the data which has previously been recorded. The data which is read by the second head is compared with data stored in memory which was the source of the data to be recorded. The aforementioned technique of verification of the accuracy of the recording of data using two heads would have disadvantages in an embossing and encoding system for credit cards wherein individual cards are sequentially processed. In the first place, in order to read and write with two heads while processing the same card requires the adjacent heads to be magnetically shielded from each other to avoid cross-coupling that could introduce error into the verification process. Second, the physical separation of record and playback heads to respectively record and playback from the same card or adjacent cards would increase the length of the transport system from the source of the blank cards to the topping station which could affect throughput. In the situation where the heads would record and play back from adjacent cards, the transport system path length would be elongated by more than a card length.

U.S. Pat. No. 3,579,211 discloses a system for verifying the accuracy of the recording process of single multibit characters on a magnetic tape which reverses the direction of tape motion for the playback of a recorded character. A single magnetic head records a single digitally encoded character by movement of the tape in a first direction and plays back the single recorded character for verification of the accuracy of the recording process by movement of the tape in a second direction opposite to the first direction. This patent is directed to verification of the accuracy of the recording of a single multibit character at a time and does not disclose the use of a check character in the process of verification of a string of digitally encoded multiple characters of digital data stream by playback of the recorded data with movement of the magnetic recording medium in the opposite direction.

Prior to description of the present invention, it is important to understand the layout of the front and back sides of a conventional credit card such as, but not limited to, AMERICAN EXPRESS. Credit cards have up to four lines of embossed alphanumeric characters comprised of an OCR 7 pitch account number and two or three lines of 10 pitch alphanumeric characters identifying the customer name, expiration date and optionally the customer's group affiliation and one line of 10 pitch indent printing which typically is located on the back surface.

FIG. 1a illustrates the front surface of a typical credit card 10 of the above-referenced type which is embossed with the present invention. As illustrated, the card 10 has a format of a conventional credit card. The line 14 is the account number which is embossed with numeric characters of 7 pitch with center to center spacing of 1/7 of an inch. Two additional lines 16 are embossed with alphanumeric lines of characters of 10 pitch with a center to center spacing of 1/10 of an inch. These lines typically identify the expiration date of the card and the customer's name. One additional line 18, which identifies the customer's affiliation, may be embossed. The legend at the bottom of the card is marked in units of distance that the transport unit for the cards moves during the embossing of 7 and 10 pitch characters in the Model 1803 described above and in the present invention. The "0" position represents the left-hand margin which is specified by industry specification and the "180" represents the right-hand margin which is also specified by industry specification. The movement of the card transport unit in terms of the basic unit of distance is described below.

FIG. 1b illustrates the back surface 20 of the credit card of the above-referenced type which is printed with indent characters of the account number and magnetically recorded with three tracks of digitally encoded characters. The three tracks are contained on a magnetic recording medium 22. The layout of the three tracks is described below in conjunction with FIG. 2. The indent printing 24 is formed by a male printing element which forces a ribbon bearing a black plastic coating into the surface of the back surface 20 to produce a blackened indented print of the account number. The front surface 12 of the card is not appreciably deformed as a consequence of the front of the card being forced into surface contact with a fixed anvil as the indent character male element impacts the corresponding area on the back surface.

FIG. 2 illustrates a breakdown of the information content of the tracks 1, 2 and 3 of digitally encoded characters which may be present on a credit card. The information to the right of the track identification number respectively states the recording density in bits per inch, the number of bits per character and the maximum character number of each of the tracks. The tracks 1, 2 and 3 are recorded with the above-referenced configuration in accordance with the industry standard discussed below in FIGS. 3-5. Track 1 was developed by the International Air Transport Association (IATA). Track 2 was developed by the American Bankers Association (ABA). Track 3 was developed by the thrift industry. Fewer characters than the maximum number illustrated in FIG. 2 are typically used with the track length of encoded characters being proportional to the number of characters.

FIG. 3 illustrates a detailed breakdown of the information content of track 1 described above with reference to FIG. 2. Track 1 begins with a start sentinel SS which is encoded as a % character, followed by a format code FC, followed by a field separator or FS which is encoded by a left parenthesis character, followed by the card holder's name, followed by another field separator, followed by additional data, followed by an end sentinel ES, which is encoded by a question mark character, and concluding with longitudinal redundancy check character LRC. The longitudinal redundancy check character LRC is formed by the sequential calculation of EXCLUSIVE OR function of each of the bits of the 78 characters preceding the LRC. The LRC is calculated by the corresponding encoding bits of the first and second characters being exclusively ORed together, followed by the third character being exclusively ORed with the resultant of the previous EXCLUSIVE OR function, etc. until all of the characters have been processed by the EXCLUSIVE OR logic function. The LRC is a type of "check character" which is a unique function of the encoded characters which precede the LRC. The LRC character is an industry specification for verification of the accuracy of the recording process.

FIG. 4 illustrates a detailed breakdown of the information content of track 2 described above with reference to FIG. 2. The track 2 contains SS, PAN, FS, Additional Data, ES and LRC fields of the same general purpose described above with reference to FIG. 3. Track 2 omits the FC field found in track 1 described below. The LRC is calculated in a manner analogous to the LRC of track 1 described above.

FIG. 5 illustrates a detailed breakdown of the information content of track 3 described above with reference to FIG. 2. The LRC is calculated in a manner analogous to the LRC of FIG. 1.

The recording of each of the tracks begins with the start sentinel SS and ends with the LRC. Industry standards specify that the centerline of the first data bit of the SS for each track is located 0.293±0.20 inches from the right-hand margin and the centerline of the last bit of the LRC is located no closer to the left-hand edge than 0.273 inches.

The encoding technique for each track is a two frequency coherent phase recording in which the data is comprised of data bits and clocking bits together in one signal. An intermediate flux transition occurring between clocking transitions signifies a high level (one) and the absence of an intermediate flux transition signifies a low level (zero). The data for each track from the SS to the LRC is recorded as a continuous sequence of encoded multibit characters without intervening gaps. The encoding technique is described in detail on pages 8-10 of the Aug. 30, 1975 publication of the American National Standards Institute, Inc. entitled American National Standard Magnetic-Stripe Encoding for Credit Cards.

The portion of the magnetic recording medium which precedes the first bit of the start sentinels SS of each track 1, 2 and 3 and the portion of the magnetic recording medium which follows the last bit of the longitudinal redundancy check character LRC is recorded with successive binary zeros. The first bit of the SS is always chosen as a "1" to mark the beginning of each track.

SUMMARY OF THE INVENTION

The present invention is an improved system for embossing credit cards with alphanumeric characters, including printing of indent type characters and for recording one or more tracks of digitally encoded characters on a magnetic recording medium disposed on the card. The system has low energy consumption, high embossing and recording accuracy and is lower in cost than prior art high throughput embossers used for embossing credit cards.

High throughput is achieved as a consequence of several attributes of the invention. A compact magnetic stripe recording station and close spacing between multiple embossing units which each emboss a different line of characters minimizes transport time of cards through the system. Recording and playback with a single magnetic head assembly provides the most compact spacing in the magnetic recording station. Verification of the accuracy of the recording of the encoded data by playing back the recorded data by movement of the head assembly in a direction opposite to the direction of recording minimizes the time required to transverse the head assembly to complete the recording process. The process for verification of the recording accuracy of one or more tracks is dependent on the ability to recognize the playback of a digitally encoded check character from the played bit streams during movement of the head assembly in a direction opposite to the direction of movement during recording. Once the check character is recognized, the following characters are compared sequentially as they are played back with stored characters which were the source of the characters to be recorded. This process uses the programmed microprocessor of the recording station controller.

The card transport mechanism of the present invention is less costly than the card transport mechanism described in Ser. No. 820,705 which is found in the assignees Model 1803 embossing system. The transport mechanism provides both horizontal and vertical datum positions for each card being embossed by multiple in line embossing units without numerous roller bearings, moving parts and cams which characterized the transport mechanism of the Model 1803. A position adjustment of the horizontal datum position of the cards with respect to the belt of the card transport unit permits an accurate center to center spacing to be achieved that is necessary to meet the specifications of credit cards for the location of embossed characters without a high cost manufacturing process for the belt.

The stacking station of the present invention has the advantage over the stacking station of the Model 1803 in that the cards fall from the horizontal card transport path through the topping station to an inclined surface on the stacking station which minimizes binding between adjacent cards which could interfere with their being properly stacked. Binding of the embossed characters is minimized between a card being discharged from the topping station transport unit and the last card received by the stacking station because the characters are not aligned at the time of discharge with gravity supplying sufficient energy to have them properly stacked.

The indent printer of the present invention has a simplified structure as compared to the prior art indent printers which move both the male punch elements and the anvils to print indent type characters. The structure of the anvil in the present invention is fixed. A single movable element is used to activate the chosen male punch element which is selected by movement of a single wheel to a circumferential position of the movable element.

A recording system for embossing blank cards with a plurality of vertically separated horizontally disposed lines in which characters are to be embossed with at least one line being embossed with characters of a first pitch and at least one line being embossed with characters of a second pitch and for magnetically recording digitally encoded information on one or more tracks of a recording medium disposed on the card in accordance with the invention includes a card supply for feeding blank cards to be embossed from a pickup station to a recording station where the one or more tracks are recorded, the recording station having a recess for receiving individual blank cards which are fed by the card supply and holding the individual cards in a fixed recording position while the one or more tracks are recorded; a card transporting unit for receiving blank cards to be embossed from the recording station and for transporting the cards received from the recording station along a card transport path to a plurality of separate embossing positions and to a position where embossing is completed; a recording mechanism mounted in proximity to the recording station, the recording mechanism having a head assembly including a head for recording and playback which is movable along the magnetic recording medium of a card to cause digitally encoded information to be recorded on the one or more tracks of the magnetic recording medium when moved in a forward direction and to be played back from the magnetic recording medium when moved in a reverse direction; a plurality of card embossing units each disposed at a separate one of the embossing positions disposed along the card transport path, each card embossing unit being vertically positioned with respect to the card transport path to emboss a different one of the horizontally disposed lines of characters on each card with either the first or the second pitch, at least one of the horizontally disposed lines being embossed with the first pitch and at least one of the horizontally disposed lines being embossed with the second pitch; and a controller coupled to the card supply mechanism, the recording mechanism and the card transporting unit and the plurality of card embossing units for controlling the card supply mechanism to feed blank cards from the pickup station to the recording station, the recording of the one or more tracks of the recording medium by activating the head transporting mechanism to move the head assembly in the forward direction while the head records the tracks, the playback of the recorded information by the head by activating the head transporting mechanism to the head mechanism in the reverse direction and verification that the information which was recorded is that which was desired to be recorded by comparing the played back information with the information which was desired to be recorded which is stored in storage, the transporting of the cards received by the card transporting unit from the recording station to the separate embossing positions along the card transport path and the position where embossing is completed and the plurality of card embossing units to emboss the plurality of lines on each blank card.

The card transporting unit includes a card transporting channel extending from the ready station along the card transport path past each of the plurality of card embossing units for conveying cards past each of the plurality of embossing units and the card transporting channel is defined by mechanisms for engaging opposed edges of individual cards. The mechanism for engaging opposed edges of individual cards comprises a fixed card edge guiding unit extending from the ready station along the card transport path past each of the plurality of card embossing units, the fixed card edge guiding unit establishing a vertical reference position of the cards along the card transport path with respect to each of the plurality of card embossing units and engaging one of the opposed edges of the card; and a plurality of vertically movable card edge guiding units for biasing the other edge of the card downward to face the one edge against the vertical reference position, a vertically movable card edge guiding unit being associated with each of the card embossing units to bias the other of the opposed edges of the card toward the vertical reference position. Each vertically movable card edge guiding unit includes a pair of pivotable elements which are biased against the other edge of the card disposed at the associated card embossing unit to force the one opposed edge into contact with the fixed card edge guiding unit. The fixed card edge guiding unit is comprised of a horizontally extending channel which is disposed in a straight line defining the vertical reference position of the cards during embossing and indent printing, the horizontally extending channel being disposed on an infeed side and a discharge side of each embossing unit and each of the vertically movable card edge guiding units has a slot for receiving the other edge and the front and rear sides of the card while they are transported along the card transport path with the slot being defined by a top surface with downwardly depending sides extending from opposed edges of the surface. Each of the vertically movable card edge guiding units is pivotably mounted to a support member with the axis of rotation parallel to the card transport path and a spring engages the support member and each of the pivotable elements to force the slot of each of the vertically movable card edge guiding units to engage the other of the opposed edges of the card to force the one opposed edge into contact with the vertical reference surface.

A card engaging mechanism is provided having a plurality of card engaging projections attached to a belt at evenly spaced locations. The projections extend orthogonally from the direction of motion of the belt along the card transport path and engage an edge of a card at the ready station when the belt is moved after the card is positioned at the ready station to establish a horizontal reference position of the card with respect to the belt throughout embossing by the plurality of embossing units. The spacing between the card engaging projections is adjustable to permit spacing between successive card engaging projections to be adjusted to the uniform spacing desired between embossing units. The adjustment is provided by each card projection being rotatably attached to the belt within a recess extending within the belt orthogonal to the direction of travel with a portion of the projection which engages a card being eccentric to the recess so that rotation of the projection varies the spacing between the projection and adjacent projections.

Preferably, the pickup station lies in a first vertical plane and the recording station lies in a second vertical plane and a mechanism is provided for forcing the card from the first plane into the second plane when the card supply mechanism feeds the card to the recording station. Furthermore, a mechanism is provided for transporting the individual cards held at the recording station in a direction orthogonal to the card transport path to a ready station wherein the individual cards are engaged by the card transporting unit. The controller causes the individual cards to be held at the ready station in a stationary position prior to engagement by the card transporting mechanism and thereafter the card transporting mechanism is activated to cause the card located at the ready station to engage the card transporting unit at a reference horizontal position. The ready station lies in a third vertical plane and a mechanism is provided for forcing the card form the second plane into the third plane when the mechanism for transporting the card held at the recording station to the ready station has reached the ready station.

The system described above further includes storage for storing data records for each card to be embossed and recorded, the data record of each card to be recorded on each of the one or more tracks of the magnetic recording medium of each card being comprised of one or more alphanumeric characters. The recording mechanism is coupled to the storage for storing data records to provide a source of digitally encoded characters to be recorded on the one or more tracks and a comparison of the characters which have been recorded with the characters which were desired to be recorded to permit verification of accuracy of the recording of the one or more tracks. The controller causes each card to have the one or more tracks recorded with digitally encoded characters stored in the storage for storing as the recording mechanism is moved in the forward direction, the characters recorded on the one or more tracks to be played back as the recording mechanism is moved in the reverse direction and compared with the characters stored in the storage for storing which were desired to be recorded. When the comparison between the recorded characters and the characters which were desired to be recorded is not a match, the controller causes the embossing units to be disabled when the card transporting unit transports the card by the plurality of card embossing units or, alternatively, when the comparison between the recorded characters and the characters which were desired to be recorded is not a match, the controller activates the recording mechanism to again record the card in which all of the desired characters were not recorded and again compare the recorded characters and the characters that were desired to be recorded.

The system further includes a detector for detecting when the magnetic head assembly moves past a reference position on a card located at the recording station during motion in the forward direction, a pulse generator for generating clock pulses for use by the recording mechanism which are used to provide the required bit densities; a counter responsive to the means for detecting when the head moves past a reference position and to the pulse generator for counting a predetermined number of pulses after the reference position on the card has been detected to identify the point where the first bit of the digitally encoded information of each of the tracks is to be recorded; and the recording mechanism being responsive to the counter to initiate the recording of the digitally encoded information upon the count reaching the predetermined count. A movable member carries a photodetector for detecting the reference position on the card, the photodetector being movable between a position that is withdrawn from the reference position to the reference position; and a mechanism for moving the movable member in unison with the recording head when the photodetector moves between the withdrawn position and the reference position. The mechanism for moving includes a spring for biasing the movable member in contact with a portion of the head mechanism during movement of the photodetector between the withdrawn position and the reference position and a stop for limiting the travel of the photodetector from contacting an edge of a card at the recording station. The movable member includes a movable element connected to the movable member which has an adjustable position parallel to the direction of travel of the head assembly for limiting the travel of the photocell detector in the forward direction.

An embossing system for embossing blank cards having two sides with a plurality of vertically separated horizontally disposed lines on which characters are to be embossed with at least one line being embossed with characters of a first pitch and at least one line being embossed with characters of a second pitch on the first side and a line having one of the pitches being indent printed on the second side in accordance with the invention includes a card supply mechanism for feeding blank cards to be embossed and indent printed; a card transporting mechanism for receiving blank cards to be embossed and indent printed from the card supply mechanism and for transporting the cards received from the card supply mechanism along a card transport path to a plurality of separate embossing positions and to a position where embossing is completed; a plurality of card embossing units and a card indent printing unit each disposed at a separate one of the embossing positions disposed along the card transport path, each card embossing unit and card printing unit being vertically positioned with respect to the card transport path to emboss and indent print a different one of the horizontally disposed lines of characters on each card, at least one of the lines on the first side being embossed with a character set of a first pitch, at least one of the lines on the first side being embossed with a character set of a second pitch and the line on the second side being indent printed with a character set of one of the pitches; a mechanism for driving the plurality of card embossing units and indent printer from a common power source which applies rotary power to each of the card embossing units and indent printer, the indent printer having a single movable element which is cyclically movable between first and second positions, a rotatable wheel mounted on a shaft and a fixed anvil between which a blank card to be embossed is moved by the card transporting mechanism, the wheel being a punch wheel carrying male indent printing elements of each of the character set printed by the wheel which are movable from a retracted position to a printing position, the indent printing elements of each of the characters to be indent printed are disposed at different circumferential positions around the wheel and a space without an indent printing element is disposed at a circumferential position which is separate from the circumferential position of the indent printing elements which is the circumferential position of the wheels when a space is to be left on a blank card, the movement of the movable member causing the cyclical movement of the indent printing elements from the retracted position to the indent printing position and back, a shaft encoding mechanism for encoding the circumferential position of the wheel with respect to a reference position and a mechanism for rotating the wheel to any one of the circumferential positions in response to a command to position the wheel for indent printing a particular character or to leave a blank space; and a controller coupled to the card supply mechanism, the card transporting mechanism and the plurality of card embossing units for controlling the card supply mechanism to feed blank cards to the card transporting mechanism, the transporting of the cards received by the card transporting mechanism to the separate embossing stations along the transporting path and to the position where embossing is completed and the plurality of card embossing units to emboss the plurality of lines on each blank card. The above described embossing system alternatively may have the indent printing unit configured to emboss the indent printing line on the front surface of the card. The fixed anvil is biased against the first side of the card being indent printed by the indent printing unit indent printing a line on the second side opposite the position where the male printing elements indent print the card. The card transport mechanism transports the card being printed through a space containing the axis of rotation of the wheel; and the wheel and fixed anvil are supported by a yoke which extends between the card transport mechanism.

A method for verifying the accuracy of recording encoded data on one or more tracks of a magnetic recording medium by a comparison of the recorded data with data which was the source of the data which was recorded in accordance with the invention includes storing a data record of the one or more tracks to be recorded on the recording medium, each track having a plurality of characters with each character being encoded with a fixed number of bits; calculating a check character as a last character to be recorded for each of the tracks to be recorded for the data records; recording the one or more tracks of the magnetic recording medium with the encoded characters by relative movement of a magnetic recording mechanism in a first direction with respect to each track, each track being recorded with the check character being recorded after the other characters in the track are recorded with a repeating bit pattern being recorded after the check characters; playing back each of the one or more characters of the magnetic recording medium by relative movement of the magnetic recording mechanism with respect to each track in a second direction opposite to the first direction to produce a sequence of played back bits, the bit stream for each track being shifted through a shift register associated with the track as the bits are played back with a shift register storing a number of bits equal to the number of bits for encoding a character for that associated track; comparing as each successive bit is played back from each track the check character of that track with the contents of the associated shift register until a match is detected with the check character for that track; and comparing for each track after a match is detected for each track each played back character with the corresponding storage character for that track to detect any errors in recording. The comparison for each track of each played back character with the corresponding stored character comprises storing in the shift register successive groups of played back characters which follow the check character; and comparing each character stored in the shift register with the corresponding stored character to determine if a match exists. The order of comparison of the played back characters for each of the tracks is opposite the order in which the characters were recorded. Any failure to detect a match of the recorded check character of that track within the played back track is stored as an error in the recording process and any errors in the recording of the characters other than the check character are also stored as an error in the recording process.

A card transporting system for transporting a plurality of cards which are to be embossed past a plurality of inline embossing units each disposed at a separate embossing position with each card embossing unit being vertically positioned with respect to a card transport path to emboss a different one of a plurality of horizontally disposed lines of characters on each card in accordance with the invention includes a card transporting channel extending from a ready station along the card transport path past each of the plurality of embossing units to a discharge station for conveying cards past each of the plurality of separate embossing positions, the card transporting channel comprising a fixed guideway for engaging the bottom edge of cards in the channel extending from the ready station along the transport path past each of the separate embossing positions for establishing a vertical reference position of the cards in the channel with respect to each of the plurality of card embossing units disposed at the embossing positions and a plurality of vertically movable edge guiding units for engaging a top edge of the card to force the bottom edge of the card into the fixed guideway, a vertically movable edge guiding unit being associated with each of the card embossing units to force the bottom edge of any card within the channel to the vertical reference position; and a rotatably driven belt movable in a direction along the card transport path having a plurality of card edge engaging units each for engaging a blank card to be embossed which are spaced apart by a uniform distance equal to the spacing between the card embossing units, rotation of the belt causing the successive card engaging units to engage a card at the ready station and to move the cards through the card transporting channel to the discharge station. The fixed guideway is comprised of a plurality of separate horizontally disposed guideways for engaging the bottom edge of cards within the channel which are disposed in a straight line for defining the vertical reference position of the cards during embossing, a horizontally disposed guideway being positioned on the infeed side and a discharge side along the card transport path for each of the embossing units and each of the vertically movable edge guiding units has a slot defined by a top surface for engaging the top edge of the card with downwardly depending sides extending from opposed edges of the top surface. Each of the vertically movable card edge guiding units is pivotably mounted to a support member with an axis of rotation parallel to the transport path; and a spring engages the support member and each of the card edge guiding units for forcing the top surface of each of the vertically movable card edge guiding units downward into contact with the top edge of a card located within the card transporting channel. The vertically movable card edge guiding units are spaced such that each card is continually in contact with the top surface of at least one of the vertically movable card edge guiding units as it moves through the card transporting channel. A pair of vertically movable card edge guiding units are associated with each of the card embossing units.

A system for sequentially recording a track of a plurality of digitally encoded characters each encoded with a plurality of bits in a bit stream on a recording medium by movement in a first direction of a recording and playback mechanism along the recording medium and for verifying that the recorded characters were recorded without error by movement of the recording and playback mechanism in a second direction opposite the first direction to sequentially playback the bit stream recorded in the track in an order opposite to the order of recording in accordance with the invention includes a mechanism for moving the recording and playback mechanism in a straight path from a first position to a second position to cause the track of a plurality of digitally encoded characters to be recorded on the recording medium and for moving the recording and playback mechanism from the second position back to the first position to playback the recorded track of digitally encoded characters; a memory for storing the track of characters to be recorded including a check character as the last character of the track; means for determining the check character for the track of characters to be recorded which is recorded as the last character in the track; means responsive to the recording and playback mechanism and the memory during playback for comparing the played back bit stream bit by bit with the check character until a sequence of played back bits identical to the check character is found and for comparing after the sequence of played back bits identical to the check character is found sequentially the played back characters with corresponding characters stored in the memory to determine if all the characters were recorded without error. The order of comparison of the played back characters stored in the memory is opposite to the order in which the characters were recorded. If a sequence of bits identical to the check character is not found during playback, the entire track is again recorded. If an error is found in a character within the track other than the check character, the entire track is again recorded. The means for comparing includes a shift register for storing a number of bits equal to the number of bits for recording a character on the track which has an input coupled to the recording and playback mechanism and an output with each bit which is inputted causing the discarding of the bit at the output which preceded the inputted bit by a number of bits equal to the number of bits stored by the shift register and wherein the comparison of the played back bit stream to identify the check character is made between the stored check character and the contents of the shift register as each bit is inputted and the comparison for each of the played back characters is made between a totally new group of bits stored within the register and the corresponding stored character. The means for comparing during the comparison of played back characters within the stored characters shifts a new group of bits equal to the number of bits for encoding a character each time a new character is stored with the new group of bits being determined with respect to the first played back bit following the last bit of the bit pattern in the played back bit stream which is identical to the check character.

A stacking station for receiving cards, having a first face and a second face with at least one of the faces having embossed characters protruding therefrom, from a transport system which moves the characters in a straight line in a first plane and placing the cards in a stack with adjacent cards in the stack being in contact with the first face of one of the adjacent cards contacting the second face of the other of the adjacent cards in accordance with the invention includes a tray having a surface for receiving a bottom edge of the cards and a side for receiving a leading edge of the cards to form the stack, the surface defining a second plane which is inclined with respect to the first plane; the card transport system having a mechanism for conveying the cards along the first plane which releases the cards when they move to a first reference position; the surface of the tray intersecting the first plane at a second reference position with the surface inclining downward from the second reference position; the first and second reference positions being displaced from each other by a distance such that more than one-half of a dimension of the card along the direction of travel of the straight line is past the second reference position when the card is at the first position whereby the card tips over center so that the bottom edge slides down the incline of the surface of the tray and stops against the side.

BRIEF DESCRIPTION OF THE DRAWINGS

FIG. 2 illustrates the general layout and informational content of the tracks of the magnetic recording medium of a credit card.

FIG. 8a illustrates a rear elevational view of the pickup, recording and ready stations of the present invention.

FIG. 8b illustrates a front elevational view of the pickup and recording stations of the present invention.

FIG. 11 is a top view of the card transport unit.

FIG. 12 is a front elevational view of the top portion of the card transport unit.

FIG. 13 is an expanded view of an eccentric mount of a horizontal card locating mechanism mounted on the drive belt of the transport unit.

FIG. 15 is a view illustrating the timing of the cams which drive the individual embossing units and indent printing unit.

FIG. 16a and b are a side elevational view of an indent printing unit in accordance with the present invention.

DESCRIPTION OF THE PREFERRED EMBODIMENTS

The present invention is an improved embossing and recording system which embosses a plurality of lines of alphanumeric characters located at least on the front surface of a credit card and magnetically records one or more tracks of digitally encoded characters on a magnetic stripe located on the back surface of the credit card. The invention is further usable to emboss promotional cards which do not have the aforementioned magnetic strip.

Figure 1A:
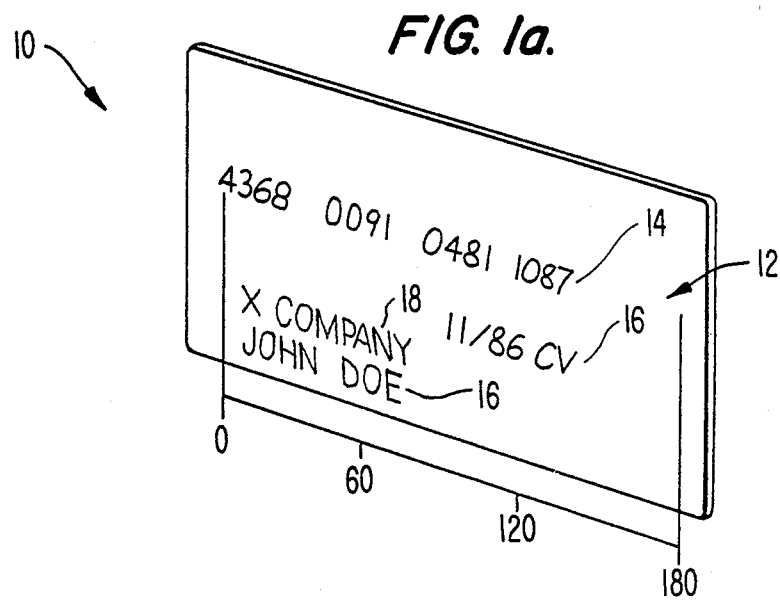
FIGS. 1a and 1b respectively illustrate the front face and rear face of a conventional credit card.
Figure 1B:
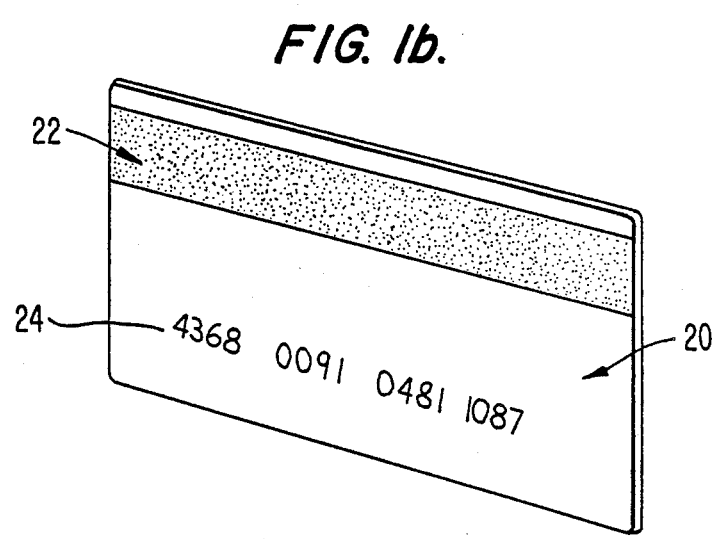
Figure 3:
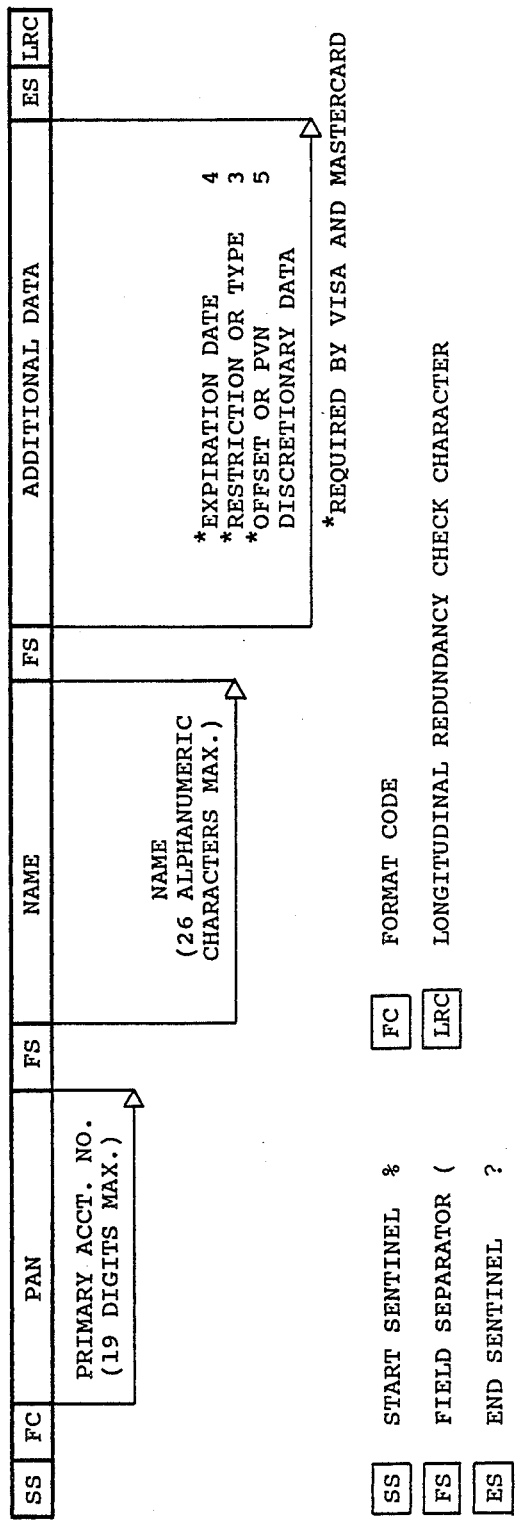
FIG. 3 illustrates the layout of the first track of the magnetic recording medium on a credit card.
Figure 4:
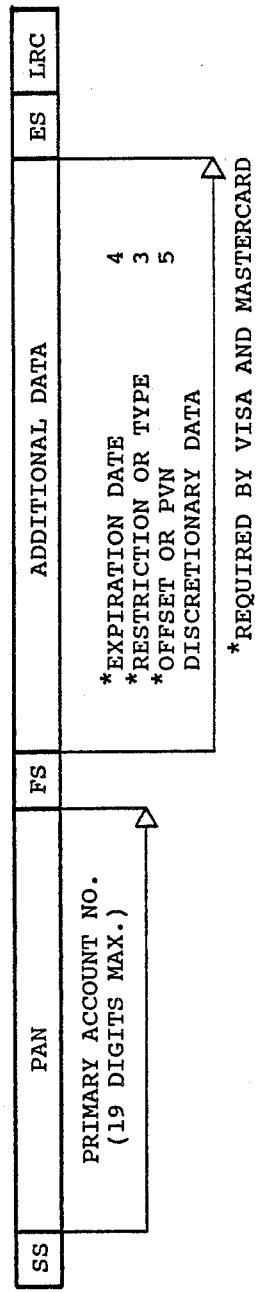
FIG. 4 illustrates the layout of the second track of the magnetic recording medium on a credit card.
Figure 5:
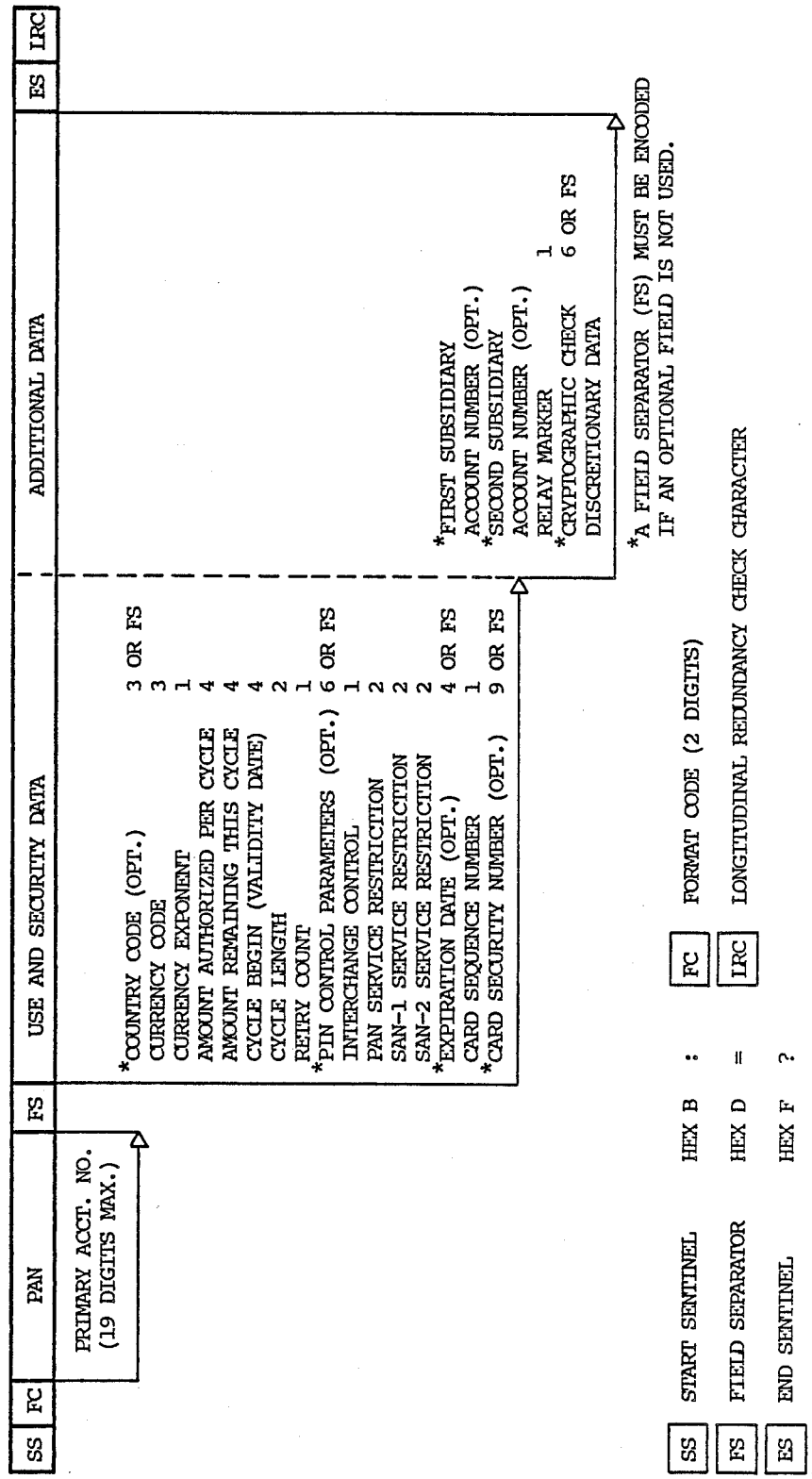
FIG. 5 illustrates the layout of the third track of the recording medium on a credit card.
Figure 6:
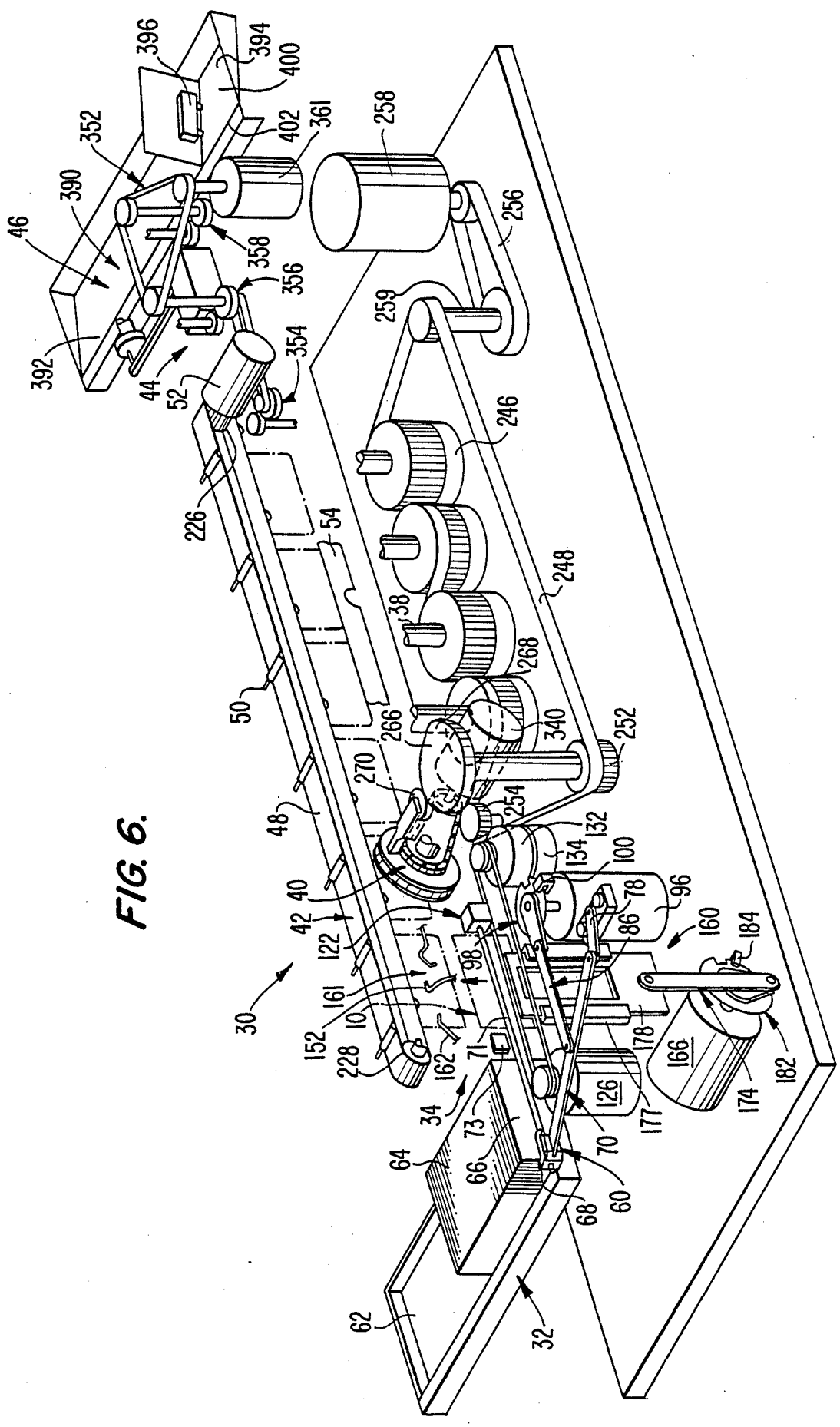
FIG. 6 illustrates a schematic view of the processing stations of the present invention.

FIG. 6 illustrates a perspective view of the stations of an embossing and recording system 30 in accordance with the present invention which has an input hopper station 32 having a tray 62 for holding a stack of 500 blank cards 64 of 0.030 of an inch thickness to be embossed and recorded and a spring loaded plate (not illustrated), a magnetic recording station 34 for magnetically recording the tracks of digitally encoded characters on the magnetic recording medium 22 of the blank cards, five equally spaced in line units with four identical embossing units 38 being used for embossing the lines 14-18 described above in conjunction with FIG. 1a of a credit card 10 and the fifth unit 40 being used for printing indent characters of line 24 described above in conjunction with FIG. 1b or embossing another line like lines 14-18, a card transport unit 42 for conveying the recorded blanks from a ready station through the in line embossers to a topping station 44 which applies topping to the embossed characters produced by embossing units 38 and a stacking station 46 which collects properly processed and erroneously processed cards in two separate sections of a tray 390. The tray 390 is of the same general construction as the tray disclosed in Ser. No. 820,705. Only the base of the embossing units 38 has been illustrated. It should be understood that the embossing units 38, unlike the indent printing unit 40, are located on the far side of card transport unit 42. The embossing units 38 are identical to those described in Ser. No. 820,705 and will not be further described in detail. The topping station 44 is identical to that described in Ser. No. 820,705 with the exception that the topping station card transport unit 352 of the present invention moves the cards into and out of the topping station 44 with only a capstan-pinch roller drive 354, 356 and 358 that applies the driving force to the rear face of the cards. The structure of card transport unit 42 has been simplified from that described in Ser. No. 820,705. The detailed construction of the magnetic recording station 34 is described below in conjunction with FIGS. 7-8. The detailed construction of the card transport unit 42 is described below in conjunction with FIGS. 10-13. The card transport unit 42 has a belt 48 having a plurality of evenly spaced card locating pins 50, which project orthogonal to the direction of motion of the cards past the embossing units 38, and indent printing unit 40 having a center to center spacing equal to the center to center spacing of the embossing units and indent printing unit and which function to establish the horizontal reference position of each card in the card transport unit during embossing. The relationship of the center to center spacing of the card locating pins which were carried by card gripping units attached to a belt and embossing units was an objective of the Model 1803 described above which in practice was not achievable. The card transport unit 42 is moved by a DC motor with shaft encoder 52 in units of distance equal to $1/p_1p_2$, wherein $p_1$ and $p_2$ are respectively the pitches (characters per inch) of the OCR line 14 and alphanumeric (A/N) lines 16, 18 and 24 of respective embossing units 38 and indent printing unit 40, under the control of a control program of a master controller which is described below in conjunction with FIG. 23. The preferred form of the control program of the present invention is similar to the control program of the master controller disclosed in Ser. No. 820,705. The belt 48 is moved, in integer multiples of the unit distance $1/p_1p_2$, between the embossing position of one or more current characters which have just been embossed and printed and the one or more closest next characters to be embossed by the motor 52 under an algorithm programmed in the master controller. The algorithm for calculating the position of the closest next character is identical to that disclosed in Ser. No. 820,705. The card transport unit 42 has a channel 54 which guides the cards in line past the indent printing unit 40 and embossing units 38. The channel 54, which guides the top and bottom edges of the individual cards during embossing, establishes the vertical reference position of the cards in the card transport unit 42 for embossing. The location of the individual lines of embossing 14-18 is established by vertical adjustment of the individual embossing units with respect to the channel 54.

Figure 7:
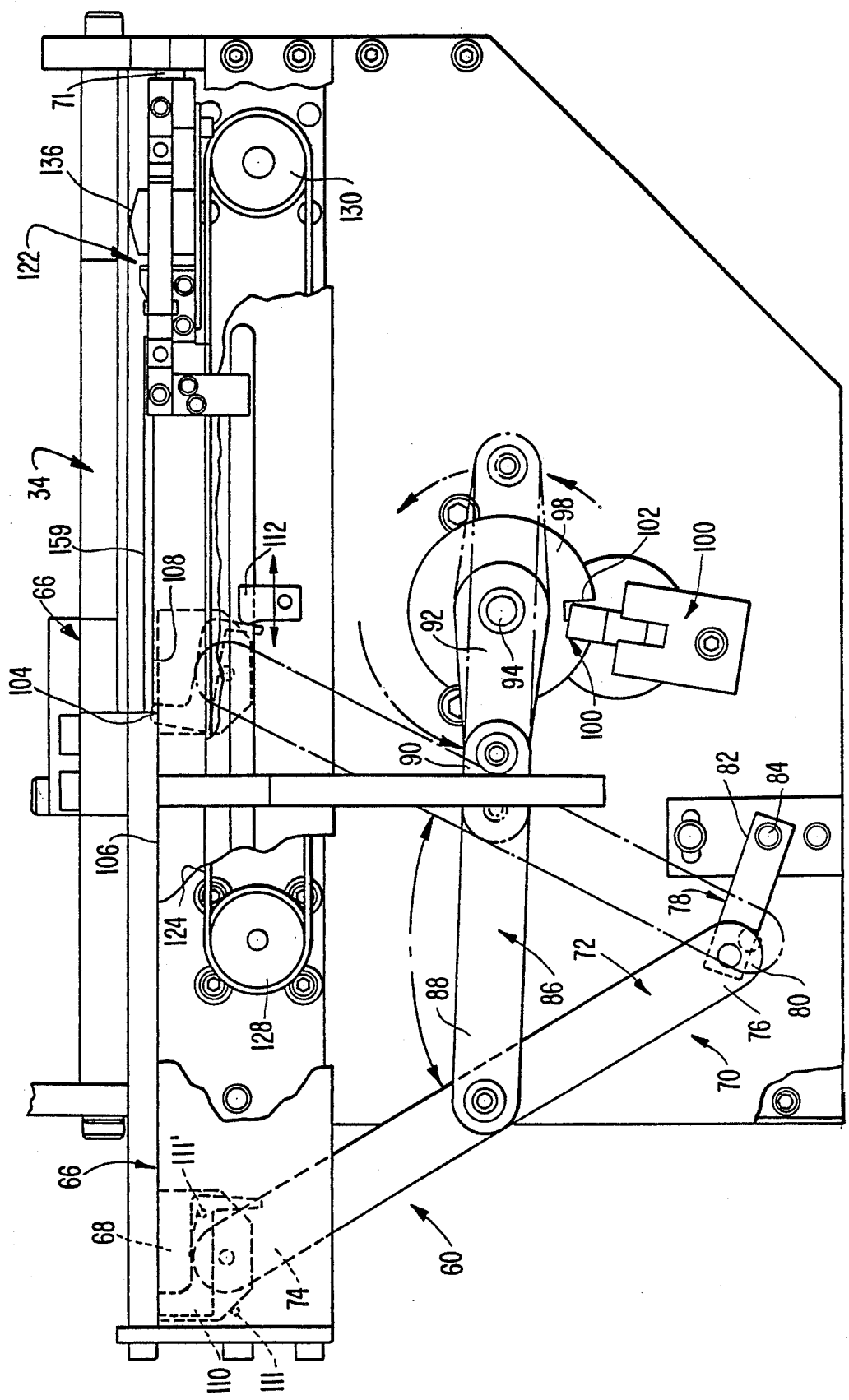
FIG. 7 illustrates a top view of the pickup, recording and ready stations of the present invention.

The function of the processing stations of the present invention is described with reference to FIG. 6. Individual cards are picked from a pickup station 66 located at the end of the stack of cards 64 held in the hopper station 32 by a card pickup mechanism 60 described below in detail with reference to FIGS. 7-9 and transported to the right to the magnetic recording station 34. The card pickup mechanism 60 has a block 68 carrying an edge (element 69 in FIG. 8b) for stripping a single card at a time from the stack of cards. A reciprocating mechanism 70 moves the picked card along a guide bar 71 in a first vertical plane through a gate 73 to the magnetic recording station 34. A stripper illustrated in FIGS. 7 and 8, is attached to the block 68, which causes the card at the magnetic recording station 34 to be separated from the block and moved into a recess, located in a second vertical plane, where the card is held to be recorded with the one or more tracks of digitally encoded characters. At the recording station 34 up to three tracks are recorded with digitally encoded characters in accordance with the tracks described with reference to FIGS. 2-5. The recording of the tracks 1, 2, 3 is by forward movement of the head assembly 122 to the left and playback for verification is by movement of the head assembly in the opposite direction back to the initial position. The processing of information during recording is controlled by a pair of pulse generators, described below with reference to FIG. 8a, which produce pulse trains to control the bit density of recording along the tracks. The location of the beginning of each of the tracks is controlled by the detection of an edge of a card to be recorded and the counting of a predetermined number of pulses occurring immediately thereafter which initiates the recording process. The head assembly 122 is moved along the guide bar 71 by a DC motor with shaft encoder 126. The length of the forward and reverse strokes of the head assembly 122 is precisely controlled by measurement of the distances in units of distance of the DC motor and shaft encoder 126. The recording station controller is programmed to precisely control the length of the forward and reverse strokes to be equal. The counting of a predetermined total number of pulses from the shaft encoder 126 is used by the recording station controller to control the starting and stopping of the head assembly 122 for the forward and reverse strokes. Playback is for the purpose of verification of the accuracy of recording process by comparison of the characters actually recorded in the tracks with those which were desired to be recorded. The recording station controller is described below with reference to FIG. 24. After verification is complete, the card is elevated from the recording station 34 by a card elevating mechanism 160 to the ready station 161 of the transport unit 42 located in a third vertical plane. The individual cards are engaged at the ready station 161 by the card transport unit 42. At the ready station 161 a pair of spring members 162 force the card into a recess located in the third vertical plane. The belt 48 of the card transport unit 42 is driven by the DC motor and shaft encoder 52 to cause one of the pins 50 to engage the trailing edge of the card at the ready station 161 to move the individual cards into channel 54 where the individual lines of embossing 14-18 and 24 are embossed and printed. The encoded and embossed cards are moved to the topping station 44 where topping is applied in the manner described in Ser. No. 820,705. The encoded, embossed and topped cards are finally conveyed to the stacking station 46. The topping station 44 has a topper drive unit 352 which has three pairs of power driven rollers 354, 356 and 358 which drive the individual cards from the last embossing unit 38 to the stacking station 46. As each card leaves the nip of the last pair of rollers 358, it falls over apex 402 downward onto the surface 400 of tray 390 which is in a different plane than the horizontal plane of the transport path through the printing unit 40, embossing units 38 and topping station 44. Gate 396 is movable longitudinally along the tray 390 under the control of the master controller to collect properly processed cards in section 392 and erroneously processed cards in section 394 of the tray 390.

The preferred embodiment of the embossing and recording system 30 has provision for embossing all forms of conventional credit cards having up to 4 lines of alphanumeric characters with at least two different pitches, with one pitch being 10 selectable OCR readable numeric characters, 39 selectable alphanumeric characters which are not machine readable of the other pitch, one line of printing of numeric characters of the other pitch, and magnetically recording three tracks of digitally encoded characters. Alternatively, promotional cards with up to five lines of embossing may be made. A single line on a card is embossed or indent printed with characters of a single pitch.

The major components of the embossing system 30 are controlled by microprocessor driven controllers. The electrical control circuitry for the major components is controlled by a master controller having a programmed microprocessor with a control program similar to that described in Ser. No. 820,705. The master controller is described generally below with reference to FIG. 23. The control of the individual embossing units 38 is identical to that described in Ser. No. 820,705 with the present invention having two additional in line embossing units to permit embossing and printing of fourth and fifth lines. While the design of the indent printing unit 40 is different from the remaining embossing units 38, the control of printing of individual indent characters is identical to that disclosed in Ser. No. 820,705. The algorithm used to control the card transport unit 42 for moving the card to the closest next character of the indent printing unit 40 is common with embossing units 38. The processing of individual data records, which are the source of the characters to be embossed, indent printed, and recorded on recording medium 22, is described in detail below in conjunction with FIGS. 22 and 23. The magnetic recording station controller is described in detail below in conjunction with FIGS. 24(a)-(f).

Pickup Mechanism 60

FIGS. 6-9 illustrate the detailed assembly of the pickup mechanism 60 of the present invention. At the pickup station 66 an individual card is separated from the stack of cards 64 by the pickup mechanism 60 and transported to the recording station 34. The individual cards extend through an opening, not illustrated, where they are engaged by a knife edge 69 (FIG. 8b), which is part of a block 68. The block 68 is pivotably secured to a reciprocating mechanism 70 which is described in detail below. A card stripper 110 is pivotably mounted to the block 68 for stripping a card from engagement from the knife edge 69 when the reciprocating mechanism has moved to the recording station. The stripper 110 has a stop 111 which limits counterclockwise rotation,. about pivot point 111' which is caused by torsion spring (not illustrated) and is bifurcated into two sections which respectively engage top and bottom sections of the card to insure that the card is positively pushed into the recess 104. The card stripper 110 is activated by a stop 112 which causes it to pivot in a clockwise direction to force the card from a first vertical plane defined by wall 106 into a recess 104 within a second vertical plane defined by a second wall 108 which receives the card for recording. The stop 112 is adjustable in location to permit the activation point of the stripper 110 to be varied. Only one of the bifurcations of the card stripper 110 strikes the stop 112. The reciprocating mechanism 70 has a first arm 72 having a first end 74 which carries the block 68 and a second end 76 which is pivotably mounted to a second pivotable arm 78 at a first end 80. The second end 82 of the second pivotable arm is pivoted about a fixed axis of rotation 84. A third arm 86 has a first end 88 which is pivotably attached to an intermediate point of the first arm 72.

The second end 90 of the third arm 86 is pivotably attached to a crank mechanism 92 which is rotatably driven by the shaft 94 of electric motor 96 which supplies the power for moving the cards from the pickup station 66 to the recording station 34. The block 68 is guided by guide bar 71. A disk 98, in conjunction with photodetector 100, provides a signal to the master controller to indicate when a complete cycle of the pickup mechanism 60 has been completed which consists of the reciprocation of the reciprocating mechanism 70 as illustrated in FIG. 7 to move a card to the right to the recording station 34 and back to the pickup station 66 for picking up another card. The photodetector 100 is of a conventional type which has a light transmitter which transmits light across a gap to a light receiver. The photodetector 100 produces a first level output when the light is blocked by an opaque object intercepting the light in the gap and a second level signal when the light is received by the receiver. The photodetector 100 initially rests in the position as illustrated wherein the receiver senses light passing from the transmitter through the notch 102 in the disk 98 to produce a high level signal. The motor 96 causes rotation of the disk 98 in a counterclockwise manner which successively produces a dark low level signal and then ultimately a high level signal caused by the passage of the leading edge of the notch through the gap between the transmitter and receiver of the photodetector. When the leading edge of the notch is sensed during rotation as a high level signal by the master controller, the master controller shuts off the motor 96 to park the reciprocating mechanism 70 in the position as illustrated. The individual card at the end of the stack of cards 64 is initially moved to the right to the point where the left-hand edge of the card falls into the recess 104 defined by the edge between surfaces 106 and 108. A more detailed explanation of the movement of the card from the first vertical plane defined by wall 106 into the second vertical plane defined by wall 108 in which the recess 104 lies is described below in conjunction with FIG. 8d. The bottom edge of the recess is the top edge 183 of the vertical lifting member 178 of the card elevating mechanism 160. The recess 104 is the pocket within which the card rests at the recording station 34. The spring biased pivotable card stripping member 110 carried by the block 68 applies force to cause the card to drop into the reces 104.

Magnetic Recording Station 34

The magnetic recording station 34 is illustrated in FIGS. 6-8. The magnetic recording station 34 performs the recording of the one or more tracks of digitally encoded characters described above with reference to FIGS. 3-5 and the verification that the correct characters were in fact recorded on the magnetic recording medium 22 of an individual card. The head assembly 122 is guided by guide bar 71 which is common to the pickup mechanism 60 described above. The head assembly 122 is driven reciprocally from the position as illustrated to the left and back by a cable 124. The cable 124 is driven by a DC motor 126 with shaft encoder which is of conventional construction. A drive pulley 128, which has several wraps of the cable 124 wrapped thereabouts, is driven by the drive shaft of the DC motor 126. The cable 124 is in the form of an endless loop with the other end wrapped around a pulley 130 which drives a first pulse source 132 for producing one of the two clock signals necessary to record the digital data on the tracks 1-3 described above with reference to FIGS. 3-5 and a second pulse source 134 for producing the other clock signal necessary for recording the remaining tracks of digital data. The location of the first bit of the first characters in each of the tracks 1, 2 and 3 is determined by counting a predetermined number of pulses produced by one of the pulse sources 132 or 134 after the leading edge of the card has been detected by a photodetector 504 described below with reference to FIG. 8b which is moved in unison with the head assembly 122 over part of the forward stroke of the head assembly. The counter is implemented within the hardware of the recording station controller described below with reference to FIG. 24. The clocking of the recording process is described generally below with reference to FIG. 22. The recording station controller also includes a programmed counter which counts a predetermined number of pulses of the DC motor with shaft encoder 126 measured from its rest position as illustrated in FIGS. 7 and 8a to signal the correct stopping place of the forward stroke of the magnetic head 136. Thereafter, the recording station controller reverses the direction of the DC motor and the programmed counter counts the same number of pulses produced by the DC motor with shaft encoder 126 which were counted for the forward movement of the head assembly during recording to cause the head assembly 122 to park in the rest position. Once the programmed counter of the recording station controller counts, on the return stroke, the predetermined number of pulses produced by the DC motor with encoder 126, which signals the return of the head assembly 122 to the rest position, the master recording station controller undertakes the activation of the card elevating mechanism 160 which is described below. At the recording station 34, a card positioning mechanism 138 establishes a vertical reference position during both the recording and playback strokes of the recording mechanism 122. The card positioning mechanism 138 has a straight section of wire 139 which is rotatably mounted within apertures within the downwardly depending sides of member 141. The card positioning mechanism 138 causes the card to be biased downward and toward the front into contact with the top edge 181 of the card elevating mechanism 160. A cam 140 is provided to the right of the head assembly 122 for deactivating the card positioning mechanism 138. A ball type cam follower 142 is attached to a bent end section (not illustrated) of wire 139. Wire 139 also has another bent end section which has a bevelled end, not illustrated, which contacts the top edge of the card to force it inward and downward when the head assembly 122 is positioned to the left to the point where the cam follower 142 is not engaging the top section 148 of the cam 140. A spring 150 is attached at one end to vertically extending wire 152 and at the other end to an arm 153 extending orthogonally from the straight section of wire 139 to apply torque to the card positioning mechanism which causes the beveled end to force a card inward toward wall 108 and downward toward the bottom of recess 104 when the cam follower 142 is not engaging the top section 148 of the cam 140. As stated above, the card positioning mechanism 138 is necessary to ensure that the card is in the proper vertical position for recording and playback of the recorded tracks of information during the verification process. The spring 162 retains the encoded cards in a vertical reference plane as illustrated in FIG. 8a.

FIG. 8b is a front view of the pickup station 32 and recording station 34 illustrating a card edge detector 500, moved in unison with the head assembly 122 between a withdrawn position as illustrated to a reference position when rotated clockwise from the illustrated position, for detecting when the head assembly passes a reference position on card. As described above, the detection of the reference position (leading edge) of the card at the recording station 34 initiates the counting by the hardware counter of the recording station controller of a predetermined number of pulses produced by either pulse generator 132 or 134 to mark the recording position of the first bit of the first character of each of the tracks. The card edge detector 500 has a movable member 502 pivoted at one end about pivot point 503 and carrying a photodetector 504 of the same type as photodetector 100 discussed above. A spring 506 biases the member 502 to rotate in a clockwise position to cause an extension 508 of the member to contact an extension 509 of the head assembly 122. A stop 510 limits the travel of the member in the clockwise direction. The stop 510 engages a bolt 512 which is threadably received within the extension 508. The bolt 512 is movable in a direction parallel to the direction of motion of the head assembly 122. As the head assembly 122 moves to the right in FIG. 8b, the head 514 of bolt 512 contacts the stop 510 to limit the travel of the photodetector 504. The bolt 512 is adjusted to limit the travel of the photodetector 504 to a point where the card intercepts the light beam transmitted by the transmitter of the photodetector but does not contact the edge of the card.

Card Elevating Mechanism 160

Figure 8C:
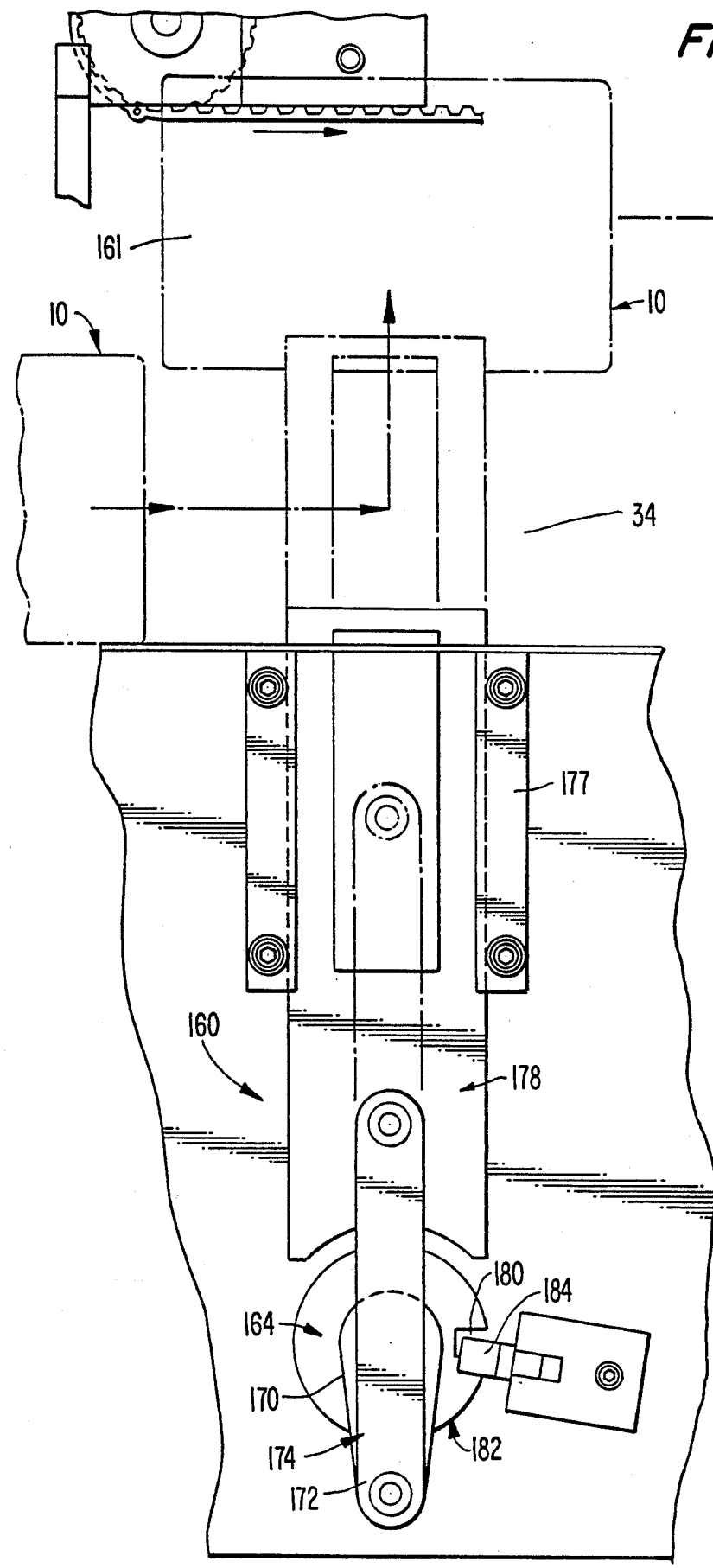
FIG. 8c illustrates a partial rear elevational view of the recording and ready stations.
Figure 8D:
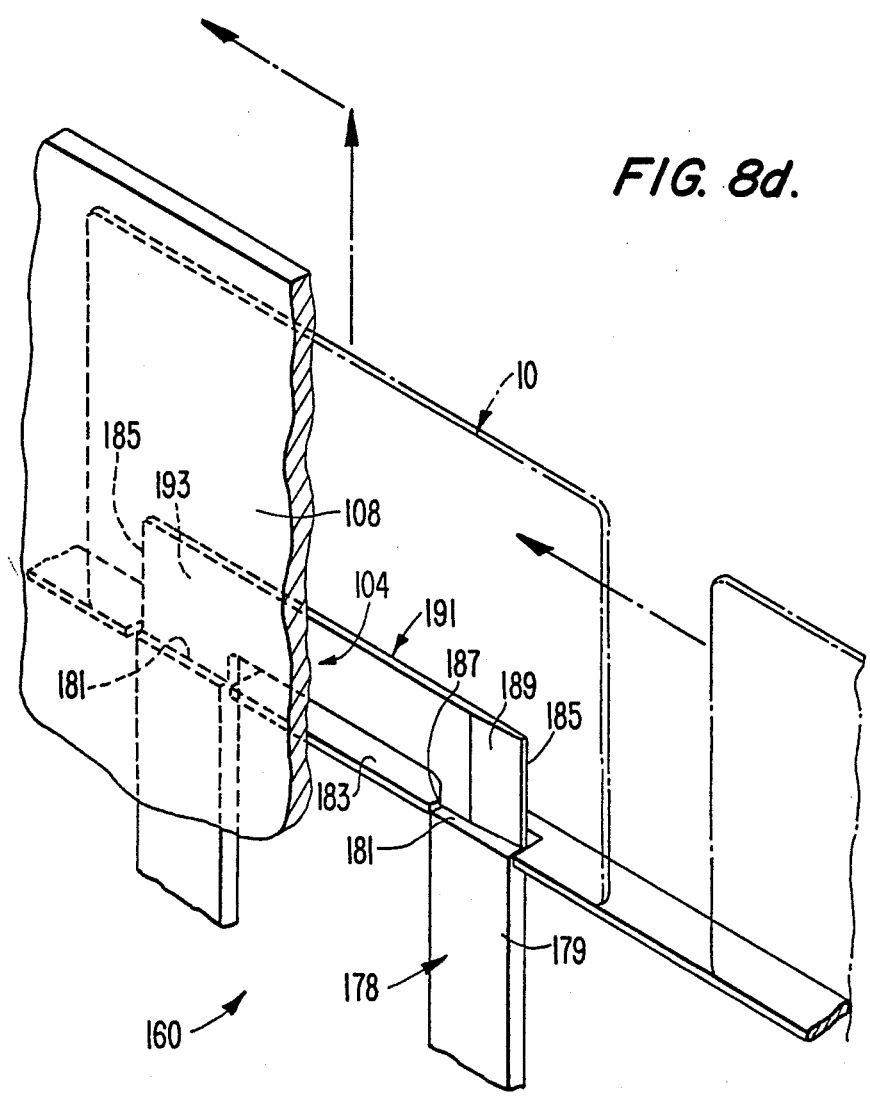
FIG. 8d illustrates an enlarged view of an elevating mechanism at the recording station.
Figure 9:
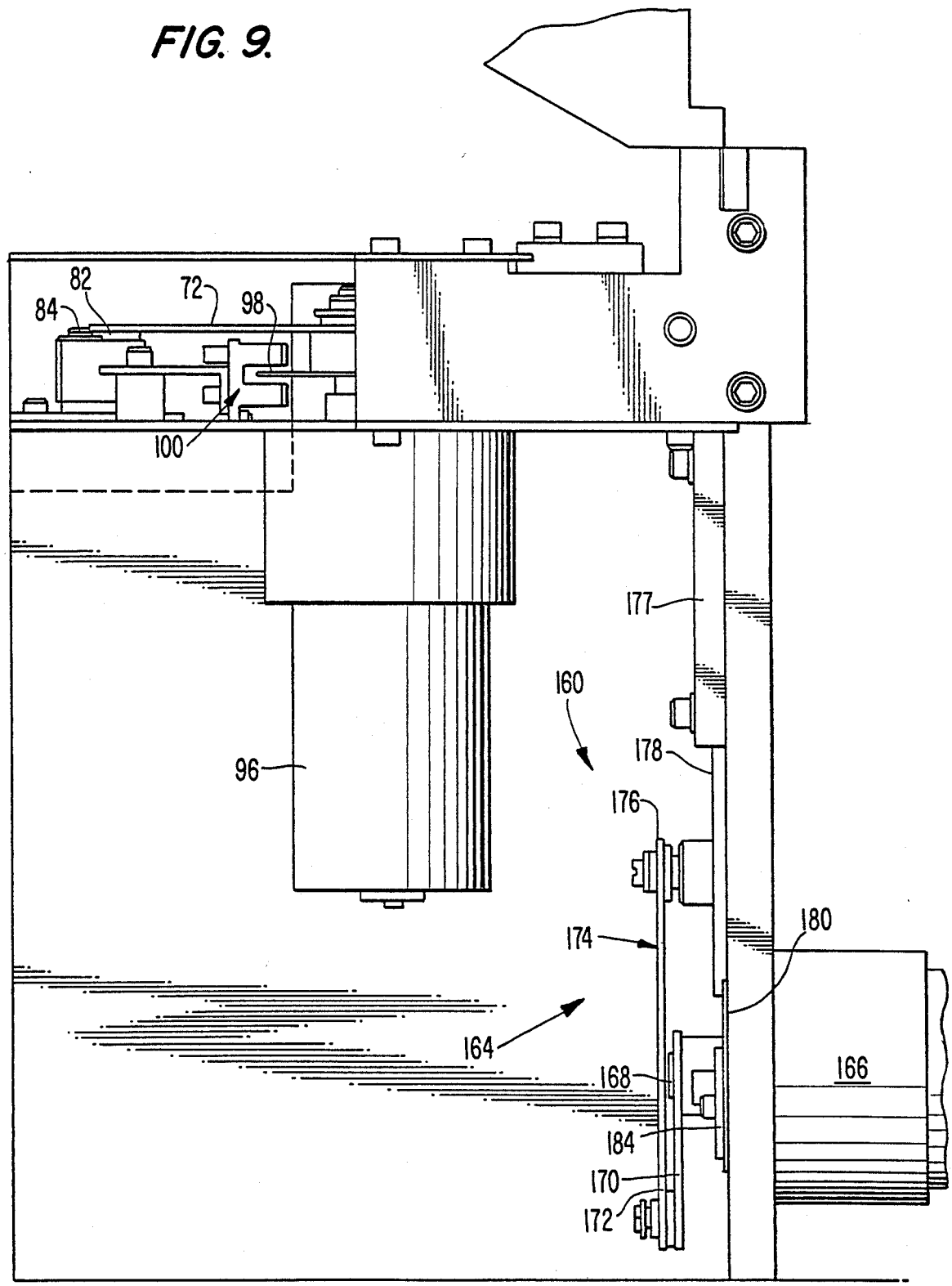
FIG. 9 illustrates a side elevational view of the pickup and elevating mechanism.

FIGS. 6-9 illustrate the detailed construction of the card elevating mechanism 160 which functions to lift the card 10 from the recording station 34 to the ready station 161 which was discussed above with reference to FIG. 6. As was discussed above with regard to the recording station 34, the activation of the card elevating mechanism 160 is not initiated until the programmed counter of the recording station controller has counted a number of pulses produced by the DC motor and shaft encoder 126 signifying that the head assembly 122 has moved back to its rest position after the completion of the playing back of the recorded information on the tracks 1, 2 and 3. The card elevating mechanism 160 lifts the card, which has been previously recorded and played back at the recording station 34, vertically upward to where it is forced by the pair of bent spring members 162 forward into a third vertical plane defined by wall 159 at the ready station 161 which is the beginning of the channel 54 of the card transport unit 42. The elevation of the card from the recording station 34 to the ready station 161 is caused by a reciprocating mechanism 164 which is powered by an electric motor 166 which is controlled by the master controller. The drive shaft 168 of the electric motor 166 is connected to a crank 170. The crank 170 is rotatably connected to the first end 172 of arm 174. The second end 176 is rotatably connected to a bifurcated vertical lifting member 178 which extends upward from the point of attachment to the second end 176 of arm 174 to the card encoding station. A pair of card bearings 177 guide the vertical lifting member 178.

With reference to FIG. 8d, the vertical lifting member has a pair of horizontally disposed surfaces 181 which are located about 0.015 inches below the bottom surface 183 of the recess 104. Each of the bifurcations has an extension 185 projecting upward through an aperture 187 in the bottom surface 183. The right hand extension 185 has a card deflecting surface 189 which contacts the leading edge of the card being transported by the pickup mechanism 60. The deflecting surface bows the leading edge of the card toward surface 108 of recess 104. Each of the extensions 185 is joined together by a horizontal connecting piece 191. The vertical surface 193 of the horizontal connecting piece holds the card within the second vertical plane of recess 104 by preventing the card from tipping toward the rear of the system. The vertical wall 108 extending from the recording station 34 to the ready station 161 holds the card within the second vertical plane of recess 104 from falling toward the front of the system.

The control of the electric motor 166 is similar to the control of the electric motor 96 of the card pickup mechanism 60 described above. A notch 180 of disk 182, which is attached to the output shaft of electric motor 166, is sensed by photodetector 184 to produce the control signal which is monitored by the master controller to control the motor. The photodetector 184 is identical to the photodetectors described above. The master controller activates the motor 166 after the head assembly 122 has returned to the park position as described above to lift the card from the recording station 34 to the ready station 161. Rotation of the disk 182 counterclockwise, as illustrated in FIG. 8c, initially causes the photodetector 184 output level to change when the notch 180 rotates past the light beam path between the transmitter and receiver to produce a signal state which is sensed by the master controller. As the rotation of the motor 166 continues, the notch 180 rotates back to a point of intercepting the light beam between the transmitter and receiver which causes a change in signal state of the photodetector 184 which is sensed by the master controller. The master controller, upon sensing the rotation of the notch back into the field of view of the light beam of photodetector 184, commands the motor 166 to stop which completes the elevation of the card to the ready station 161 and the return of the vertical lifting member 178 back to the position as illustrated in FIG. 8c. The pair of spring members 162 force the card from the second vertical plane of the recess 104 at the recording station 34 to the third vertical plane 159 (FIG. 7) of the ready station 161 out of engagement with the vertical lifting member 178 when the vertical lifting member has approached its highest point.

Card Transport Unit 42

Figure 10:
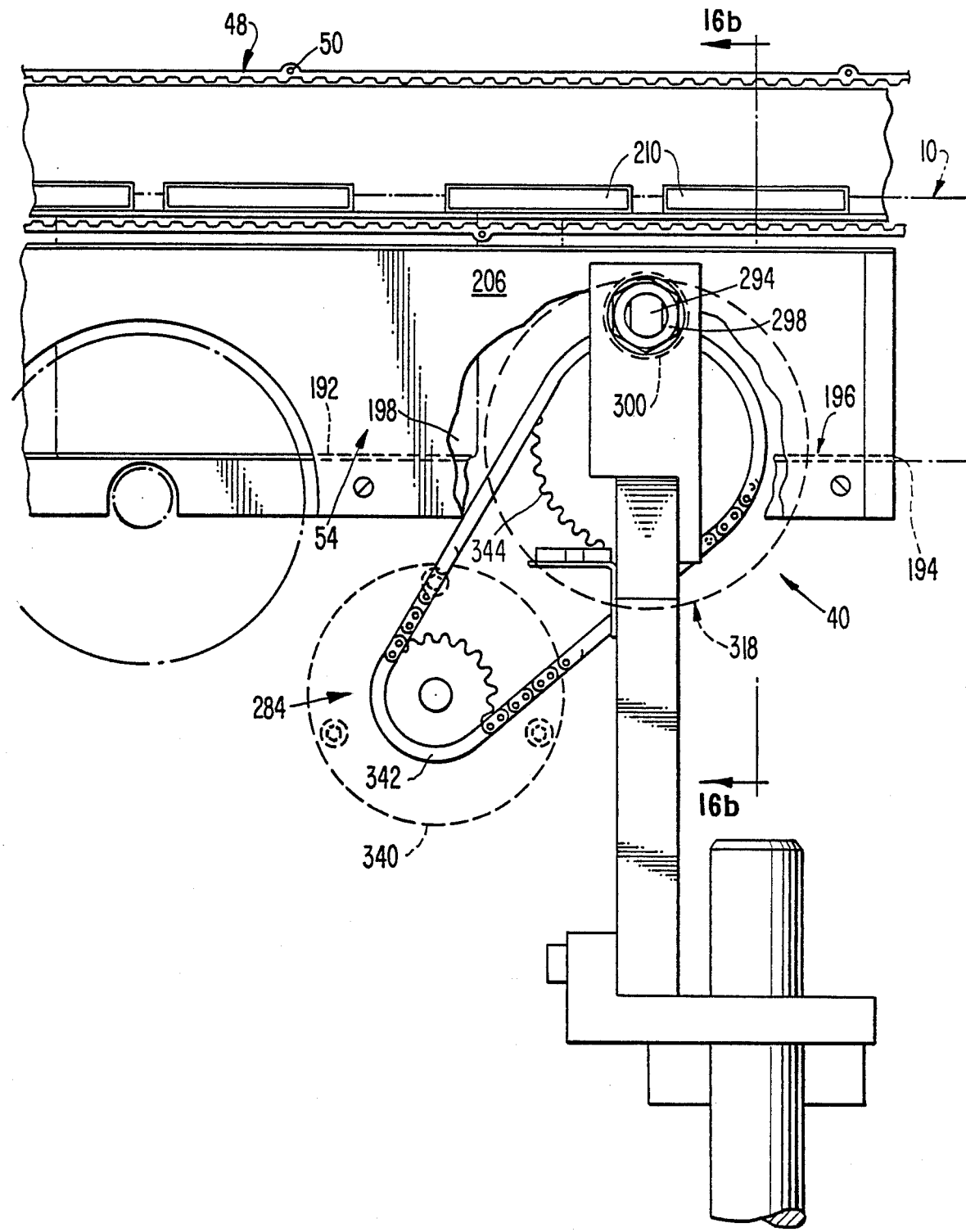
FIG. 10 is a front elevational view of a portion of a card transport unit illustrating two adjacent embossing portions with a detailed view of the indent printing unit.

FIG. 10 illustrates a front view of the transport unit 42 spanning two embossing positions with the indent printer 40 being illustrated in detail. The embossing unit 38 which is located to the left of the indent printer 40 has been omitted. The major parts of the transport unit are the belt 48 and its associated drive which is discussed in detail below in conjunction with FIGS. 11 and 12 and the channel 54 which guides the cards in a fixed horizontal and vertical reference position during embossing. The attachment mechanism to and spacing adjustment mechanism of the card locating pins 50 with respect to the belt 48 is described in more detail below in conjunction with FIG. 13. The belt 48 has a plurality of evenly spaced card locating pins 50 which establish the horizontal reference position of successive cards along the channel 54. The card locating pins 50 have a center to center spacing which is the same as the center to center spacing of the individual embossing units 38 and indent printing unit 40. In one embodiment of the invention, the desired center to center spacing of embossing units 38 and indent printing unit 40 and the card locating pins 50 is 4 inches with the spacing between pins having a tolerance of ±0.005 inches.

As illustrated in FIGS. 10 and 16b, the channel 54 has a fixed lower vertical reference surface 192 of approximately one-sixteenth of an inch in width which is defined by a guideway 194 preferably milled with a slot of approximately one-sixteenth of an inch in depth, which is mounted in line on the infeed side 196 and outfeed side 198 of each embossing unit 38 and indent printer 40 and a pair of vertically pivotable guideways 210 associated with each embossing unit 36 and indent printer 40 which apply a downward force to the top edge of a card moving through the channel to force the bottom edge of the card into the slot. The guideway 194 has a front vertically projecting surface 200 and a rear vertically projecting surface 202 which projects upward approximately one-sixteenth of an inch in height from bottom surface 192. The guideway 194 is attached between a front plate 206 and a rear plate 208 and spans the channel 54. Each pivoted guideway 210 has a horizontal surface 212 which contacts the top edge of cards moving through the channel 54, a front downwardly projecting surface 214 which extends from surface 212 and a rear downwardly projecting surface 216 which extends from surface 212. The pivot axis 218 of each vertically pivotable guideway 210 extends parallel to the transport path of the cards in the channel 54. The pivot axis 218 of the vertically pivotable guideways 210 is secured to the rear plate 219. A compressed spring 220 which is located within recess 222 of block 223, forces each associated pivoted guideway 210 downward. The compression of the spring 222 applies a downward force to top surface 224 to cause the horizontal surface 212 to force the top edge of cards downward into contact with the bottom surface 204 of the milled guideway 194. The force preferably is between two to four ounces for each of the vertically pivoted guideways 210, which ensures that sufficient friction exists between the top and bottom surfaces of the card and the surfaces 192 and 212 to maintain proper contact of the trailing edge of the card with the card locating pins 50. Approximately 0.010 inches clearance may be provided between the bottom surface 225 of block 223 and the top surface 224 of the pivoted guideway. Approximately 0.010 inches clearance may be provided between the bottom surface 227 of the vertically pivotable guideway. Transport unit 42 (FIG. 6) is pivotably mounted to permit the vertically pivoted guideways to be pivoted clockwise as illustrated in FIG. 16b. The vertically pivotable guideways 210 are spaced along the card transport path so that all cards located at embossing units 38 and the indent printing unit 40 are always engaged by a pair of pivoted guideways.

FIGS. 11 and 12 illustrate belt 48, card location pins 50 and the drive mechanism including the electric motor and shaft encoder 52 for the card transport unit 42. The movement of the belt 48 by the electric motor shaft encoder 52 is controlled in the same manner as in Ser. No. 820,705. As explained above, the belt is moved in increments of $1/p_1p_2$ wherein $p_1$ and $p_2$ are the pitches of the characters being embossed by the respective lines of embossing or indent printing. The master controller continually calculates the belt position of the closest next character(s) of any pitch, moves the belt thereto and activates one or more embossing units to emboss the closest next character in a manner identical to that disclosed Ser. No. 820,705. The toothed belt is driven by a gear 226 attached to the drive shaft of the DC motor and shaft encoder 52. An idler gear 228 supports the other end of the belt 48. The card transport unit 42 is pivoted about axis 233.

FIG. 13 is an expanded view of FIG. 12 illustrating the details of the eccentric mount 230 of the card location pins 50 within belt 48. The recess 232 is contained within a semicircular portion 231 which extends upward from the outside surface 234 of the belt 48. The inside surface 236 has teeth which mesh with the gears 226 and 228 to provide a positive drive with electric motor 52. The belt 48 may be made from rubber, plastic or other materials. The individual card location pins 50 have a first section 238 rotatably mounted within recess 232 and a second section 240 having an axis which is eccentric to the axis of the first section 238. The axis of second section 240 is required to be only a few thousands of an inch eccentric to the axis of first section 238 to provide the proper tolerance of 4±0.005 inches center to center spacing between the card locating pins 50.

Indent Printing Unit 40

FIGS. 10 and 14-17 illustrate the preferred embodiment of the indent printing unit 40 of the present invention. The indent printing unit 40 differs from the embossing units disclosed in Ser. No. 820,705 in having a fixed anvil assembly 280 instead of activated female die character elements which eliminates half of the moving parts found in the aforementioned system. The indent printing unit 40 is activated by a cam having one lobe driven synchronously at twice the rotational velocity of the embossing units 38 which are driven by a two lobed cam.

Figure 14:
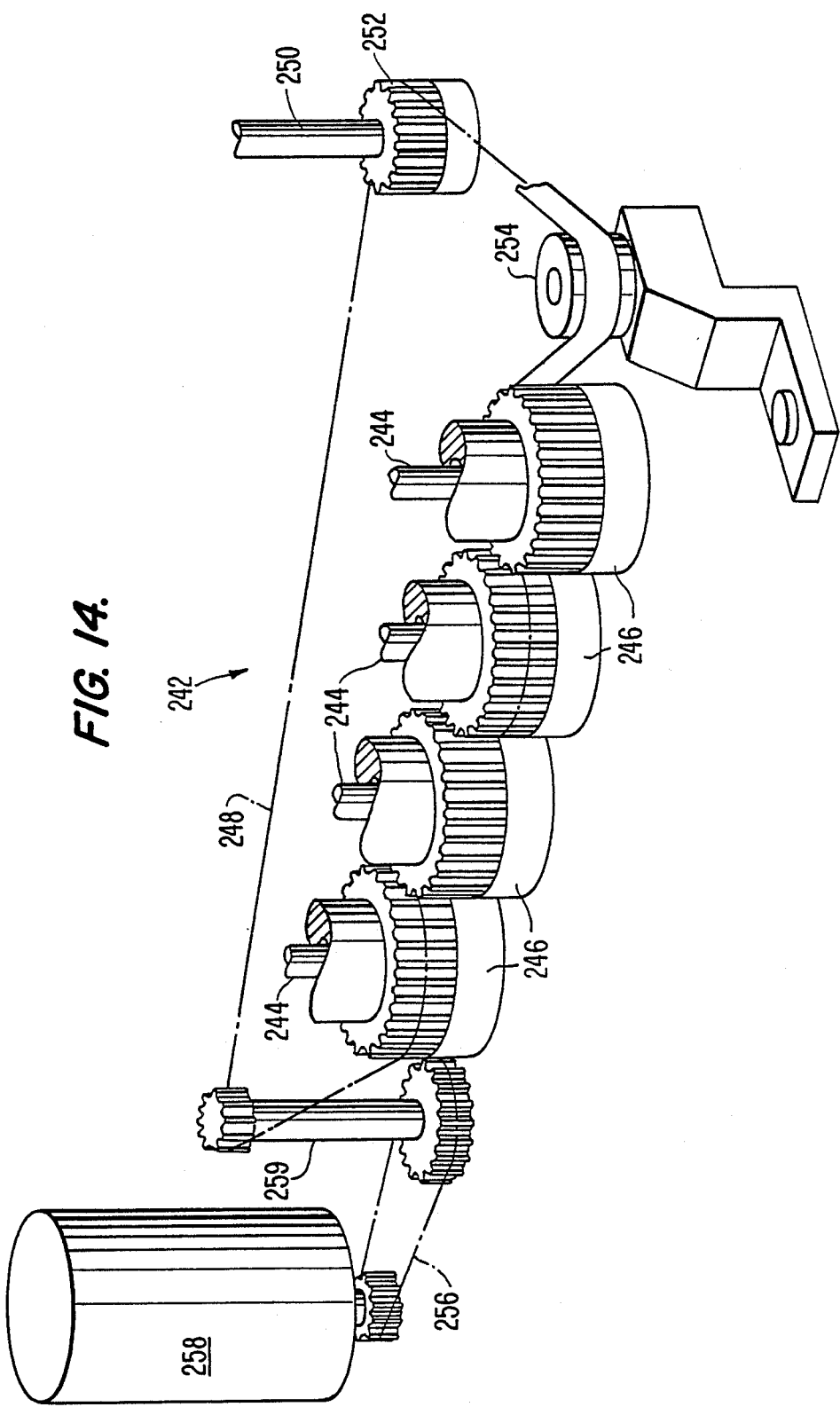
FIG. 14 is a view illustrating the common drive unit for each of the embossers.

FIG. 14 illustrates the common drive unit 242 for each of the in line embossing units 38 and indent printing unit 40. Each embossing unit 38 has a vertically extending drive shaft 244 to which is connected a gear wheel 246. The indent printing unit 40 has a vertically extending drive shaft 250 to which is connected a gear wheel 252. The gear wheel 252 is one-half the diameter of the gear wheels to cause the rotational velocity of gear wheel 252 to be precisely twice that of gear wheel 246. The belt 248 wraps around an idler wheel 254 after it leaves contact with the last gear wheel 248 prior to engaging gear wheel 252. The width of the gear wheels 246 and 252 is chosen to be substantially greater than the width of the belt 248 which permits the vertical position of the individual embossing units 38 and indent printing unit 40 to be adjusted without requiring vertical adjustment of the common drive. The gear wheels 246 and 252 are provided with sufficient mass so that their rotational inertia powers their associated units without requiring the motor 258 to have a power output necessary to supply the high power necessary only during embossing. A belt 250 couples the motor output to a drive 259 which drives belt 248. The requisite inertia of the gear wheel 252 is much smaller than that for gear wheels 246 for the reason that the forces during indent printing are much smaller.

FIG. 15 illustrates a timing diagram of the cams which drive the individual embossing units 38 and indent printing unit 40. The diagram has been simplified to omit the cam drive for the third and fourth embossing units which are identical to the illustrated second embossing unit. One of the omitted third and fourth cam drives has a disc attached thereto identical to the third embossing unit illustrated in FIG. 23 of Ser. No. 820,705 for generating RSHUT and ESHUT signals which are the timing signals used by the master controller for synchronously controlling the embossing units 38, indent printing unit 40 and card transport unit 42. The timing of the first embossing unit 38 is identical to the timing of the first embossing unit described in Ser. No. 820,705 and the timing of the second through fourth embossing units 38 is identical to the timing of the second embossing unit described in Ser. No. 820,705. The drive cams 260 for the embossing units 38 have a pair of diametrically spaced lobes 262 which simultaneously engage followers 264. Each follower 264 activates an arm (not illustrated) to respectively drive punch and die embossing elements in the manner described in Ser. No. 820,705. The drive cam 266 for the indent embossing unit 40 has a single lobe 268 which drives a follower 270 which powers the punch indent printing element in a manner described below. As described above in conjunction with FIG. 14, the rotational velocity of the cam 266 is precisely twice that of the cam 260. Because the rotational velocity of cam 266 is twice that of cams 260, the single lobe 268 drives cam follower 270 synchronously and in phase with the other 10 pitch embossing units such as the second embossing unit illustrated in FIG. 15.

Figure 17:
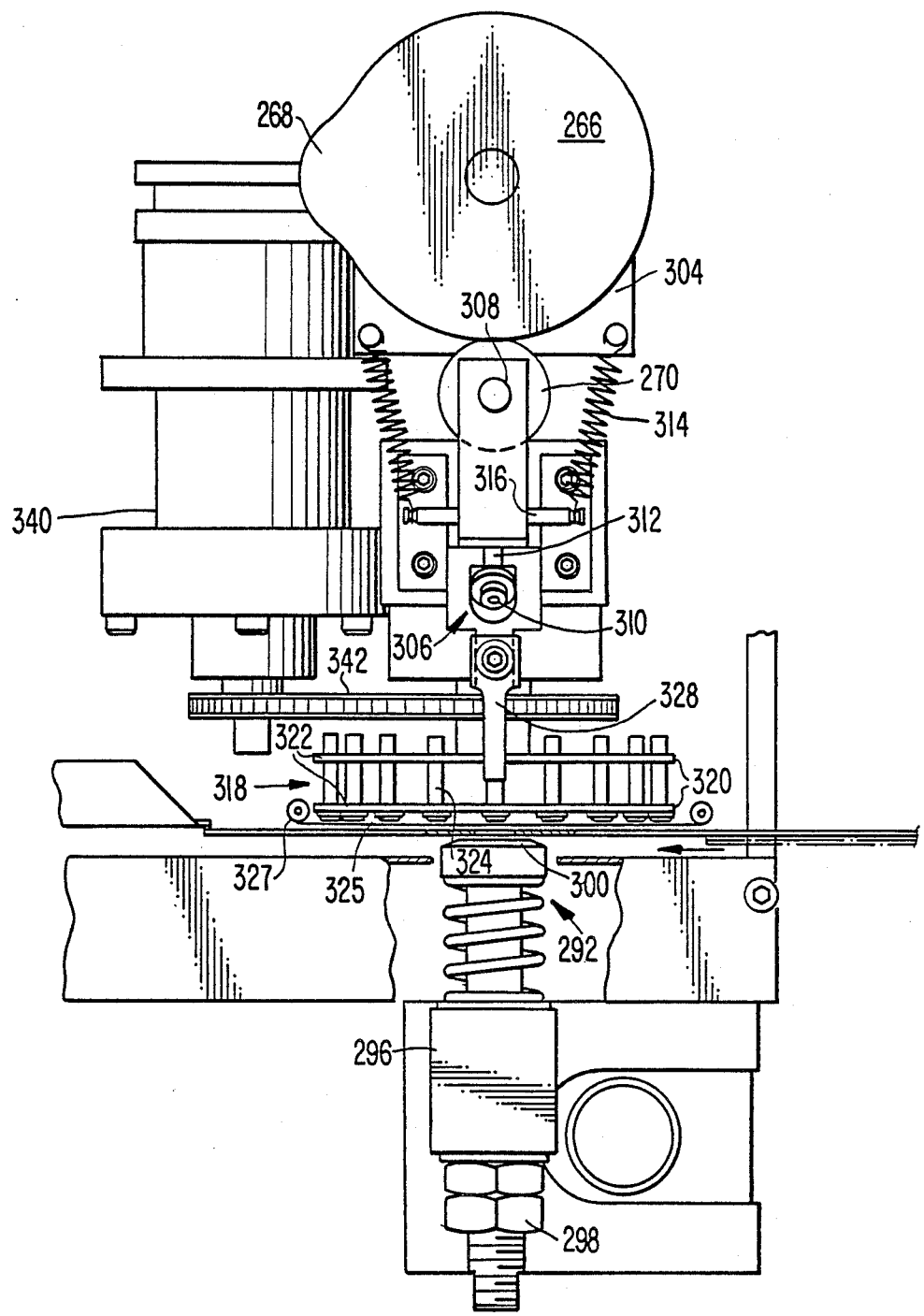
FIG. 17 is a top view of the indent printing unit in accordance with the present invention.

FIGS. 10 and 16–17 illustrate respectively front elevational view, an end elevational view, and a top view of the indent printing unit 40 which has one-half the moving parts of the embossing units 38 which are identical to those disclosed in Ser. No. 820,705. The four main parts of the indent embossing unit 40 are the stationary anvil assembly 280, the movable punch wheel assembly 282, DC motor and shaft encoder 284 for driving the punch wheel assembly to its correct position for indent printing and the power drive 286 for punch wheel assembly.

The anvil assembly 280 is connected to the punch wheel assembly 282 by a yoke 288. The yoke 288 is attached to a pair of vertical support posts 290. The height of the indent printing unit 40 is adjusted by the vertical point of attachment to the vertical support posts 290 which may be by any conventional attachment mechanism. A jackscrew (not illustrated) is provided for setting the desired height. A fixed anvil 292 is attached to the end of a member 294 which is slidably received within a cylindrical bore within attachment member 296. The forward most position of the anvil 292 (with respect to face 12 of a card) is fixed with respect to attachment member 296 by a pair of nuts 298 which are locked together. The face 300 of the anvil 292 supports the front surface 12 of the card 10 being printed by the indent printer 40 so that the front surface 12 of the card is not substantially deformed. A spring 301 determines the degree of penetration of the individual indent printing elements 324 during printing. For a typical credit card, the gap between face 300 and the farthest extension of the indent printing elements 324 is preferably set to approximately 0.026 inches. With that setting, a spring is chosen with a preload which may range, for example, from 50 to 90 lbs. When the indent element 324 impacts the rear face of the card, the male face penetrates the surface driving the ribbon 325 into the indentation until the force exceeds the preload at which point the face 300 is deflected to limit the depth of penetration. The initial gap setting is changed for cards of different thickness. The sprlng preload is changed to vary the depth of penetration.

The power drive 286 is described as follows. The belt 248 drives gear wheel 252. The gear wheel 252 has a cylindrical section 302 attached to its bottom to provide rotational inertia to supply power during printing. As explained above, this mass is less than that of the gear wheels 246 for the embossing unit 38. The drive shaft 250 is journaled in an extension 304 of the yoke 288. The top of the drive shaft of the drive shaft is attached to drive cam 266. A bifurcated cam follower 270 is journaled in a part 308 of punch member 306.

The mounting structure of the punch member is described as follows. The punch member 306 is connected to block 313 by a slanted retainer 310 which is received within a slot 312. The block 313 has a cylindrical bore 315 which slidably receives rod 317 to permit the block to reciprocate back and forth as the cam 266 activates the bifurcated cam follower 270. A pair of guides 319 are located on either side of a downward depending member (not illustrated) located directly below the bore 315 wnich engages the vertical sides of the member to prevent rotation of the block. Block 321 is separate from block 313 to permit adjustment of the degree of extension of the punch member 306 by means of retainer 310. A pair of stretched springs 314 are attached at one end to the extension 304 of the yoke 288 and at the other end to a rod 316 extending through the punch member 306 orthogonal to the direction of motion during indent printing. During each rotation of the drive cam 266, the lobe 268 contacts the cam follower 270 to cause it to be advanced to engage a punch indent printing element 324 to cause an indent character to be printed or to leave a blank space depending on the rotational position of the punch wheel assembly 282 as described below which is commanded by the indent printer unit controller. After the lobe 268 rotates past the cam follower 270, the punch member 306 is withdrawn from the printing position to the position as illustrated by the force exerted by the stretched springs 314.

A ribbon mechanism 327, which is conventionally used in the industry to apply highlighting to the indentation of the characters to make the characters visible, has not been illustrated in detail for the reason that it does not form part of the present invention. The controller for the indent printer activates the ribbon mechanism 327 to advance fresh ribbon 325 for each new character to be indent printed.

The punch wheel assembly 282 is described as follows. The punch wheel assembly 282 has a wheel 318 which is journaled in the yoke 288. The wheel 318 is comprised of a pair of spaced apart circular plates 320 which have axially aligned apertures 322 through which the punch male type indent printing elements 324 extend. The end 326 of punch memmer 308 forces the printing elements 324 from a retracted position to an extended position into the surface of the card 10 when the lobe 268 engages the cam follower 270. A spring and plastic block (not illustrated) of the type illustrated in FIG. 13 of Ser. No. 820,705 holds each indent printing element 324 in a normally retracted position. A retractor 328 is attached to the top surface 330 of the end 328 of the punch member. The retractor 328 has a curved end which positively engages a projection 332 located on top of each punch element to insure proper withdrawal. In the embodiment as illustrated, a total of 10 numerical characters "0–9" and a blank space are provided at equally spaced intervals about the periphery of the wheel 318. The blank space performs the same function as the blank space in the embossing units disclosed in Ser. No. 820,705 in providing a circular position of the wheel 318 where no embossing will take place during the EMBOSS period of the ESHUT signal. The horizontally extending guideway 194 is disposed between a front plate 336 and back plate 338.

The motor drive and shaft encoder 284 are described as follows. A DC motor with shaft encoder 340 rotates wheel 318 to position the desired character or a blank space in line with the end 326 of the punch member 308 under the control of the embosser controller during the aforementioned MOVE period of the ESHUT period. The embossing of a character takes place during the subsequent EMBOSS period of the ESHUT period. A drive 342 couples a drive sprocket 344 of the motor 340 to a drive sprocket 344 of wheel 318. The control of the motor 340 and positioning of the wheel of the indent printing unit 40 is identical to the control of the embossing units disclosed in Ser. No. 820,705.

The master controller has a subroutine for reversing the order of the characters in the data record to be embossed by the indent printer 40 so that they are printed in the correct order. The routine is performed prior to transmission of the encoded characters to the controller of the indent printing unit 40.

Topping Station 44 and Stacking Station 46

The topping station 44 is similar to that described in Ser. No. 820,705 with the differences residing in the drive unit 352 for transporting the cards through the topping station and the timing of the activation of the drive unit of the topper with respect to the card transport unit 42. The topping station 44 applies a plastic topping from a polyester foil backing in the same manner as in Ser. No. 820,705.

Figure 18:
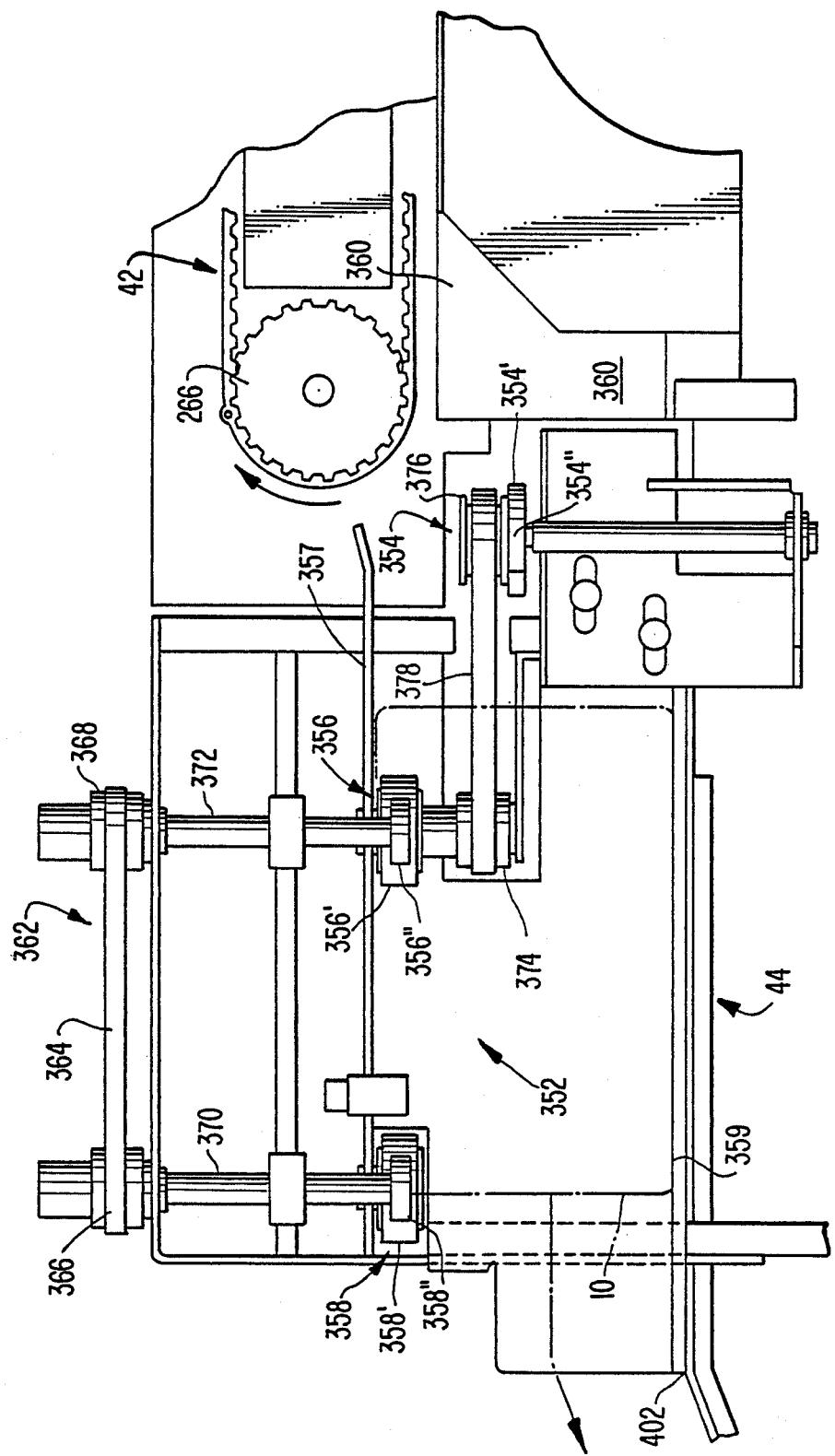
FIG. 18 is a front elevational view of the topping station drive and stacking station.
Figure 19:
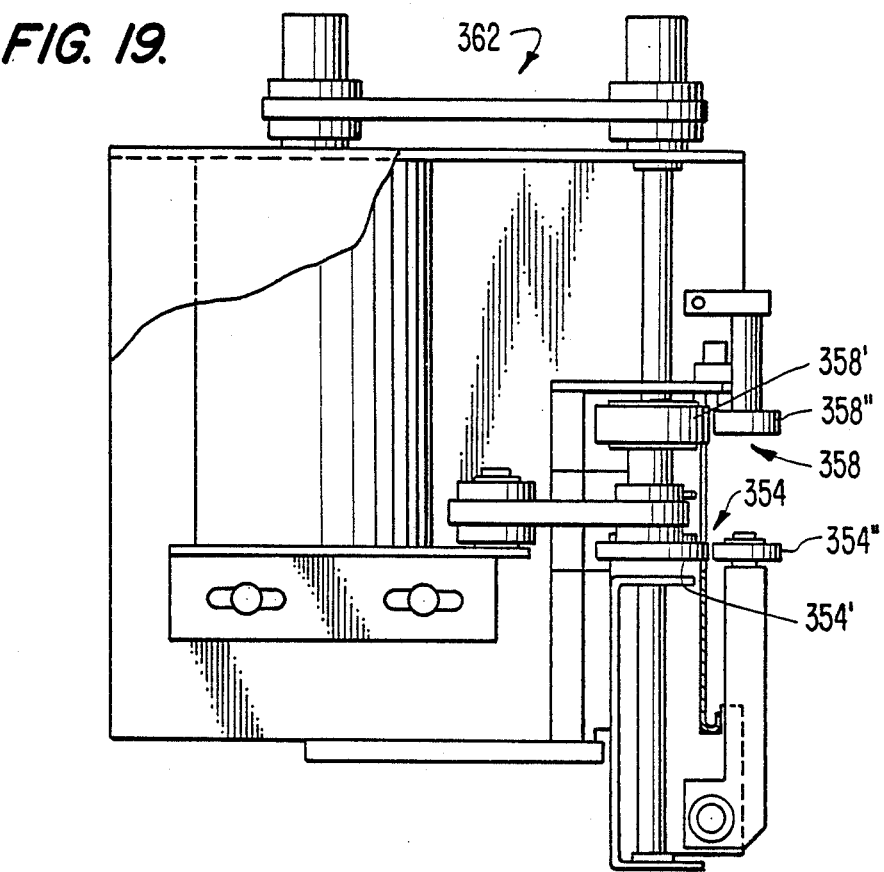
FIG. 19 is an end view of the topping station.
Figure 20:
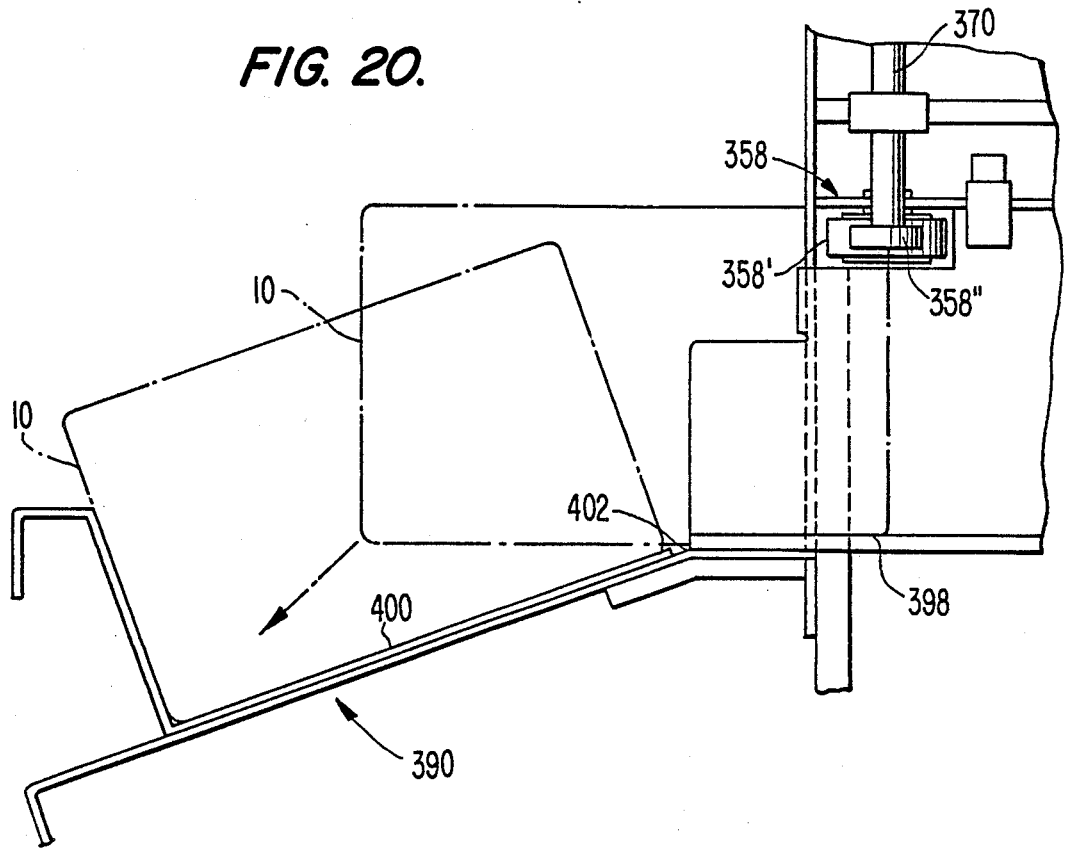
FIG. 20 is a view illustrating the operation of the stacking station.

The drive unit 352 for the topping station 44 is described with reference to FIGS. 18-20. The drive unit 352 has three pairs of rollers 354, 356 and 358 which sequentially engage a card 10 as it is driven through the topping station 44 between the discharge point 360 of the embossing units 38 to the stacking station 46. A top guide 357 establishes the upper vertical position with respect to the upper edge of the card. The bottom edge of the card rides on surface 359. Each pair of rollers 354, 356 and 358 has a power driven capstan 354', 356' and 358' and an idler pinch roller 354'', 356'' and 358''. The pinch rollers 354'', 356'' and 358'' force a card against the associated capstans 354', 356' and 358' to drive it through the topper 44. An electric motor drives a transmission 362 which applies power to the capstans 354', 356' and 358'. The transmission 362 includes a belt 364 driving pulleys 366 and 368 which drive shafts 370 and 372 of capstans 358' and 356', respectively. The drive shaft 372 drives pulley 374 which drives pulley 376 through belt 378.

The stacking station 46 is described with reference to FIGS. 6 and 20. The function of the stacking station 46 is identical to that disclosed in Ser. No. 820,705 regarding the grouping of cards in two sections of a tray 390 in which the front section 392 receives properly embossed and recorded cards and the rear section receives cards which have errors in either embossing or recording. Gate 396 is moved toward the front section 392 or rear section 394 of the tray under the control of the master controller to channel the processed cards in the correct location in accordance of whether or not an error condition is detected. The control of the gate 396 is in a manner identical to that disclosed in Ser. No. 820,705.

The discharge 398 of the topping station 44 uses gravity to cause the cards to fall into the appropriate section 392 or 394 of the tray 390. The receiving surface 400 of the tray is inclined approximately twenty degrees to the horizontal. Once the rear edge of a card leaves the nip of the final roller pair 358, the card tips over apex 402 into the appropriate section of the tray. At least half of the longitudinal dimension of a card should be past the apex 402 when the trailing edge of the card leaves the nip of the roller pair 358 to insure that the card tips over center. The advantage of the gravity feed is that the embossing of the card being discharged does not initially frictionally engage the embossing of the card which has immediately been previously discharged. The embossed characters between adjacent cards tend to bind with each other if the cards are aligned with each other. The inclination of the receiving surface 400 from the apex 402 downward from the horizontal in the direction that the cards move through the topping station 44, prevents binding of adjacent cards during discharge because the tipping over center of apex 402 provides sufficient inertia to prevent hangups of the card being discharged with the stacked cards which could occur if the receiving surface of the tray was horizontal and in the same plane as the path of the cards through the topper 44. After the individual cards are released from the nip, the bottom edge slides on surface 400 until the left-hand edge hits the wall 404. The inertia of the card in sliding down surface 400 prevents handup of its embossing with the embossing of an adjacent embossed card.

Processing of Data Records for Embossing and Recording

The individual data records which are processed by the present invention are read off a magnetic tape sequentially and are transmitted to the embossing and recording unit controllers. With the invention each data record has two main parts with the data to be embossed being recorded first. A unique code marks the end of the record to be embossed. The tracks of data to be magnetically recorded as digitally encoded characters follow the unique code. The portion of the data record to be embossed is broken down into separate lines to be embossed with each line being marked by an end of line code. The beginning of each track 1, 2 and 3 of encoded characters to be magnetically recorded is marked with a unique character with the beginning of track 1 being marked with a % character, the beginning of track 2 being marked with a semicolon (;) character and the beginning of track 3 being marked with an exclamation point (!) character. The master controller described below has a dynamic memory which contains a main buffer (illustrated in FIGS. 21 and 22 as element 410) which stores blocks of data records. The processing of data records by the embossing units 38 and indent printer 40 is described with reference to FIG. 21 and the processing of data records by the magnetic recording station 34 is described with reference to FIG. 22. The main buffer stores a block of data records which are fed from a tape unit. The data is received from the tape in EBCDIC code and is translated into ASCII as it is placed in the main buffer by a program implemented by the master controller.

Figure 21:
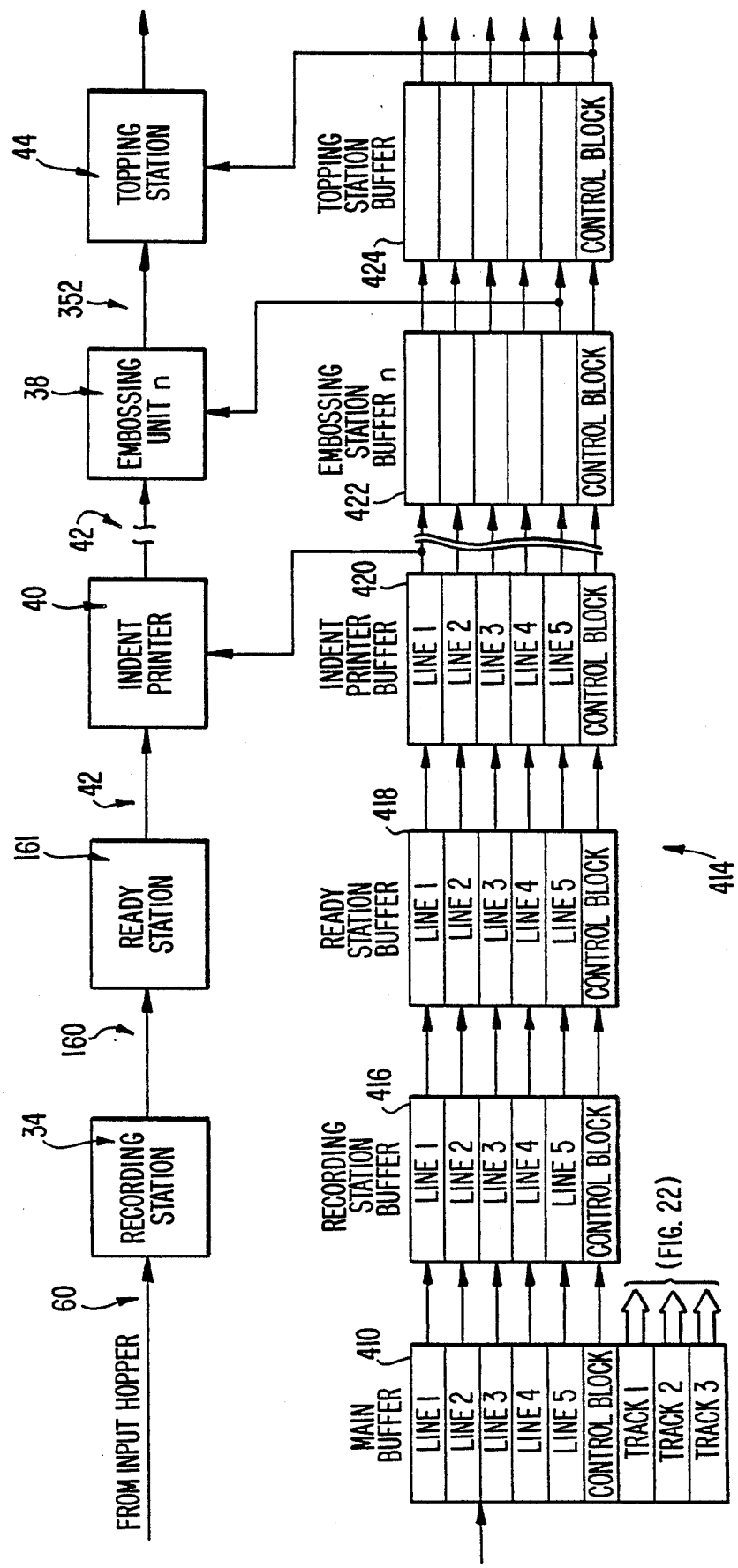
FIG. 21 illustrates the processing of the portion of a data record which is to be embossed and printed as characters.

In the preferred embodiment where a total of four embossers 38 and an indent printer 40 are used to emboss and print five vertically separated horizontally disposed lines of characters, the flow of card records within the embossing system is illustrated in FIG. 21. The processing of data records to be embossed is analogous to FIG. 24 of Ser. No. 820,705 with the difference being the number of lines being embossed. Only the indent printer buffer and one embosser buffer has been illustrated to simplify FIG. 21. As illustrated in FIG. 21, individual cards 10 are moved by the pickup mechanism 60 to the recording station 34, by the elevating mechanism 160 to the ready station 161, by the card transport unit 42 between the indent printing unit 40 and the successive embossing units and by the transport unit 52 to the topping station 44. A queue of data buffers 414, which is comprised of a main data buffer 410, recording station buffer 416, ready station buffer 418, indent station buffer 420, embossing station buffer 422 and topping station buffer 424, sequentially store the individual records during processing by the stations. The plurality of buffers are implemented in main memory of the master controller by pointers which point to successive blocks of memory to produce the shifting operation of data which is indicated by the arrows pointing to the right from each of the buffers 410, 416–424. Since a queue of buffers implemented in main memory is well known, the implementation will not be discussed in detail herein.

With reference to FIG. 21, it should be understood that each physical position that a card occupies, with the exception of the input hopper, has an assigned buffer. When the master controller is ready to accept a data record for embossing a card, it will transfer the contents of the main buffer 410 sequentially into the buffers 416–424 by the time an end of line code has been detected in all of the buffers. The data for line 1 associated with the data record stored in printer buffer 420 is coupled to indent printer 40, the data record for line 5 associated with the data record stored in embosser buffer 422 is coupled to embosser 38. By the time an end of line command has been detected in the processing of the data records by each of the indent printer and embosser buffers, the pointers of the indent printer and embossing buffers are shifted to point to the area in main memory where the next data record to be embossed and printed by the associated embossers 38 and indent printer 40 is located. The shifting of the pointers effectively produces a shifting of the data records within the buffers which is synchronized with the physical passage of the card to be embossed between the successive printing unit 40 and embossing units 38 to produce the sequential printing and embossing of the five lines of data on the card 14–18 and 24 of FIGS. 1a and 1b. The section of the main memory in the master controller which implements the queue of buffers 414 is updated with data records from the magnetic tape unit as cards are embossed.

Figure 22:
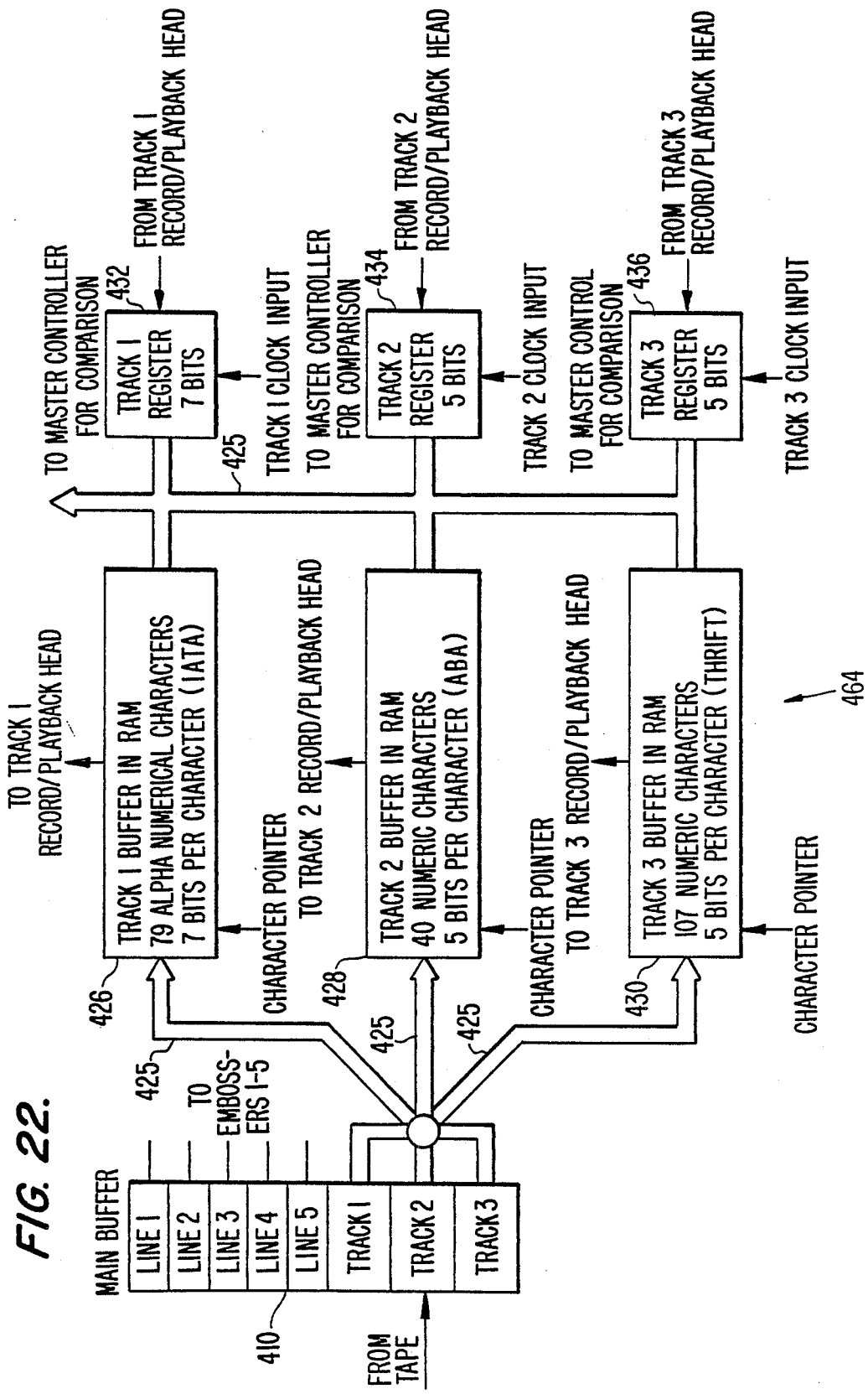
FIG. 22 illustrates the processing of the portion of a data record which is to be recorded on the magnetic recording medium.

The processing of the portion of each data record from the main buffer 410 which is magnetically recorded on the tracks as digitally encoded characters is described with reference to FIG. 22. The information from tracks 1, 2 and 3 of the main buffer 410 is transmitted from the master controller to the recording station controller 464 described below in conjunction with FIGS. 24(a)–(f) by time multiplexing of 8-bit bidirectional bus 425 which is illustrated schematically. First, second and third track data buffers 426–430, within the recording station controller 464, respectively store the entirety of the encoded characters of each of the associated tracks which are to be recorded for each card being processed. The purpose of the track data buffers 426–430 is to provide a reference storage for each of the characters which were desired to be recorded on each of the tracks. When the tracks are played back by movement of the magnetic head assembly 122 in a direction opposite to the direction of recording, as described above with reference to FIGS. 6–9, the individual played back characters are compared with the corresponding character stored in the data buffer associated with the track from which the character was played back to permit verification of the accuracy of the recording process. The three track data buffers 426–430 are set up in the RAM section of the magnetic recording controller 464. The actual tracks of information are transmitted from the main buffer 410 via the bus 425 when a record to be transferred from the tape to the main buffer is sensed by the presence of a feed request flag and the belt 48 is sensed by reading of the DC motor and shaft encoder 126 to have moved past position 1 in the units illustrated in FIG. 1a. Each track data buffer 426–430 has the capacity to store the maximum number of multibit characters described above in conjunction with FIG. 2. Each track data buffer 426–430 has a pointer which identifies the current character being processed. The pointer for each track is augmented by one when the number of bits comprising a character has been recorded and decremented by one when the number of bits comprising a character has been played back. The track data buffers 426–430 perform the function of outputting the individual bits to be recorded to the magnetic head 136 in serial form from the parallel storage format therein. An appendix referred to below contains a source code listing of the preferred form of program for processing the verification function of the recorded data including the storage in parallel form and outputting for recording to the record head. Each of the characters stored in the track data buffers 426–430 is read out under control of one of the clock pulse generators 132 or 134 which are synchronized with movement of the magnetic head assembly 122.

During playback, the bit stream for each track produced by movement of the head assembly 122 in the direction opposite to the direction of recording for each track is applied serially to track shift registers 432, 434 and 436. The track shift registers 432, 434 and 436 are respectively associated with the track buffers 426, 428 and 430. The track shift registers 432, 434 and 436 are preferably hardware registers within the microprocessor control which are part of the magnetic recording station controller described below in conjunction with FIGS. 24(a)–(f). Each register 432, 434 and 436 has a bit capacity equal to the number of bits used to encode a character on the associated track. The prior art two frequency coherent phase recording process permits the played back data to generate the requisite clock signal illustrated as an input to registers 432–436 for controlling the conversion of the serial input into a parallel output having a number of bits equal to the bits required to encode a character for that track.

Each of the registers 432, 434 and 436 performs two separate functions. The first function is to serially store the playback bit stream bit-by-bit beginning with all zeros at the right-hand edge of the card to provide a storage for comparing, as each bit is played back, the bits stored therein with the LRC for that track to identify the last bit of the character immediately preceding the LRC. Second, once the position of the LRC is known, the track registers 432–436 sequentially store characters, which are identified by reference to the detected position of the LRC character, that are to be compared by the master controller with the corresponding character stored in the associated track buffers 426–430. Once the LRC is detected, the character pointer is set to point to the preceding character. As each successive character from a track is played back, the character pointer in the associated track buffer is decremented by one until all of the characters recorded on the track have been compared by the master controller with the corresponding reference character stored in associated track buffer.

For each track the comparison process must produce (1) a match of the played back bit pattern for that track with the LRC stored in the associated track buffer and (2) a match between all played back characters and the corresponding characters stored in the associated track buffer for the subsequent embossing process to be enabled. If an error condition is detected, the master controller may either attempt one or more additional times to record the same information or to pass the card through the printing unit 40 and embossing units 38 to the rear section 394 of tray 390. A flag is set by the master controller when an error condition is detected. This flag causes the card to be rejected.

Master Controller 440

Figure 23:
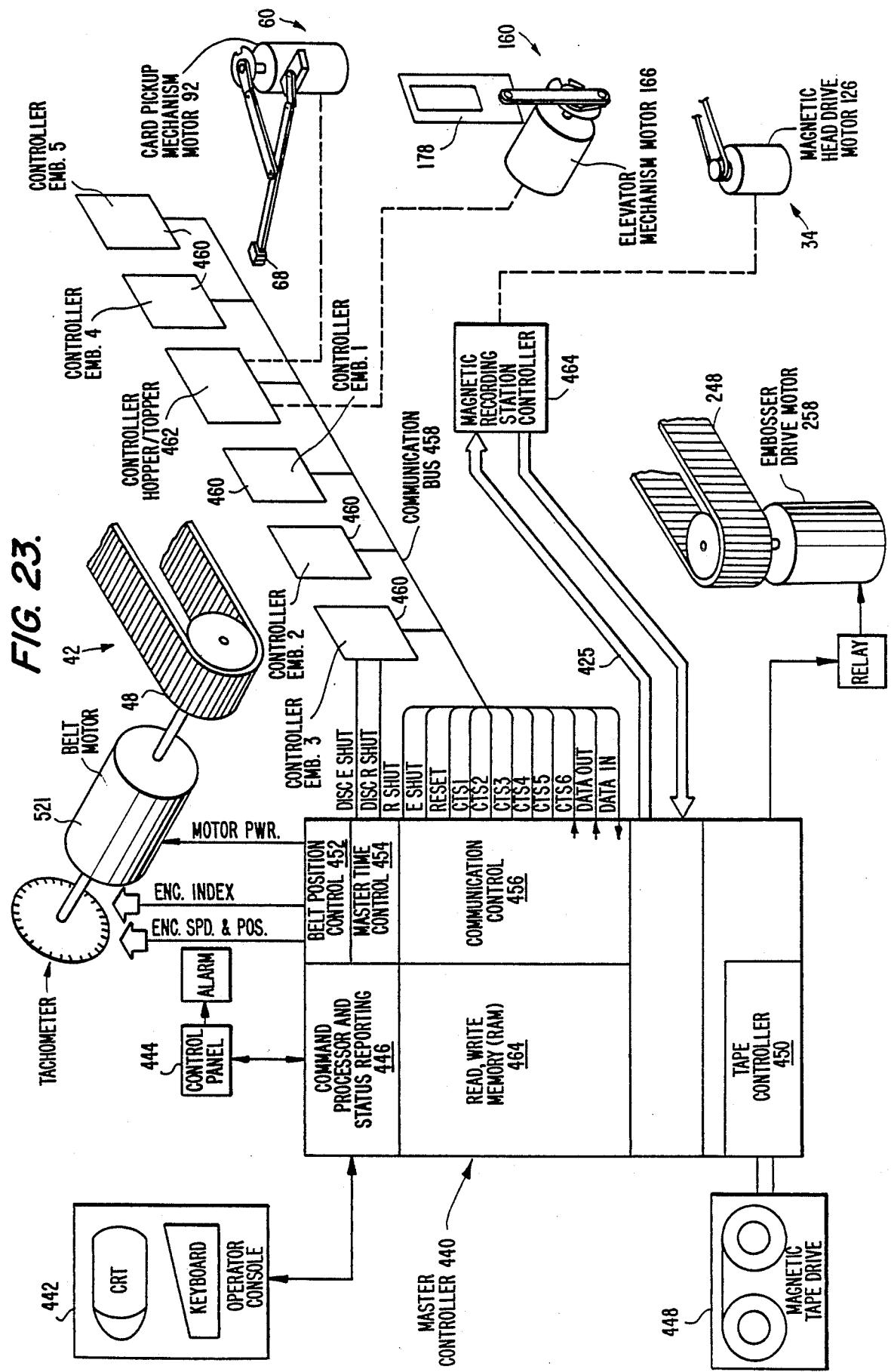
FIG. 23 illustrates a schematic diagram of the electrical control system of the present invention.
Figure 24A:
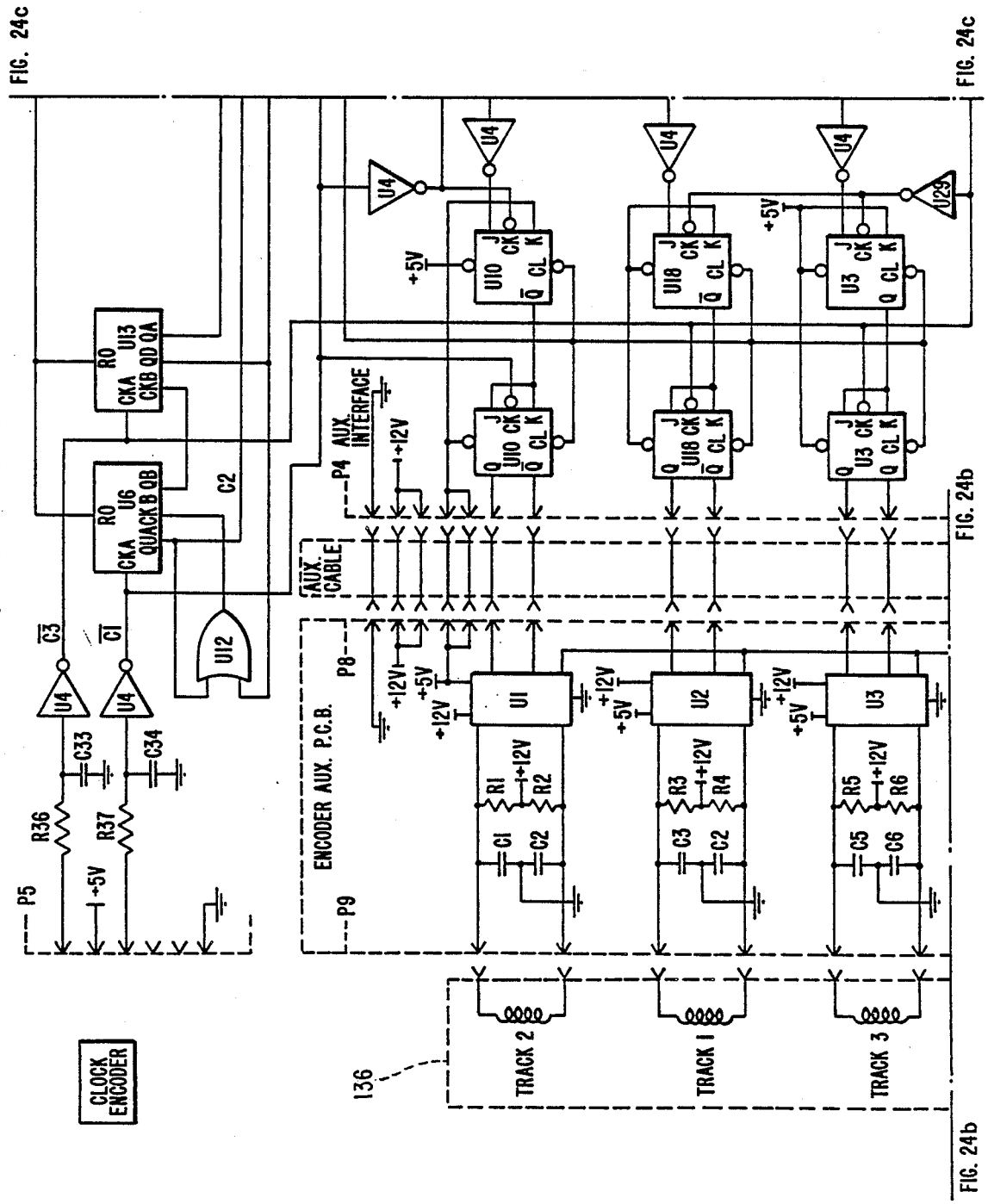
FIGS. 24(a)-(f) illustrate the preferred controller for the magnetic recording station of the present invention.
Figure 24B:
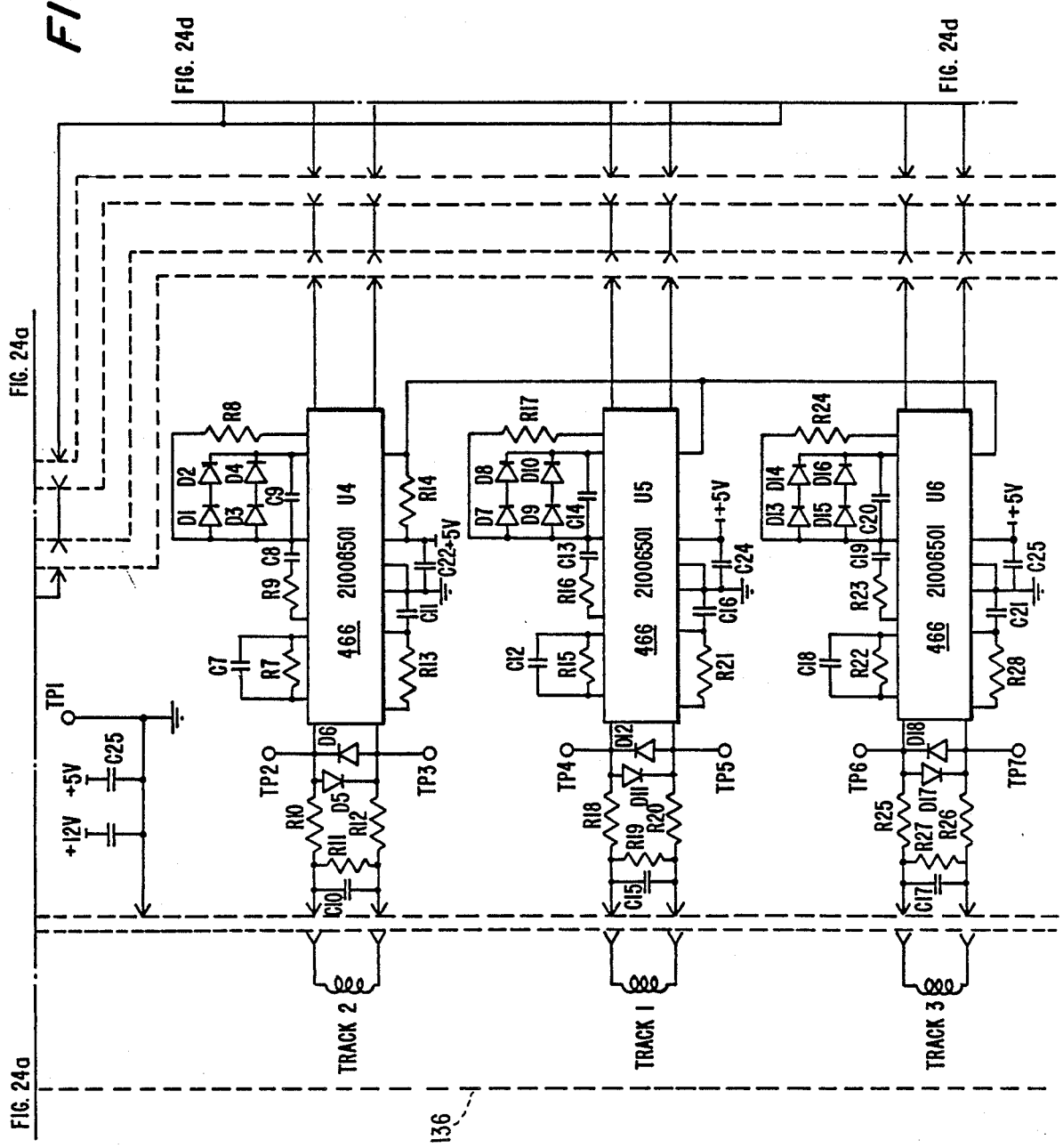
Figure 24C:
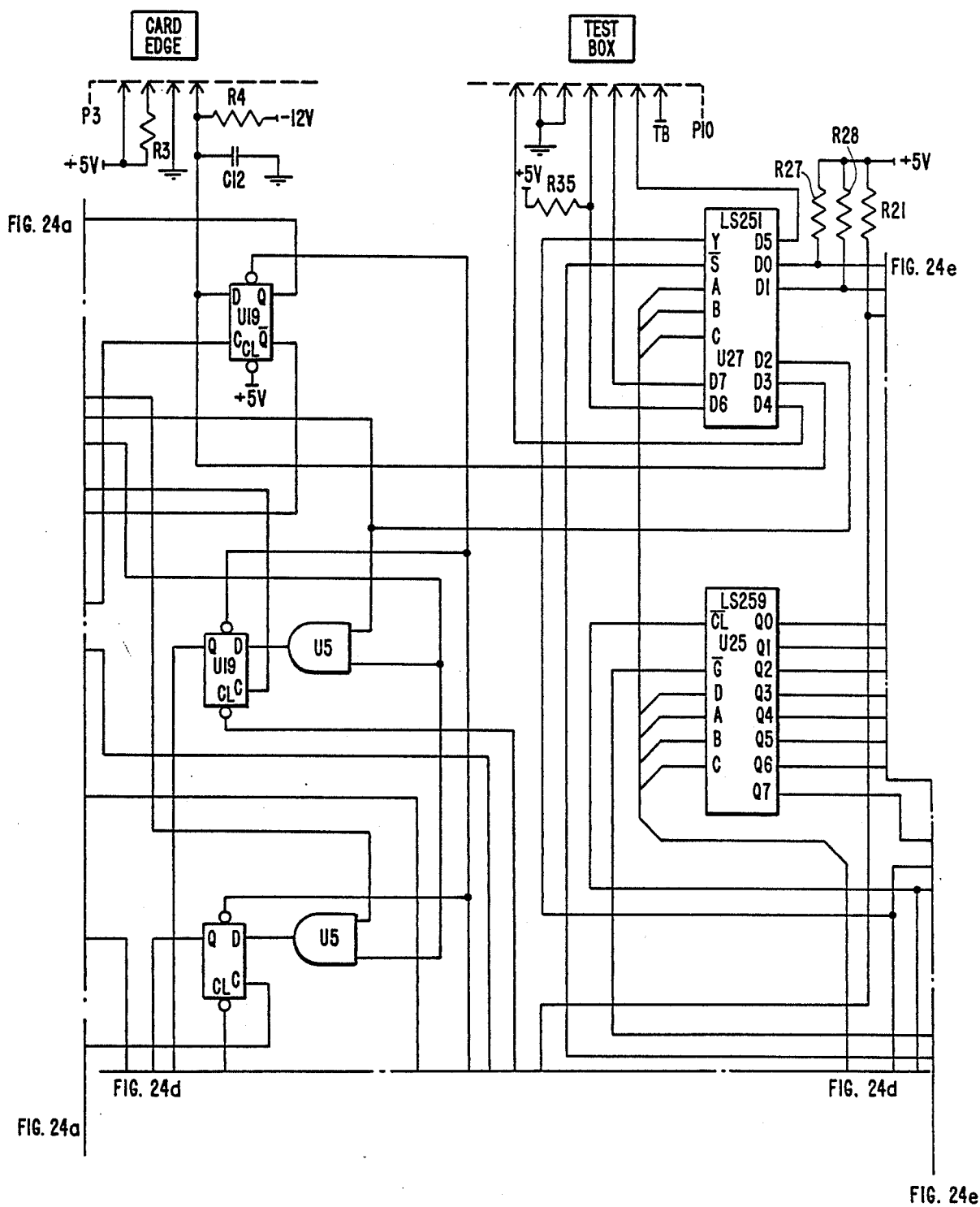
Figure 24D:
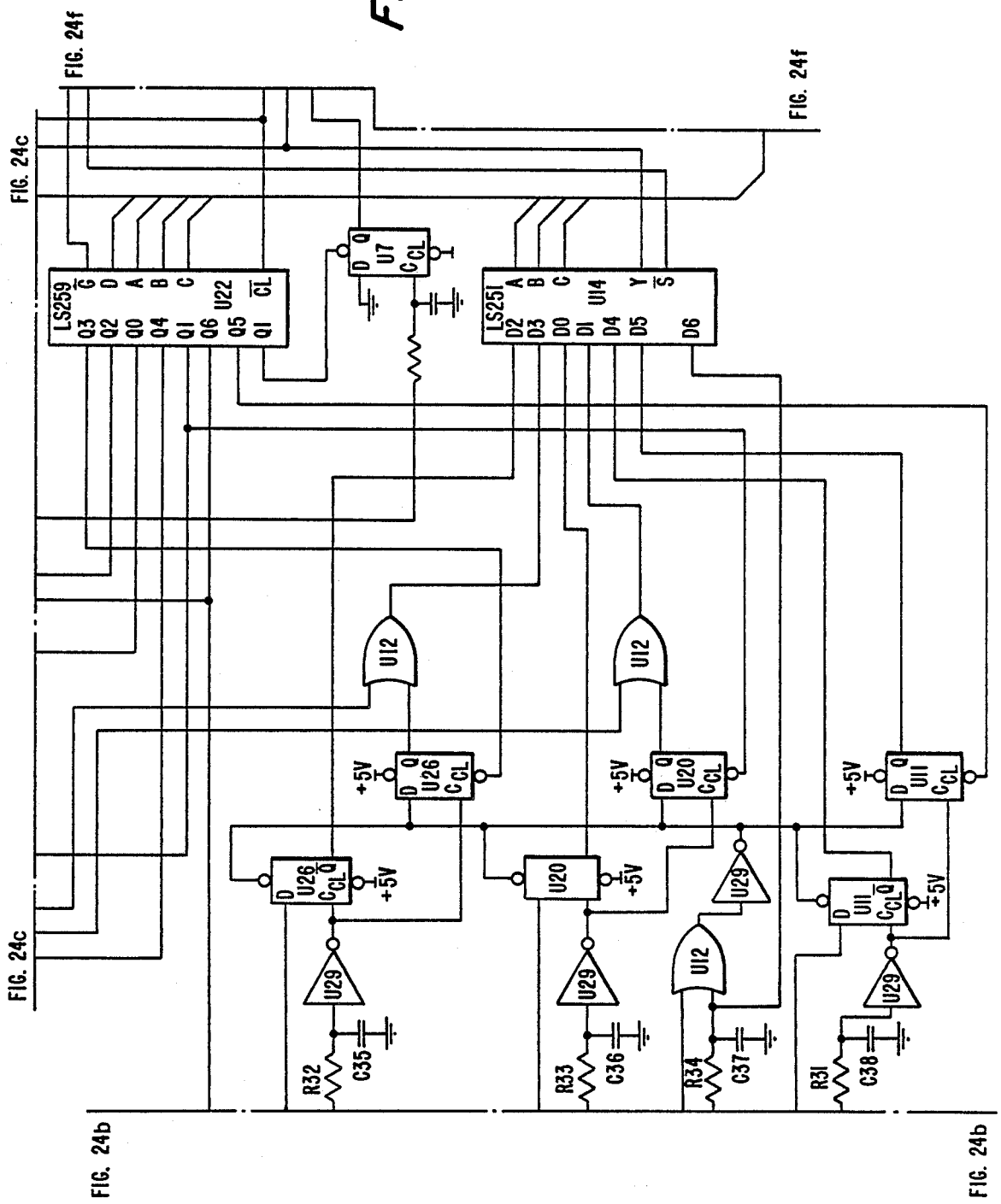
Figure 24E:
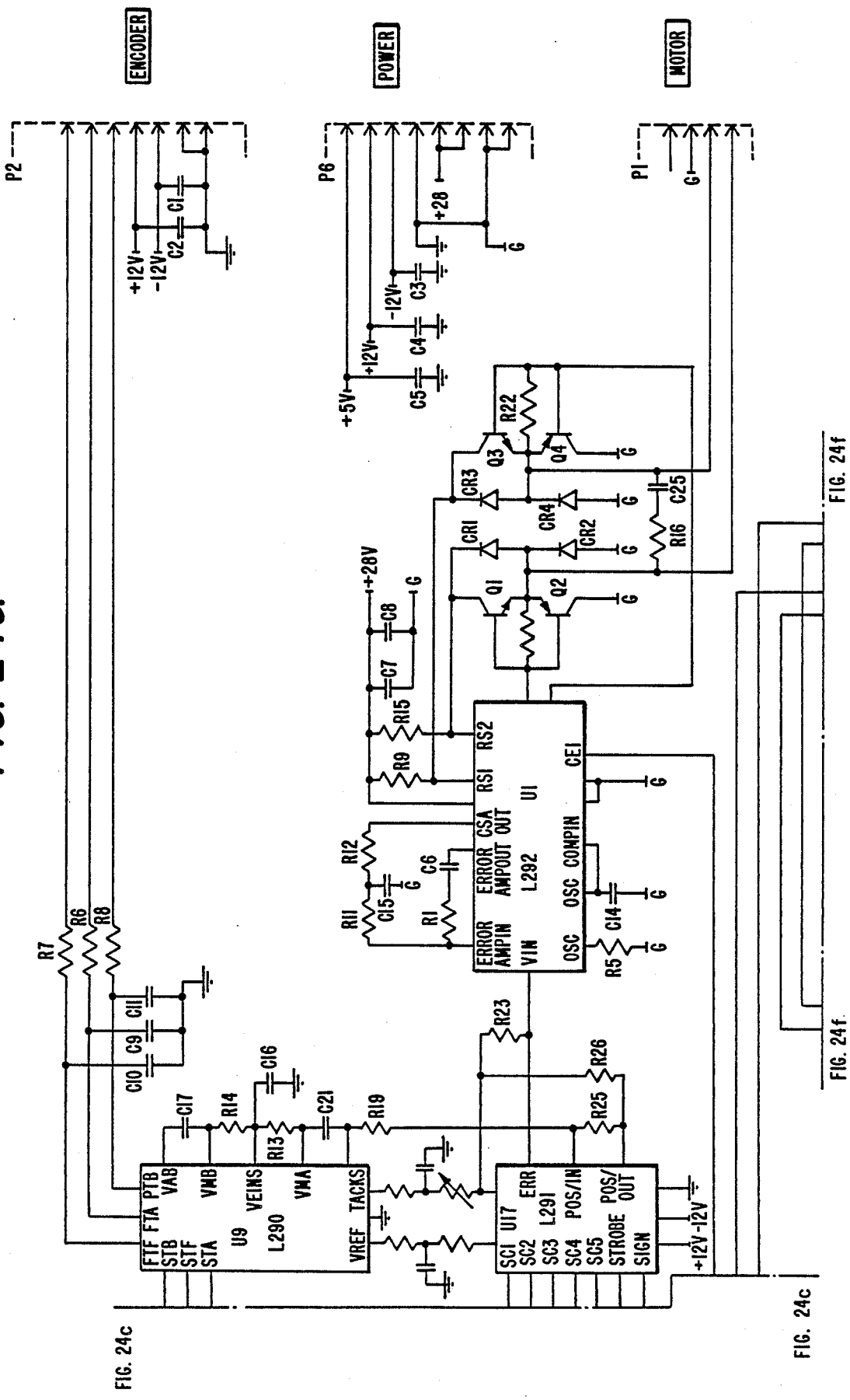
Figure 24F:
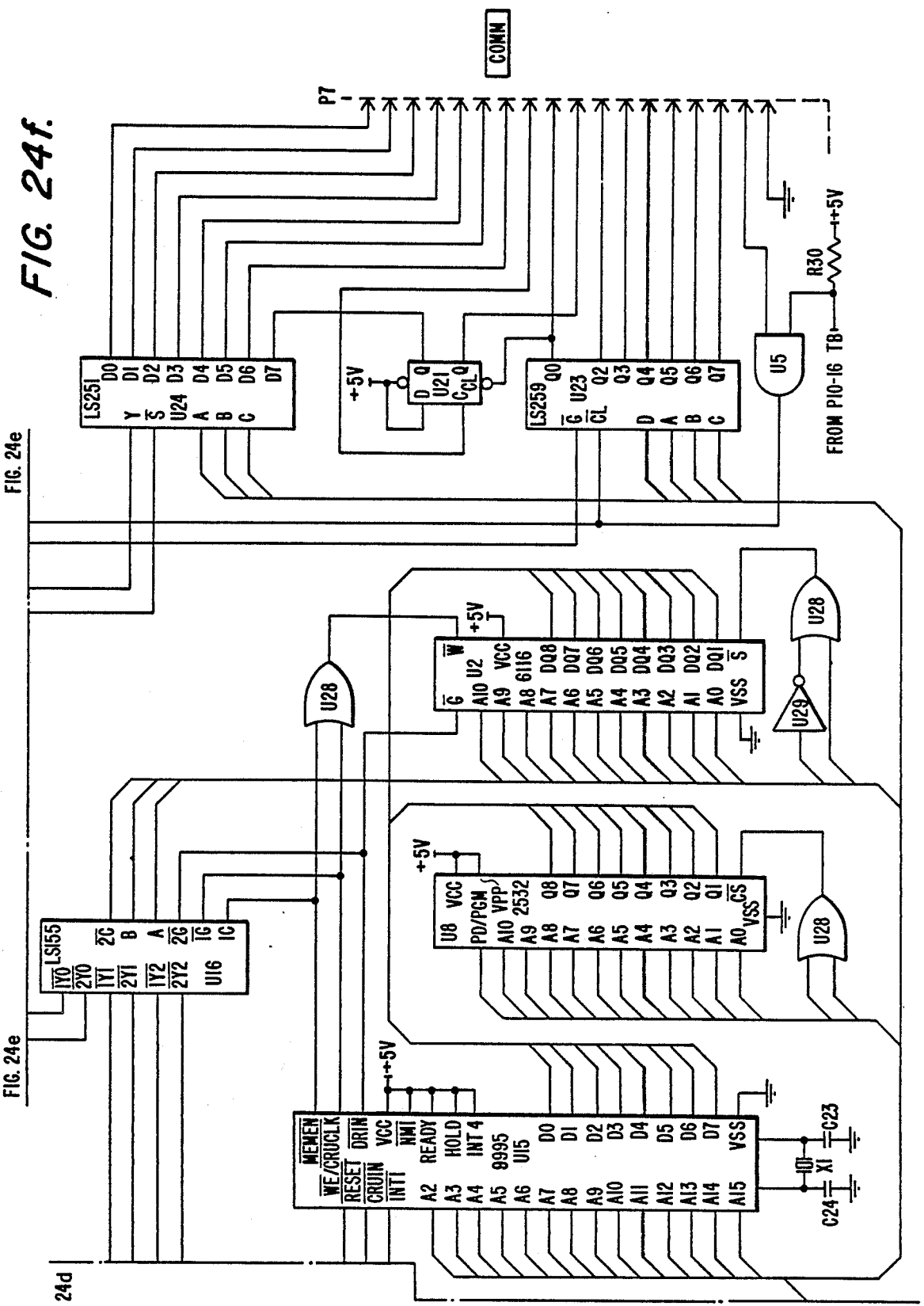

The master controller 440 of the present invention is described with reference to FIG. 23 and is similar to that disclosed in Ser. No. 820,705 with the principal differences being that in the present invention the master controller controls five inline units which are indent printer 40 and four embossers 38 instead of three inline embossers in Ser. No. 820,705, and the activation of the pickup mechanism 60, the card elevating mechanism 160, and the magnetic recording station 34, and the stoppage of the card transport unit 42 with only a single reference position located off the card (e.g. 250) to verify all check points in the system are in order prior to reactivation of the card transport unit 42 to pick up a new card. The master controller 440 controls communications throughout the system. The master controller 440 is implemented in a programmed microprocessor. Identical reference numbers are used herein to identify the same parts identified by the same reference numerals in the previous figures. Input communications are received from the operator console 442 and control panel 444 by a command processor and status reporting unit 446. Communications from the magnetic tape drive 448 are received by the tape controller unit 450. The master controller 440, which includes a programmed microprocessor having a control program similar to that set forth in the Microfiche Appendix of Ser. No. 820,705, performs the functions of managing input communications by the tape controller section 450 and a command processor and status reporting section 446. The belt position control section 452 controls the operation of the drive motor 54 in the manner described above. The master time control section 454 responds to the RSHUT and ESHUT signals generated by a timing disk attached to the cam 266 of the third embossing unit 38. The disk is illustrated in FIG. 23 of Ser. No. 820,705. Transitions of the disk generate the RSHUT signal, generate an interrupt and synchronize an internal timer for generating the ESHUT signal which is generated internally by the master time control section 454. The communication control section 456 communicates the labelled output signals to the communication bus 458 which is coupled to five identical embosser controllers 460 and a hopping station and topping station controller 462. The indent printer 40 is controlled by an embosser controller. The bus communications are time multiplexed within six equal bus cycles CTS1–CTS6 of the high level of the ESHUT signal which is a fixed interval of the RSHUT signal. A read-write memory 464 stores information generated dynamically during operation. The preferred electrical circuitry for implementing the individual embosser controllers 460 is illustrated in FIG. 38 of Ser. No. 820,705 with the exception that each embosser controller is provided with a selectable control block for the ribbon drive of the indent embosser 40. The preferred circuitry for implementing the controller 462 is illustrated in FIG. 39 of Ser. No. 820,705 with the exception of the controller has a drive for the motor 92 of the card pickup mechanism 60 in place of the rack motor, a drive for the elevator mechanism motor 166. The master controller 440 also controls the embosser drive motor 258 which, through belt 248, provides power for each of the inline embossing units 38 and indent printer 40. The conditions for activating the pickup mechanism 60, card elevating mechanism 160 and magnetic recording station 34, have been described above. The control of the card transport unit 42 with a single reference position to check system status is analogous to the use of multiple reference positions described in Ser. No. 820,705 for controlling the transport unit. Communications between the master controller 460 and the magnetic recording station controller 464, which is illustrated in detail in FIGS. 24(a–f) described below is by time multiplexing the 8-bit directional bus 425 described above with reference to FIG. 22.

Recording Station Controller 464

The preferred form of the recording station controller 464 for the magnetic recording station is illustrated in FIGS. 24(a–f). The controller 464 has an on board microprocessor, random access memory for implementing the buffers 426–430 and registers for implementing the functions of registers 432–436 of FIG. 22. Conventional integrated circuits are identified by their industry accepted part numbers. Separate windings are provided for recording and playback in the magnetic head 136. Communications to and from the master controller are time multiplexed on the single bidirectional bus 425 described above. The clock signal for each of the playback tracks, which is shown as an input to the registers 432–436 of FIG. 22, is produced by the integrated circuit 466 associated with the lower playback windings.

Program Listing

The following program listing is a source code listing of the subroutine of the master controller program which verifies the recording accuracy of the magnetic recording station as described above with reference to FIG. 22. The program is copyrighted. A limited license is granted to anyone who requires a copy of the program disclosed therein for purposes of understanding or analyzing the present invention, but no license is granted to make a copy for any other purpose, including the loading of a processing device with code in any form or language.

ENCWRIT MODULE - COPYRIGHT (C) CARD TECHNOLOGY CORP. 1986

```
        TITL  'MODULE FOR WRITE/VERIFY'
        IDT   'ENCWRIT'
*
        DEF   WRTSET,VERIFY
*
        REF   EINIT,ENCWRT,ENCRED,BUF1,BUF2,BUF3,BADENC
***********
*
* WORKSPACE DEFINITION
ENT1    EQU   0                   VARIABLE ENTRY FOR TRACK 1 PROC.
REG1    EQU   1                   CHARACTER BUFFER FOR TRACK 1
PTR1    EQU   2                   BUFFER POINTER FOR TRACK 1 DATA
XSAV    EQU   3                   SAVE RETURN ADDRESS
*
MTIME   EQU   5                   TIMER
*
ENT3    EQU   6
REG3    EQU   7                   SAME AS ABOVE FOR TRACK 3
PTR3    EQU   8
*
MTEMP   EQU   9
MFLAG   EQU   10
*
ENT2    EQU   13
REG2    EQU   14                  SAME AS ABOVE FOR TRACK 2
PTR2    EQU   15
*
* SETUP FOR WRITING ON THE CARD
WRTSET  EQU   $
        MOV   SUBRET,XSAV         SAVE THE EXIT
REWRIT  LI    CRUBAS,CRDBAS       SET CRU
        SBO   ENCRUN-C            TELL MASTER
        SBZ   STROB1-C            RESET ALL READY FLAGS
        SBZ   STROB2-C
        SBZ   STROB3-C
        LI    ENT1,WRT1           SET ENTRIES
* NOTE THAT TRACK 1 AND 3 ARE WRITTEN WITH SAME CLOCK
        LI    ENT2,WRT2
        LI    PTR1,BUF1           SET POINTERS IN BUFFERS
        LI    PTR2,BUF2
        LI    PTR3,BUF3
        CLR   REG1                CLEAR CHARACTER REGISTERS
        CLR   REG2
        CLR   REG3
* FOLLOWING CODE PRESETS FIRST BYTES FOR TRACKS 1 AND 3
* AND ADDS 2 ZERO BITS TO ALIGN THE START SENTINELS.
        MOVB  *PTR1,MTEMP         TEST FIRST BYTE
        JLT   ST3B1               NO ADJUSTMENT IF EOB
        MOVB  *PTR1+,REG1         SET THE REGISTER
        SWPB  REG1
        AI    REG1,>80            SET 7 BIT SHIFT FLAG
        SLA   REG1,2              INSERT 2 DUMMY BITS
ST3B1   MOVB  *PTR3,MTEMP
        JLT   WRT1A               NO CHANGE IF NO DATA
        MOVB  *PTR3+,REG3
```

```
         SWPB  REG3
         AI    REG3,>20        INSERT 5 BIT SHIFT FLAG
         SLA   REG3,2
WRT1A    SBO   WRTMOD-C        SET MODE SIGNAL FOR INF.
         SBZ   VERMOD-C        CLEAR VERIFY TO MASTER
         SBO   STROB1-C        ARM TRACKS 1 AND 3
         SBO   STROB2-C        ARM TRACK 2
         BLWP  @ENCWRT         START THE HEAD RIGHT TO LEFT
*
* DATA WRITE CONTROL LOOP
*
WTST1    TB    RDY1-C          READY ON TRACK 1?
         JNE   WTST2           NO
         BL    *ENT1           DO TRACKS 1 AND 3
         SBZ   STROB1-C        FIRE STROBE FOR 1 AND 3
         SBO   STROB1-C
WTST2    TB    RDY2-C
         JNE   WLOOP
         BL    *ENT2           DO TRACK 2
         SBZ   STROB2-C        FIRE THE STROBE
         SBO   STROB2-C
WLOOP    MOV   MTIME,MTIME     STILL TIME?
         JEQ   MOTNG           NO, SHOW THE ERROR
         COC   @ENCACT,MFLAG   ENCODER RUNNING?
         JEQ   WTST1           YES, KEEP SENDING DATA
         SBZ   STROB1-C        HOLD READY FLAGS TILL READ
         SBZ   STROB2-C
         SBZ   STROB3-C
         SBZ   WRTMOD-C        BACK TO READ MODE
         MOV   XSAV,SUBRET     ALLOW FOR DIRECT ENTRY TO VERIFY
         JMP   VERIFY          TO READ AFTER WRITE
MOTNG    B     @BADENC         SET ENCODER MOTOR ERROR
**********************
*  WRITE SUBROUTINES
*
WRT1     SBZ   WDATA1-C        ASSUME DATA = 0
         SRL   REG1,1          MOVE LOW ORDER BIT TO CARRY
         JNE   DTST1           ITS VALID, CHECK FOR 0 OR 1
         MOVB  *PTR1+,REG1     GET NEXT CHARACTER
         JLT   EOB1            HI BIT MARKS END OF BUFFER
         JMP   CSET1           TO SET-UP THE CHARACTER
EOB1     CLR   REG1            MAKE DUMMY ZERO CHARACTER
         DEC   PTR1            BACK TO EOB
CSET1    SWPB  REG1            MOVE BYTE TO LOW ORDER
         AI    REG1,>80        INSERT 7 BIT END FLAG
         SRL   REG1,1          PLACE LOW ORDER BIT IN CARRY
DTST1    JNC   WRT3            IT'S A ZERO GO CHECK TRACK 3
         SBO   WDATA1-C        MAKE A ONE
*
*  PROCESS TRACK 3 RECORD
WRT3     SBZ   WDATA3-C        ASSUME DATA = 0
         SRL   REG3,1          MOVE LOW ORDER BIT TO CARRY
         JNE   DTST3           ITS VALID, CHECK FOR 0 OR 1
         MOVB  *PTR3+,REG3     GET NEXT CHARACTER
         JLT   EOB3            HI BIT MARKS END OF BUFFER
```

```
            JMP     CSET3           TO SET-UP THE CHARACTER
EOB3        CLR     REG3            MAKE DUMMY ZERO CHARACTER
            DEC     PTR3            BACK TO EOB
CSET3       SWPB    REG3            MOVE BYTE TO LOW ORDER
            AI      REG3,>20        INSERT 5 BIT END FLAG
            SRL     REG3,1          PLACE LOW ORDER BIT IN CARRY
DTST3       JNC     ST13            IT'S A ZERO GO TO STROBE
            SBO     WDATA3-C        MAKE A ONE
ST13        RT                      BACK TO SEQUENCER
*
* PROCESS TRACK 2 RECORD
WRT2        SBZ     WDATA2-C        ASSUME DATA = 0
            SRL     REG2,1          MOVE LOW ORDER BIT TO CARRY
            JNE     DTST2           ITS VALID, CHECK FOR 0 OR 1
            MOVB    *PTR2+,REG2     GET NEXT CHARACTER
            JLT     EOB2            HI BIT MARKS END OF BUFFER
            JMP     CSET2           TO SET-UP THE CHARACTER
EOB2        CLR     REG2            MAKE DUMMY ZERO CHARACTER
            DEC     PTR2            BACK TO EOB
CSET2       SWPB    REG2            MOVE BYTE TO LOW ORDER
            AI      REG2,>20        INSERT 5 BIT END FLAG
            SRL     REG2,1          PLACE LOW ORDER BIT IN CARRY
DTST2       JNC     ST2             IT'S A ZERO GO TO STROBE
            SBO     WDATA2-C        MAKE A ONE
ST2         RT
*************************
*
* SET-UP FOR READ AFTER WRITE
VERIFY      EQU     $
            MOV     SUBRET,XSAV     SAVE EXIT
            SBZ     WRTMOD-C        SET TO READ MODE
            SBO     VERMOD-C        SHOW VERIFY MODE TO MASTER
            LI      ENT1,SYNT1      ASSUME ACTIVE, SET FOR SYNCH
            CLR     REG1            CLEAR DATA REGISTER
            S       @MIN1,PTR1      CONVERT TO INDEX TO LRC
            JGT     SET2            DO NEXT
            JEQ     SET2
            LI      ENT1,STOP       DISABLE IF NO DATA
SET2        EQU     $
            LI      ENT2,SYNT2      ASSUME ACTIVE, SET FOR SYNCH
            CLR     REG2            CLEAR DATA REGISTER
            S       @MIN2,PTR2      CONVERT TO INDEX
            JGT     SET3            DO NEXT
            JEQ     SET3
            LI      ENT2,STOP       DISABLE IF NO DATA
SET3        EQU     $
            LI      ENT3,SYNT3      ASSUME ACTIVE, SET FOR SYNCH
            CLR     REG3            CLEAR DATA REGISTER
            S       @MIN3,PTR3      CONVERT TO INDEX
            JGT     RDSET           START THE HEAD
            JEQ     RDSET
            LI      ENT3,STOP       DISABLE IF NO DATA
RDSET       EQU     $
            SBO     STROB1-C        ENABLE READY SIGNALS
            SBO     STROB2-C
```

```
          SBO    STROB3-C
          BLWP   @ENCRED           START HEAD LEFT TO RIGHT
*
*   READ AFTER WRITE LOOP
RTST1     TB     RDY1-C            TRACK 1 READY?
          JNE    RTST2             NO
          BL     *ENT1             PROCESS TRACK 1
          SBZ    STROB1-C          FIRE THE STROBE
          SBO    STROB1-C          ARM THE STROBE
RTST2     TB     RDY2-C            TRACK 2 READY?
          JNE    RTST3             NO
          BL     *ENT2             PROCESS TRACK 2
          SBZ    STROB2-C
          SBO    STROB2-C
RTST3     TB     RDY3-C            TRACK 3 READY?
          JNE    RLOOP             NO
          BL     *ENT3             PROCESS TRACK 3
          SBZ    STROB3-C
          SBO    STROB3-C
RLOOP     MOV    MTIME,MTIME
          JEQ    MOTNG             SHOW MOTOR ERROR
          COC    @ENCACT,MFLAG     ENCODER RUNNING?
          JEQ    RTST1             YES, KEEP READING
          SBZ    STROB1-C          HOLD READY'S TILL NEXT TIME
          SBZ    STROB2-C
          SBZ    STROB3-C
          MOV    PTR1,PTR1         CHECK FOR COMPLETE COUNT
          JLT    C2                OK
          SOC    @E1,MFLAG
C2        MOV    PTR2,PTR2         CHECK FOR COMPLETE COUNT
          JLT    C3                OK
          SOC    @E2,MFLAG
C3        MOV    PTR3,PTR3         CHECK FOR COMPLETE COUNT
          JLT    C4                OK
          SOC    @E3,MFLAG
C4        COC    @E1,MFLAG         TRACK 1 ERROR?
          JNE    CE2               NO
          SBO    DERR1-C           TELL MAMA
CE2       COC    @E2,MFLAG
          JNE    CE3
          SBO    DERR2-C
CE3       COC    @E3,MFLAG
          JNE    MSCHK
          SBO    DERR3-C
MSCHK     CZC    @ERRMSK,MFLAG     ANY ERRORS?
          JEQ    RDEND             NO
          COC    @PASS2,MFLAG      SECOND TIME?
          JEQ    RDEND             YES SHOW THE ERRORS
          SZC    @ERRMSK,MFLAG
          SOC    @PASS2,MFLAG
          SBZ    DERR1-C
          SBZ    DERR2-C
          SBZ    DERR3-C
          LI     MTIME,10          100 MSEC BEFORE RETRY
RW        MOV    MTIME,MTIME
```

```
            JGT   RW
            B     @REWRIT              TRY AGAIN
*
RDEND   SBZ   ENCRUN-C             SHOW COMPLETION
        B     *XSAV                BACK TO MAIN
*
ERRMSK  DATA  >700                 E1+E2+E3
MIN1    DATA  BUF1+1               ADJUST TO LRC CODE
MIN2    DATA  BUF2+1
MIN3    DATA  BUF3+1
*
*******************************************
*   READ AFTER WRITE SUBROUTINES
SYNT1   SLA   REG1,1               FIND LRC IN DATA STREAM
        TB    RDD1-C               PLAYBACK = 1?
        JNE   SCMP1
        ORI   REG1,>100            INSERT 1 BIT
SCMP1   CB    REG1,@BUF1(PTR1)     BYTE=LRC?
        JNE   EXIT1                NOT YET
        LI    ENT1,CMP1            PREPARE FOR COMPARE
        JMP   NUBYT1               TO SET FOR NEXT BYTE
*
CMP1    SLA   REG1,1               FIND LRC IN DATA STREAM
        TB    RDD1-C               PLAYBACK = 1?
        JNE   ECHK1                CHECK FOR FULL BYTE
        ORI   REG1,>100            INSERT 1 BIT
ECHK1   JNC   EXIT1                BYTE NOT COMPLETE
        CB    REG1,@BUF1(PTR1)     DATA = BUFFER?
        JEQ   NUBYT1               YES, PREPARE FOR NEXT
        SOC   @E1,MFLAG            SHOW LOCAL ERROR
        JMP   ER1                  STOP READING AFTER ERROR
NUBYT1  LI    REG1,>200            COUNT FOR 7 BITS
        DEC   PTR1                 POINT TO NEXT BYTE
        JOC   EXIT1                STILL COUNTING
ER1     LI    ENT1,STOP            DONE
EXIT1   RT
*
SYNT2   SLA   REG2,1               FIND LRC IN DATA STREAM
        TB    RDD2-C               PLAYBACK = 1?
        JNE   SCMP2                NO COMPARE
        ORI   REG2,>100            INSERT 1 BIT
SCMP2   CB    REG2,@BUF2(PTR2)     BYTE=LRC?
        JNE   EXIT2                NOT YET
        LI    ENT2,CMP2            PREPARE FOR COMPARE
        JMP   NUBYT2               TO SET FOR NEXT BYTE
*
CMP2    SLA   REG2,1               SHIFT DATA REGISTER
        TB    RDD2-C               PLAYBACK = 1?
        JNE   ECHK2                CHECK FOR FULL BYTE
        ORI   REG2,>100            INSERT 1 BIT
ECHK2   JNC   EXIT2                BYTE NOT COMPLETE
        CB    REG2,@BUF2(PTR2)     DATA = BUFFER?
        JEQ   NUBYT2               YES, PREPARE FOR NEXT
        SOC   @E2,MFLAG
        JMP   ER2                  STOP READING AFTER ERROR
```

```
NUBYT2  LI    REG2,>800           COUNT FOR 5 BITS
        DEC   PTR2                POINT TO NEXT BYTE
        JOC   EXIT2               STILL COUNTING
ER2     LI    ENT2,STOP           DONE
EXIT2   RT
*
SYNT3   SLA   REG3,1              FIND LRC IN DATA STREAM
        TB    RDD3-C              PLAYBACK = 1?
        JNE   SCMP3               NO IT'S A ZERO
        ORI   REG3,>100           INSERT 1 BIT
SCMP3   CB    REG3,@BUF3(PTR3)    BYTE=LRC?
        JNE   EXIT3               NOT YET
        LI    ENT3,CMP3           PREPARE FOR COMPARE
        JMP   NUBYT3              TO SET FOR NEXT BYTE
*
CMP3    SLA   REG3,1              SHIFT DATA REGISTER
        TB    RDD3-C              PLAYBACK = 1?
        JNE   ECHK3               CHECK FOR FULL BYTE
        ORI   REG3,>100           INSERT 1 BIT
ECHK3   JNC   EXIT3               BYTE NOT COMPLETE
        CB    REG3,@BUF3(PTR3)    DATA = BUFFER?
        JEQ   NUBYT3              YES, PREPARE FOR NEXT
        SOC   @E3,MFLAG           SHOW LOCAL ERROR
        JMP   ER3                 STOP READING AFTER ERROR
NUBYT3  LI    REG3,>800           COUNT FOR 5 BITS
        DEC   PTR3                POINT TO NEXT BYTE
        JOC   EXIT3               STILL COUNTING
ER3     LI    ENT3,STOP           DONE
EXIT3   RT
*
STOP    RT                        ENTRIES POINT HERE WHEN DONE
*
************************************
        COPY  ENCEQU.ASM
        END
```

While the invention has been described in terms of its preferred embodiments, it should be understood that numerous modifications may be made to the invention without departing from its spirit and scope as defined in the appended claims.

We claim:

1. A recording system for embossing blank cards with a plurality of vertically separated horizontally disposed lines on which characters are to be embossed with at least one line being embossed with characters of a first pitch and at least one line being embossed with characters of a second pitch and for magnetically recording digitally encoded information on one or more tracks of a recording medium disposed on the card comprising:

card supply means for feeding blank cards to be embossed from a pickup station to a recording station where the one or more tracks are recorded, the recording station having means for receiving individual blank cards which are fed by the card supply means and holding the individual cards in a fixed recording position while the one or more tracks are recorded;

card transporting means for receiving blank cards to be embossed from the recording station and for transporting cards received from the recording station along a card transport path to a plurality of separate embossing positions and to a position where embossing is completed;

recording means mounted in proximity to the recording station, the recording means having a head assembly including head means for recording and playback which is movable by a head transporting means along the magnetic recording medium of a card to cause digitally encoded information to be recorded on the one or more tracks of the magnetic recording medium when moved in a forward direction and to be played back from the magnetic recording medium when moved in a reverse direction;

a plurality of card embossing means each disposed at a separate one of the embossing positions disposed along the transport path, each card embossing means being vertically positioned with respect to the transport path to emboss a different one of the horizontally disposed lines of characters on each card with either the first or the second pitch, at least one of the horizontally disposed lines being embossed with the first pitch and at least one of the horizontally disposed lines being embossed with the second pitch; and control means coupled to the card supply means, the recording means, the card transporting means and the plurality of card embossing means for controlling the card supply means to feed blank cards from the pickup station to the recording station, the recording of the one or more tracks of the recording medium by activating the head transporting means to the head assembly in the forward direction while the head means records the tracks, the playback of the recorded information by the head means by activating the head transporting means to move the head assembly in the reverse direction and verification that the information which was recorded is that which was desired to be recorded by comparing the played back information with stored information which was desired to be recorded, the transporting of the cards received by the card transporting means from the recording station to the separate embossing positions along the transporting path and to the position where embossing is completed and the plurality of card embossing means to emboss the plurality of lines on each blank card.

2. A system in accordance with claim 1 wherein the control means compares a current longitudinal position of the cards being embossed by each of the card embossing means determined with respect to a datum point of the card transporting means with a longitudinal position of a next character to be embossed on the cards being embossed by each of the card embossing means on each of the horizontally disposed lines to identify a longitudinal position of one or more closest next characters to be embossed on any of the horizontally disposed lines which are closest to the current longitudinal position, causes the card transporting means to move the cards to be embossed to the longitudinal position of the closest one or more next characters to be embossed, and causes the one or more embossing means which are to emboss the closest one or ore next character to emboss the one or more closest next characters.

3. A system in accordance with claim 2 further comprising:
means for transporting the individual cards held at the recording station of the recording station in a direction orthogonal to the transport path to a ready station wherein the individual cards are engaged by the card transporting means and wherein
the control means causes the individual cards to be held at the ready station in a stationary position prior to engagement by the card transporting means and thereafter causes the card transporting means to be activated to cause the card located at the ready station to engage the means for transporting at a reference longitudinal position on the transport means.

4. A system in accordance with claim 3 wherein the card transporting means comprises:
a rotatably driven belt movable in a direction along the card transport path having a plurality of card engaging means each for engaging a blank card to be embossed which are spaced apart by a uniform distance; and wherein
the card embossing means are spaced apart along the transport path by the uniform distance.

5. A system in accordance with claim 4 wherein the card transporting means further comprises a motor having a cylindrical drive for driving the belt, a single revolution of the belt being equal to an integer multiple of the uniform distance.

6. A system in accordance with claim 5 wherein the circumference of the cylindrical drive is an integer multiple of the uniform distance.

7. A system in accordance with claim 4 wherein the card transporting means further comprises:
a card transporting channel extending from the ready station along the card transport path past each of the plurality of card embossing means for conveying cards past each of the plurality of embossing units; and
the card transporting channel being defined by means for engaging opposed edges of individual cards.

8. A system in accordance with claim 7 wherein the means for engaging opposed edges of the individual cards comprises:
a fixed card edge guiding means extending from the ready station along the transport path past each of the plurality of card embossing means, the fixed card edge guiding means establishing a vertical reference position of the cards along the transport path with respect to each of the plurality of card embossing means and engaging one of the opposed edges of the card; and
a plurality of vertically movable card edge guiding means for biasing the one edge of the card against the vertical reference position, a vertically movable card edge guiding means being associated with each of the card embossing means to bias the other of the opposed edges of the card toward the vertical reference position.

9. A system in accordance with claim 8 wherein each of the vertically movable card edge guiding means comprises a pair of pivotable elements which are biased against the other edge of a card disposed at the associated card embossing means to force the one opposed edge into contact with the fixed card edge guiding means.

10. A system in accordance with claim 9 wherein:
the fixed card edge guiding means is comprised of a horizontally extending channel which is disposed in a straight line defining the vertical reference position of the cards during embossing, the horizontally extending channel being disposed on an infeed side and a discharge side along the transport path of each embossing means; and
each of the vertically movable card edge guiding means has a slot for receiving the other edge and the front and rear sides of the cards while they are transported along the transport path with the slot being defined by a top surface with downwardly depending sides extending from opposed edges of the top surface.

11. A system in accordance with claim 10 wherein:
each of the vertically movable card edge guiding means is pivotably mounted to a support member with an axis of rotation parallel to the transport path; and
a spring engages the support member and each of the pivotable elements to force the slot of each of the elements to engage the other of the opposed edges of the card to force the one opposed edge into contact with the vertical reference surface.

12. A system in accordance with claim 4 wherein each of the card engaging means comprises a projection attached to the belt extending orthogonally from the direction of motion of the belt along the card transport path which engages an edge of a card at the ready station when the belt is moved after the card is positioned at the ready station to establish a horizontal reference position of a card to the belt throughout embossing by the plurality of embossing means.

13. A system in accordance with claim 12 wherein the spacing between the card engaging means is adjustable to permit the spacing between successive card engaging means to be adjusted to the uniform distance.

14. A system in accordance with claim 13 wherein:
each projection is rotatably received within a recess extending within the belt orthogonal to the direction of travel; and
a portion of the projection, which engages a card is eccentric to the recess so that rotation of the projection varies the spacing between the projection and adjacent projections.

15. A system in accordance with claim 2 wherein the card supply means feeds individual cards from a hopper for holding one or more cards to be embossed at the pickup station to the recording station, the recording station being spaced from the pickup station 16. A system in accordance with claim 1 further comprising:
guiding means for guiding the card supply means feeding cards from the pickup station to the recording station and the head during recording and playback along a single path.

17. A system in accordance with claim 1 wherein:
the pickup station lies in a first vertical plane and the recording station lies in a second vertical plane; and further comprising
means for forcing the card from the first plane into the second plane when the card supply means feeds the card to the recording station.

18. A system in accordance with claim 17 further comprising:
means for transporting the individual cards held at the recording station in a direction orthogonal to the card transport path to a ready station where the individual cards are engaged by the card transporting means and wherein;
the control means causes the individual cards to be held at the ready station in a stationary position prior to engagement by the card transporting means and thereafter the card transporting means is activated to cause the card located at the ready station to engage the means for transporting at a reference longitudinal position on the card transporting means;
the ready station lies in a third vertical plane and further comprising;
means for forcing the card from the second plane into the third plane when the means for transporting the individual card held at the recording station to the ready station has reached the ready station.

19. A system in accordance with claim 1 further comprising:
means for storing data records for each card to be embossed and recorded, the data record of each card to be recorded on each of the one or more tracks of the magnetic recording medium of each card being comprised of one or more alphanumeric characters;
the recording means being coupled to the means for storing data records to provide a source of digitally encoded characters to be recorded on the one or more tracks and a comparison of the characters which have been recorded with the characters which were desired to be recorded to permit verification of accuracy of the recording on the one or more tracks; and
the control means causes each card to have the one or more magnetic tracks recorded by the head means with digitally encoded characters stored in the means for storing as the head means is moved in the forward direction, the characters recorded on the one or more tracks to be played back by the head means as the recording assembly is moved in the reverse direction and compared with the characters stored in the means for storing which were desired to be recorded.

20. A system in accordance with claim 19 wherein when the comparison between the recorded characters and the characters which were desired to be recorded is not a match, the control means causes the embossing means to be disabled from embossing characters when the card transporting means transports the card by the plurality of card embossing means.

21. A system in accordance with claim 19 wherein when the comparison between the recorded characters and the characters which were desired to be recorded is not a match, the control means activates the recording means to again record the card on which all the desired characters were not recorded and again compare the recorded characters and the characters that were desired to be recorded.

22. A system in accordance with claim 1 further comprising:
means for detecting when the head means moves past a reference position on a card located at the recording station during motion of the head assembly in the forward direction;
pulse generating means for generating clock pulses for use by the recording means to provide the density of the recorded information along the tracks;
counting means responsive to the means for detecting when the head moves past the reference position and to the pulse generating means for counting a predetermined number of pulses after the reference position on the card has been detected to identify the point where the first bit of the digitally encoded information of each of the tracks is to be recorded; and wherein
the recording means is responsive to the counting means to initiate the recording of the digitally encoded information by the head means upon the count reaching the predetermined count.

23. A system in accordance with claim 22 comprising:
a movable member carrying a photodetector for detecting the reference position on the card, the photodetector being movable between a position that is withdrawn from the reference position to the reference position; and
means for moving the movable member in unison with the recording assembly when the photodetector moves between the withdrawn position and the reference position.

24. A system in accordance with claim 23 wherein the means for moving comprises:
a spring for biasing the movable member in contact with a portion of the head mechanism during movement of the photodetector between the withdrawn position and the reference position; and
a stop for limiting the travel of the photodetector from contacting an edge of a card at the recording station.

25. A system in accordance with claim 24 wherein the means for moving further comprises a movable element connected to the movable member which has an adjustable position parallel to the direction of travel of the head assembly for limiting the travel of the photodetector in the first direction.

26. An embossing system in accordance with claim 3 comprising:
- an indent printing means located at one of the embossing positions;
- a queue of buffers comprising a recording station buffer having an input coupled to a storage and an output, a ready station buffer having an input coupled to the output of the recording station buffer and an output, a series connection of one or more embosser buffers and an indent printer buffer having an input coupled to the output of the ready station buffer and an output coupled to a topping station buffer with each embosser buffer being associated with a separate card embossing means, the recording station buffer being associated with the recording station, the ready station buffer being associated with the ready station, the indent printer buffer being associated with the indent printing means and the topping station being associated with the topping station buffer, each embosser buffer and indent printer buffer having storage locations for storing a data record comprised of all of the characters of the vertically disposed lines to be embossed and indent printed for a single card, each data record including a field of characters for each line of characters to be embossed on the card with each field to be embossed by a single associated card embossing means and a field of characters for the line of characters to be indent printed on the card to be pritned by the indent printing means;
- means for shifting the data records sequentially from an input, through the queue of buffers in the order in which the embossers are located along the transport path, to an output; and
- means coupled to each of the embosser buffers and indent printer buffer for sending a command to emboss the closest next character to its associated card embossing means and indent printing means, each card embossing means and indent printing means receiving commands to emboss or print only characters in the field of characters associated with that card embossing means and indent printing means.

27. An embossing system for embossing blank cards having two sides with a plurality of vertically separated horizontally disposed lines on which characters are to be embossed with at least one line being embossed with characters of a first pitch and at least one line being embossed with characters of a second pitch on the first side and a line having one of the pitches on the second side comprising:
- card supply means for feeding blank cards to be embossed;
- card transporting means for receiving blank cards to be embossed from the card supply means and for transporting the cards received from the card supply means along a transport path to a plurality of separate embossing positions and to a position where embossing is completed;
- a plurality of card embossing means and an indent printing means each disposed at a separate one of the embossing positions disposed along the transport path, each card embossing means and the indent printing means being vertically positioned with respect to the transport path to emboss and print a different one of the horizontally disposed lines of characters on each card, at least one of the lines on the first side being embossed with a character set of a first pitch, at least another of the lines on the first side being embossed with a character set of a second pitch and the line on the second side being printed with an indent character set of one of the pitches;
- means for driving the plurality of card embossing means and the indent printing means from a common power source;
- control means coupled to the card supply means, the card transporting means and the plurality of card embossing means and indent printing means for controlling the card supply means to feed blank cards to the card transporting means, the transporting of the cards received by the card transporting means to the separate embossing positions along the transporting path and the position where embossing and printing is completed and the plurality of card embossing means to emboss the plurality of lines on each blank card and the indent printing means to print a line of indent characters on the second side; and
- the indent printing means for printing the second side having a single movable member which is cyclically moved between first and second positions, a rotatable wheel mounted on a shaft and a fixed anvil between which a blank card to be printed is moved by the card transporting means, the wheel being a punch wheel carrying male indent printing elements of each of the character set printed by the wheel which are movable from a retracted position to a printing position, the wheel carrying indent printing elements of each of the characters to be printed which are disposed at different circumferential positions around the wheel and a space without an indent imprinting element at a circumferential position which is separate from the circumferential position of indent imprinting elements which is the circumferential position of the wheel when a space is to be left on a blank card, the movement of the movable member causing the cyclical movement of one of the indent printing elements from the retracted position to the printing position and back, a shaft encoding means for encoding the circumferential position of the wheel with respect to a reference position, and means for rotating the wheel to any one of the circumferential positions in response to a command from the control means to position the wheel for printing a particular indent printing character or to leave a blank space.

28. An embossing system in accordance with claim 27 wherein the fixed anvil is biased against the first side of a card being printed by the indent printing means printing a line on the second side at a position opposite the position where the male printing elements print on the card.

29. An embossing system in accordance with claim 27 wherein:
- the card transporting means transports the card being printed through a space containing the axis of rotation of the wheel; and the wheel and the fixed anvil are supported by a yoke which extends between the card transporting means.

30. An embossing system for embossing blank cards with a plurality of separated horizontally disposed lines on which characters are to be embossed with at least one line being embossed with characters of a first pitch, at least one line being embossed with characters of a second pitch, and a line being embossed with indent characters comprising:

card supply means for feeding blank cards to be embossed;

card transporting means for receiving blank cards to be embossed from the card supply means and for transporting the cards received from the card supply means along a transport path to a plurality of separate embossing positions and to a position where embossing is completed;

a plurality of card embossing means each disposed at a separate one of the embossing positions disposed along the transport path, each card embossing means being vertically positioned with respect to the transport path to emboss a different one of the horizontally disposed lines of characters on each card, at least one of the lines of embossing being embossed by a character set of a first pitch, and at least another of the lines of embossing being embossed with a character set of a second pitch;

an indent printing means disposed at a separate one of the embossing positions disposed along the transport path for printing indent characters of either the first or second pitch;

the printing means for printing the indent characters having a single movable member which is cyclically moved between first and second positions, a rotatable wheel mounted on a shaft and a fixed anvil between which a blank card to be embossed is moved by the card transporting means, the wheel being a punch wheel carrying male printing elements which are movable from a retracted position to a printing position, the wheel carrying printing elements of each of the characters to be printed which are disposed at different circumferential positions around the wheel and a space without a printing element at a circumferential position which is separate from the circumferential position of the printing elements which is the circumferential position of the wheel when a space is to be left on a blank card, the movement of the movable member causing the cyclical movement of one of the printing elements from the retracted position to the printing position and back, a shaft encoding means for providing a signal encoding the circumferential position of the wheel with respect to a reference position, and means for rotating the wheel to any one of the circumferential positions in response to a command from the control means to position the wheel for printing a particular character;

means for driving the plurality of card embossing means and indent printing means from a common power source; and control means coupled to the card supply means, the card transporting means and the plurality of card embossing means for controlling the card supply means to feed blank cards to the card transporting means, the transporting of the cards received by the card transporting means to the separate embossing positions along the transporting path and to the position where embossing and printing is completed and the plurality of card embossing means to emboss the plurality of lines on each blank card and the indent printing means to print a line of indent characters on the second side.

* * * * *